US011397986B2

(12) United States Patent
Walden et al.

(10) Patent No.: US 11,397,986 B2
(45) Date of Patent: Jul. 26, 2022

(54) ELECTRONIC TRADE PROCESSING SYSTEM AND METHOD

(71) Applicant: Strike Derivatives Inc., New York, NY (US)

(72) Inventors: Charles R. Walden, Austin, TX (US); Andrew D. Lawrence, New York, NY (US); Marcus J. Harte, Bridgewater, NJ (US); Nikita Karpov, New York, NY (US); Brendan P. Flood, Bridgewater, NJ (US); Benjamin A. Holzman, New York, NY (US)

(73) Assignee: STRIKE DERIVATIVES INC., New York, NY (US)

( * ) Notice: Subject to any disclaimer, the term of this patent is extended or adjusted under 35 U.S.C. 154(b) by 0 days.

(21) Appl. No.: 16/588,765

(22) Filed: Sep. 30, 2019

(65) Prior Publication Data

US 2020/0104929 A1    Apr. 2, 2020

Related U.S. Application Data

(60) Provisional application No. 62/738,274, filed on Sep. 28, 2018, provisional application No. 62/738,250, (Continued)

(51) Int. Cl.
*G06Q 40/04*  (2012.01)
*G06F 16/27*  (2019.01)
(Continued)

(52) U.S. Cl.
CPC ......... *G06Q 40/04* (2013.01); *G06F 16/2365* (2019.01); *G06F 16/2379* (2019.01);
(Continued)

(58) Field of Classification Search
CPC ....... G06Q 40/04; G06Q 20/065; G06Q 20/36
(Continued)

(56) References Cited

U.S. PATENT DOCUMENTS 5,802,499 A    9/1998 Sampson et al.
5,819,238 A   10/1998 Fernholz
(Continued)

FOREIGN PATENT DOCUMENTS

WO    01/61534 A2    8/2001
WO    02/17163 A2    2/2002

OTHER PUBLICATIONS

International Search Report and Written Opinion of the International Searching Authority in counterpart International PCT Application No. PCT/US2019/053836 dated Jan. 2, 2020.
(Continued)

*Primary Examiner* — Robert R Niquette
(74) *Attorney, Agent, or Firm* — Brian J. Colandreo; Jeffrey T. Placker; Holland & Knight LLP

(57) ABSTRACT

In one implementation, a computer-implemented method, executed on a computing device and configured to effectuate a trading platform, includes: maintaining an omnibus (multi-client) cryptocurrency trading wallet for a plurality of clients; and maintaining a segregated (individual-client) cryptocurrency transfer wallet for each of the plurality of clients, thus defining a plurality of segregated (individual-client) cryptocurrency transfer wallets.

18 Claims, 25 Drawing Sheets

Related U.S. Application Data filed on Sep. 28, 2018, provisional application No. 62/739,705, filed on Oct. 1, 2018, provisional application No. 62/739,723, filed on Oct. 1, 2018, provisional application No. 62/770,605, filed on Nov. 21, 2018, provisional application No. 62/824,558, filed on Mar. 27, 2019, provisional application No. 62/825,432, filed on Mar. 28, 2019, provisional application No. 62/844,581, filed on May 7, 2019, provisional application No. 62/844,591, filed on May 7, 2019, provisional application No. 62/863,455, filed on Jun. 19, 2019, provisional application No. 62/882,834, filed on Aug. 5, 2019.

(51) Int. Cl.

| | | |
|---|---|---|
| *G06F 16/23* | (2019.01) | |
| *G06Q 20/02* | (2012.01) | |
| *G06Q 20/08* | (2012.01) | |
| *G06Q 20/10* | (2012.01) | |
| *G06Q 40/06* | (2012.01) | |
| *G06Q 20/40* | (2012.01) | |
| *G06Q 20/06* | (2012.01) | |
| *G06Q 20/38* | (2012.01) | |
| *G06Q 30/06* | (2012.01) | |
| *H04L 9/08* | (2006.01) | |
| *G06Q 20/36* | (2012.01) | |
| *G06Q 40/02* | (2012.01) | |
| *G06Q 40/00* | (2012.01) | |
| *G06F 21/60* | (2013.01) | |
| *H04L 9/30* | (2006.01) | |
| *H04L 9/00* | (2022.01) | |

(52) U.S. Cl.
CPC ............ *G06F 16/27* (2019.01); *G06F 21/602* (2013.01); *G06Q 20/023* (2013.01); *G06Q 20/065* (2013.01); *G06Q 20/0855* (2013.01); *G06Q 20/10* (2013.01); *G06Q 20/108* (2013.01); *G06Q 20/36* (2013.01); *G06Q 20/3674* (2013.01); *G06Q 20/3678* (2013.01); *G06Q 20/383* (2013.01); *G06Q 20/388* (2013.01); *G06Q 20/3829* (2013.01); *G06Q 20/401* (2013.01); *G06Q 20/4033* (2013.01); *G06Q 30/0637* (2013.01); *G06Q 40/02* (2013.01); *G06Q 40/025* (2013.01); *G06Q 40/06* (2013.01); *G06Q 40/10* (2013.01); *G06Q 40/12* (2013.12); *H04L 9/088* (2013.01); *H04L 9/0825* (2013.01); *H04L 9/30* (2013.01); *G06Q 2220/00* (2013.01); *H04L 9/50* (2022.05); *H04L 2209/56* (2013.01)

(58) Field of Classification Search
USPC ......................................................... 705/37
See application file for complete search history.

(56) References Cited

U.S. PATENT DOCUMENTS

| | | | |
|---|---|---|---|
| 6,055,518 A | 4/2000 | Franklin et al. | |
| 6,157,920 A | 12/2000 | Jakobsson | |
| 6,247,000 B1 | 6/2001 | Hawkins | |
| 6,615,188 B1 | 9/2003 | Breen et al. | |
| 7,010,512 B1 | 3/2006 | Gillin et al. | |
| 7,222,093 B2 | 5/2007 | Block | |
| 7,376,614 B1 | 5/2008 | Scheinberg et al. | |
| 7,778,919 B2 | 8/2010 | Waelbroeck | |
| 7,873,556 B1 | 1/2011 | Dolan et al. | |
| 8,321,327 B1 | 11/2012 | Drennan et al. | |
| 9,824,031 B1 | 11/2017 | Ganti et al. | |
| 9,892,460 B1 | 2/2018 | Winklevoss | |
| 10,269,009 B1* | 4/2019 | Winklevoss | G06Q 20/065 |
| 10,269,070 B2 | 4/2019 | Rohlfs | |
| 10,354,325 B1 | 7/2019 | Skala et al. | |
| 10,373,158 B1 | 8/2019 | James | |
| 10,643,203 B2 | 5/2020 | Furche | |
| 2002/0038273 A1 | 3/2002 | Wherry et al. | |
| 2002/0069148 A1 | 6/2002 | Mutschler et al. | |
| 2002/0101967 A1 | 8/2002 | Eng et al. | |
| 2003/0009421 A1 | 1/2003 | Bansal | |
| 2003/0061265 A1 | 3/2003 | Maso | |
| 2003/0233319 A1 | 12/2003 | Lawrence | |
| 2004/0024693 A1 | 2/2004 | Lawrence | |
| 2004/0128223 A1 | 7/2004 | Kuhn et al. | |
| 2004/0177024 A1 | 9/2004 | Bok | |
| 2004/0230514 A1 | 11/2004 | Burgis et al. | |
| 2004/0236665 A1 | 11/2004 | Negishi et al. | |
| 2004/0260640 A1 | 12/2004 | Crosthwaite et al. | |
| 2005/0010613 A1 | 1/2005 | Lejdstrom et al. | |
| 2005/0080703 A1 | 4/2005 | Chiesa et al. | |
| 2006/0218075 A1 | 9/2006 | Jayaram | |
| 2007/0100748 A1 | 5/2007 | Dheer | |
| 2007/0118453 A1 | 5/2007 | Bauerschmidt et al. | |
| 2007/0118459 A1 | 5/2007 | Bauerschmidt et al. | |
| 2007/0118460 A1 | 5/2007 | Bauerschmidt et al. | |
| 2007/0226124 A1 | 9/2007 | Khaghani | |
| 2007/0233594 A1 | 10/2007 | Nafeh | |
| 2008/0071664 A1 | 3/2008 | Silverman | |
| 2008/0086416 A1 | 4/2008 | Allas et al. | |
| 2008/0133396 A1 | 6/2008 | De La Motte | |
| 2008/0319891 A1 | 12/2008 | Scheinberg et al. | |
| 2009/0292633 A1 | 11/2009 | Crist | |
| 2009/0313311 A1 | 12/2009 | Hoffmann | |
| 2009/0327117 A1 | 12/2009 | Lee et al. | |
| 2010/0280936 A1 | 11/2010 | Trickey | |
| 2011/0166982 A1 | 7/2011 | Cole et al. | |
| 2011/0264577 A1 | 10/2011 | Winbom et al. | |
| 2011/0276454 A1 | 11/2011 | Tzroya | |
| 2012/0011054 A1 | 1/2012 | Grody | |
| 2012/0089502 A1 | 4/2012 | Dix et al. | |
| 2012/0150715 A1 | 6/2012 | Boudreault et al. | |
| 2012/0185373 A1 | 7/2012 | Grody | |
| 2013/0024352 A1 | 1/2013 | Sulavka | |
| 2013/0091048 A1 | 4/2013 | Renton | |
| 2013/0211990 A1 | 8/2013 | Zhong | |
| 2013/0218741 A1 | 8/2013 | Fenichel | |
| 2013/0317967 A1 | 11/2013 | Novembre | |
| 2014/0129437 A1 | 5/2014 | Desai et al. | |
| 2014/0205095 A1 | 7/2014 | Ittogi | |
| 2014/0279526 A1 | 9/2014 | Jackson | |
| 2014/0279540 A1 | 9/2014 | Jackson | |
| 2014/0289165 A1 | 9/2014 | Dinesh Chheda | |
| 2015/0012401 A1 | 1/2015 | Olsson | |
| 2015/0170112 A1 | 6/2015 | DeCastro | |
| 2015/0220914 A1 | 8/2015 | Purves et al. | |
| 2015/0220928 A1 | 8/2015 | Allen | |
| 2015/0254648 A1 | 9/2015 | Clements et al. | |
| 2015/0262168 A1* | 9/2015 | Armstrong | G06Q 20/36 705/39 |
| 2015/0262176 A1 | 9/2015 | Langschaedel | |
| 2015/0269539 A1 | 9/2015 | MacGregor et al. | |
| 2015/0269541 A1 | 9/2015 | MacGregor et al. | |
| 2015/0269675 A1 | 9/2015 | Walker | |
| 2015/0271183 A1 | 9/2015 | MacGregor et al. | |
| 2015/0332256 A1 | 11/2015 | Minor | |
| 2015/0348192 A1 | 12/2015 | Broder | |
| 2015/0363783 A1 | 12/2015 | Ronca et al. | |
| 2015/0363878 A1 | 12/2015 | Daneshvar | |
| 2016/0042344 A1* | 2/2016 | Thimmana | G06Q 20/3821 705/41 |
| 2016/0048919 A1 | 2/2016 | Frischer et al. | |
| 2016/0071096 A1 | 3/2016 | Rosca | |
| 2016/0071108 A1 | 3/2016 | Caldera et al. | |
| 2016/0086272 A1 | 3/2016 | Baker | |
| 2016/0239915 A1 | 8/2016 | Dale et al. | |
| 2016/0292672 A1 | 10/2016 | Fay et al. | |
| 2016/0321752 A1 | 11/2016 | Tabacco et al. | |
| 2016/0350749 A1 | 12/2016 | Wilkins | |
| 2016/0350854 A1 | 12/2016 | Elliott et al. | |

(56) References Cited

U.S. PATENT DOCUMENTS

| | | | |
|---|---|---|---|
| 2017/0004550 | A1 | 1/2017 | Shaaban et al. |
| 2017/0005804 | A1 | 1/2017 | Zinder |
| 2017/0011460 | A1 | 1/2017 | Molinari et al. |
| 2017/0061396 | A1 | 3/2017 | Melika et al. |
| 2017/0061540 | A1 | 3/2017 | Rohlfs |
| 2017/0078493 | A1 | 3/2017 | Melika et al. |
| 2017/0103459 | A1 | 4/2017 | Kim |
| 2017/0169515 | A1 | 6/2017 | Stanton et al. |
| 2017/0236123 | A1 | 8/2017 | Ali et al. |
| 2017/0243289 | A1 | 8/2017 | Rufo |
| 2017/0279736 | A1 | 9/2017 | Pitio |
| 2017/0293669 | A1 | 10/2017 | Madhavan |
| 2017/0308893 | A1 | 10/2017 | Saraniecki |
| 2018/0096342 | A1 | 4/2018 | Wan |
| 2018/0191503 | A1* | 7/2018 | Alwar ............... H04L 9/0637 |
| 2018/0204216 | A1 | 7/2018 | Dix et al. |
| 2018/0276661 | A1 | 9/2018 | van Wingerden |
| 2018/0308167 | A1 | 10/2018 | Slezak |
| 2019/0318353 | A1 | 10/2019 | Castinado et al. |
| 2019/0340607 | A1 | 11/2019 | Lynn |
| 2019/0354963 | A1* | 11/2019 | Di Iorio ............... G06Q 20/223 |
| 2020/0104854 | A1 | 4/2020 | Walden et al. |
| 2020/0104923 | A1 | 4/2020 | Walden et al. |
| 2020/0104926 | A1 | 4/2020 | Walden |
| 2020/0160330 | A1 | 5/2020 | Yan |

OTHER PUBLICATIONS

International Search Report and Written Opinion of the International Searching Authority in counterpart International PCT Application No. PCT/US2019/053829 dated Jan. 3, 2020.
International Search Report and Written Opinion of the International Searching Authority in counterpart International PCT Application No. PCT/US2019/053811 dated Dec. 16, 2019.
International Search Report and Written Opinion of the International Searching Authority in counterpart International PCT Application No. PCT/US2019/053804 dated Dec. 6, 2019.
International Search Report and Written Opinion of the International Searching Authority in counterpart International PCT Application No. PCT/US2019/053790 dated Dec. 11, 2019.
International Search Report and Written Opinion of the International Searching Authority in counterpart International PCT Application No. PCT/US2019/053780 dated Dec. 11, 2019.
International Search Report and Written Opinion of the International Searching Authority in counterpart International PCT Application No. PCT/US2019/053772 dated Dec. 3, 2019.
Non-Final Office Action issued in counterpart U.S. Appl. No. 16/588,341 dated Dec. 18, 2019.
Non-Final Office Action issued in counterpart U.S. Appl. No. 16/588,561 dated Jan. 10, 2020.
Non-Final Office Action issued in counterpart U.S. Appl. No. 16/588,813 dated Jan. 6, 2020.
Non-Final Office Action issued in counterpart U.S. Appl. No. 16/588,796 dated Feb. 21, 2020.
Non-Final Office Action issued in counterpart U.S. Appl. No. 16/588,393 dated Dec. 12, 2019.
Raskin, Max I. "Realm of the Coin: Bitcoin and Civil Procedure." In: Fordham Journal of Corporate & Financial Law. vol. 20, Issue 4, Article 3, (2015) Retrieved on Nov. 21, 2019 (Nov. 21, 2019) from <https://ir.lawnet.fordham.edu/cgi/viewcontent.cgi?>, 46 pages.
Wells Fargo Advisors, Things to Know—Account Transfer Form (dated Jun. 2018), as captured via the Wayback Machine from http://www.wellsfargoadvisors.com/bw/wellstrade/forms/593314.pdf, 6 pages.
Final Office Action issued in U.S. Appl. No. 16/588,341 dated Mar. 30, 2020.
Non-Final Office Action issued in U.S. Appl. No. 16/588,643 dated Mar. 6, 2020.
Final Office Action issued in related U.S. Appl. No. 16/588,813 dated July 10, 2020.
Final Office Action issued in related U.S. Appl. No. 16/588,796 dated Aug. 24, 2020.
Final Office Action issued in related U.S. Appl. No. 16/588,561 dated Jul. 9, 2020.
Non-Final Office Action issued in U.S. Appl. No. 16/588,393 dated Apr. 29, 2020.
Final Office Action issued in related U.S. Appl. No. 16/588,643 dated Jul. 31, 2020.
Non-Final Office Action issued in related U.S. Appl. No. 16/588,643 dated Oct. 26, 2020.
Notice of Allowance issued in related U.S. Appl. No. 16/588,643 dated Oct. 29, 2020,
Notice of Allowance issued in related U.S. Appl. No. 16/588,796 dated Nov. 24, 2020.
Non-Final Office Action issued in related U.S. Appl. No. 16/588,813 dated Nov. 24, 2020.
Non-Final Office Action issued in related U.S. Appl. No. 16/588,813 dated Nov. 25, 2020.
Non-Final Office Action issued in related U.S. Appl. No. 16/588,690 dated Dec. 30, 2020.
Non-Final Office Action issued in related U.S. Appl. No. 16/588,341 dated Dec. 30, 2020.
Non-Final Office Action issued in related U.S. Appl. No. 16/588,690 dated Dec. 31, 2020.
Non-Final Office Action issued in related U.S. Appl. No. 16/588,690 dated Jan. 25, 2021.
Non-Final Office Action issued in related U.S. Appl. No. 16/588,261 dated Dec. 24, 2020.
Non-Finai Office Action issued in related U.S. Appl. No. 16/588,377 dated Feb. 16, 2021.
Non-Finai Office Action issued in related U.S. Appl. No. 16/588,608 dated Feb. 26, 2021.
Non-Final Office Action issued in related U.S. Appl. No. 16/588,608 dated Feb. 26, 2021.
Non-Final Office Action issued in related U.S. Appl. No. 16/588,673 dated Mar. 4, 2021.
Non-Final Office Action issued in related U.S. Appl. No. 16/588,302 dated Feb. 19, 2021.
Final Office Action issued in related u.S. Appl. No. 16/588,393 dated Apr. 1, 2021.
Final Office Action issued in related U.S. Appl. No. 16/588,564 dated Jun. 11, 2021.
Final Office Action issued in related U.S. Appl. No. 16/588,813 dated Jun. 21, 2021.
Notice of Allowance issued in related U.S. Appl. No. 16/588,796 dated May 28, 2021.
Non-Final Office Action issued in related U.S. Appl. No. 16/588,736 dated Aug. 20, 2021.
Non-Final Office Action issued in related U.S. Appl. No. 16/588,430 dated Aug. 20, 2021.
Final Office Action issued in related U.S. Appl. No. 16/588,341 dated Aug. 31, 2021.
Final Office Action issued in related U.S. Appl. No. 16/588,604 dated Sep. 15, 2021.
Notice of Allowance issued in related U.S. Appl. No. 16/588,765 dated Sep. 27, 2021.
Non-Final Office Action issued in related U.S. Appl. No. 16/588,513 dated Sep. 29, 2021.
Final Office Action issued in related U.S. Appl. No. 16/588,261 dated Sep. 30, 2021.
Final Office Action issued in related U.S. Appl. No. 16/588,690 dated Oct. 14, 2021.
Final Office Action issued in related U.S. Appl. No. 16/588,561 dated Oct. 15, 2021.
Non-Final Office Action issued in related U.S. Appl. No. 16/588,339 dated Nov. 26, 2021.
Final Office Action issued in U.S. Appl. No. 16/588,377 dated Dec. 10, 2021.
Final Office Action issued in U.S. Appl. No. 16/588,577 dated Dec. 10, 2021.

(56) References Cited

OTHER PUBLICATIONS

Final Office Action issued in U.S. Appl. No. 16/588,608 dated Dec. 10, 2021.
Final Office Action issued in U.S. Appl. No. 16/588,302 dated Dec. 10, 2021.
Final Office Action issued in U.S. Appl. No. 16/588,673 dated Dec. 15, 2021.
Non-Final Office Action issued in U.S. Appl. No. 16/588,393 dated Dec. 16, 2021.
Non-Final Office Action issued in U.S. Appl. No. 16/588,705 dated Dec. 21, 2021.
Non-Final Office Action issued in U.S. Appl. No. 16/588,813 dated Jan. 6, 2022.
Non-Final Office Action issued in U.S. Appl. No. 16/588,341 dated Mar. 14, 2022.
Final Office Action issued in U.S. Appl. No. 16/588,430 dated Mar. 17, 2022.
Non-Final Office Action issued in U.S. Appl. No. 16/588,441 dated Apr. 21, 2022.
Final Office Action issued in U.S. Appl. No. 16/588,441 dated Apr. 29, 2022.
Final Office Action issued in U.S. Appl. No. 16/588,513 dated May 10, 2022.
Non-Final Office Action issued in U.S. Appl. No. 16/588,604 dated Jun. 3, 2022.
Non-Final Office Action issued in U.S. Appl. No. 16/588,564 dated Jun. 8, 2022.
Non-Final Office Action issued in U.S. Appl. No. 16/588,561 dated Jun. 9, 2022.

* cited by examiner

ELECTRONIC TRADE PROCESSING SYSTEM AND METHOD

RELATED APPLICATION(S)

This application claims the benefit of the following U.S. Provisional Application Nos. 62/738,274, filed 28 Sep. 2018; 62/738,250, filed 28 Sep. 2018; 62/739,705, filed 1 Oct. 2018; 62/739,723, filed 1 Oct. 2018; 62/770,605, filed 21 Nov. 2018; 62/824,558, filed 27 Mar. 2019; 62/825,432, filed 28 Mar. 2019; 62/844,581, filed 7 May 2019; 62/844,591, filed 7 May 2019; 62/863,455, filed 19 Jun. 2019; and 62/882,834, filed 5 Aug. 2019, their entire contents of which are herein incorporated by reference.

TECHNICAL FIELD

This disclosure relates to trade processing systems and, more particularly, to electronic trade processing systems.

BACKGROUND

Modern trading systems are large, complex, computer-implemented systems. Gone are the days of the trading floor being crowded with groups of traders screaming their bid and ask prices to close a deal. Today's trading systems operate in silence with digital efficiency, as bid orders and ask orders are quietly matched and trades are efficiently executed based upon the same.

Unfortunately, as the cutting edge becomes the new normal, existing systems need to adapt to address and incorporate new methodologies and concepts. For example, the trading of cryptocurrency has presented the existing trading infrastructure with complex challenges concerning how to integrate such new technology into existing systems.

SUMMARY OF DISCLOSURE

In one implementation, a computer-implemented method, executed on a computing device and configured to effectuate a trading platform, includes: maintaining an omnibus (multi-client) cryptocurrency trading wallet for a plurality of clients; and maintaining a segregated (individual-client) cryptocurrency transfer wallet for each of the plurality of clients, thus defining a plurality of segregated (individual-client) cryptocurrency transfer wallets.

One or more of the following features may be included. Approval for transactions within the segregated (individual-client) cryptocurrency transfer wallet nay be required from a related client chosen from the plurality of clients. Approval for all transactions may be required from an approval authority. The approval authority may include one or more of: a clearing house; a clearing & funding agent; a value unit repository; and a trusted third party. The segregated (individual-client) cryptocurrency transfer wallet may be a client-accessible, segregated (individual-client) cryptocurrency transfer wallet. The omnibus (multi-client) cryptocurrency trading wallet may be a client-inaccessible omnibus (multi-client) cryptocurrency trading wallet.

In another implementation, a computer program product resides on a computer readable medium and has a plurality of instructions stored on it. When executed by a processor, the instructions cause the processor to perform operations including: maintaining an omnibus (multi-client) cryptocurrency trading wallet for a plurality of clients; and maintaining a segregated (individual-client) cryptocurrency transfer wallet for each of the plurality of clients, thus defining a plurality of segregated (individual-client) cryptocurrency transfer wallets.

One or more of the following features may be included. Approval for transactions within the segregated (individual-client) cryptocurrency transfer wallet nay be required from a related client chosen from the plurality of clients. Approval for all transactions may be required from an approval authority. The approval authority may include one or more of: a clearing house; a clearing & funding agent; a value unit repository; and a trusted third party. The segregated (individual-client) cryptocurrency transfer wallet may be a client-accessible, segregated (individual-client) cryptocurrency transfer wallet. The omnibus (multi-client) cryptocurrency trading wallet may be a client-inaccessible omnibus (multi-client) cryptocurrency trading wallet.

In another implementation, a computing system including a processor and memory is configured to perform operations including: maintaining an omnibus (multi-client) cryptocurrency trading wallet for a plurality of clients; and maintaining a segregated (individual-client) cryptocurrency transfer wallet for each of the plurality of clients, thus defining a plurality of segregated (individual-client) cryptocurrency transfer wallets.

One or more of the following features may be included. Approval for transactions within the segregated (individual-client) cryptocurrency transfer wallet nay be required from a related client chosen from the plurality of clients. Approval for all transactions may be required from an approval authority. The approval authority may include one or more of: a clearing house; a clearing & funding agent; a value unit repository; and a trusted third party. The segregated (individual-client) cryptocurrency transfer wallet may be a client-accessible, segregated (individual-client) cryptocurrency transfer wallet. The omnibus (multi-client) cryptocurrency trading wallet may be a client-inaccessible omnibus (multi-client) cryptocurrency trading wallet.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
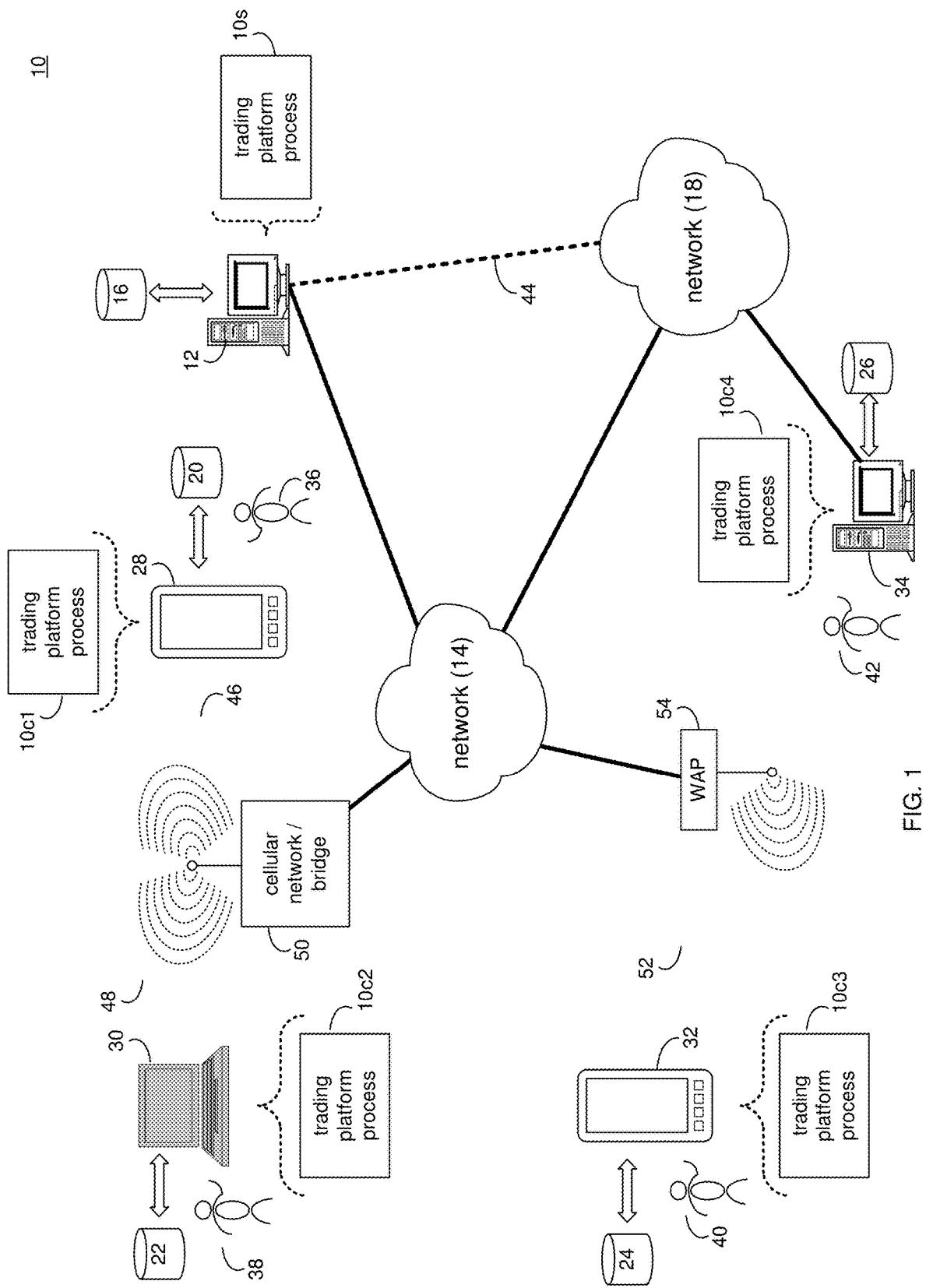
FIG. 1 is a diagrammatic view of a distributed computing network including a computing device that executes a trading platform process according to an embodiment of the present disclosure.

Referring to FIG. 1, there is shown trading platform process 10. Trading platform process 10 may be implemented as a server-side process, a client-side process, or a hybrid server-side/client-side process. For example, trading platform process 10 may be implemented as a purely server-side process via trading platform process 10s. Alternatively, trading platform process 10 may be implemented as a purely client-side process via one or more of trading platform process 10c1, trading platform process 10c2, trading platform process 10c3, and trading platform process 10c4. Alternatively still, trading platform process 10 may be implemented as a hybrid server-side/client-side process via trading platform process 10s in combination with one or more of trading platform process 10c1, trading platform process 10c2, trading platform process 10c3, and trading platform process 10c4. Accordingly, trading platform process 10 as used in this disclosure may include any combination of trading platform process 10s, trading platform process 10c1, trading platform process 10c2, trading platform process 10c3, and trading platform process 10c4.

Trading platform process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of trading platform process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of trading platform processes 10c1, 10c2, 10c3, 10c4 may include but are not limited to a client application, a web browser, a game console user interface, or a specialized application (e.g., an application running on e.g., the Android™ platform or the iOS™ platform). The instruction sets and subroutines of trading platform processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access trading platform process 10 directly through network 14 or through secondary network 18. Further, trading platform process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Trading System

Figure 2:
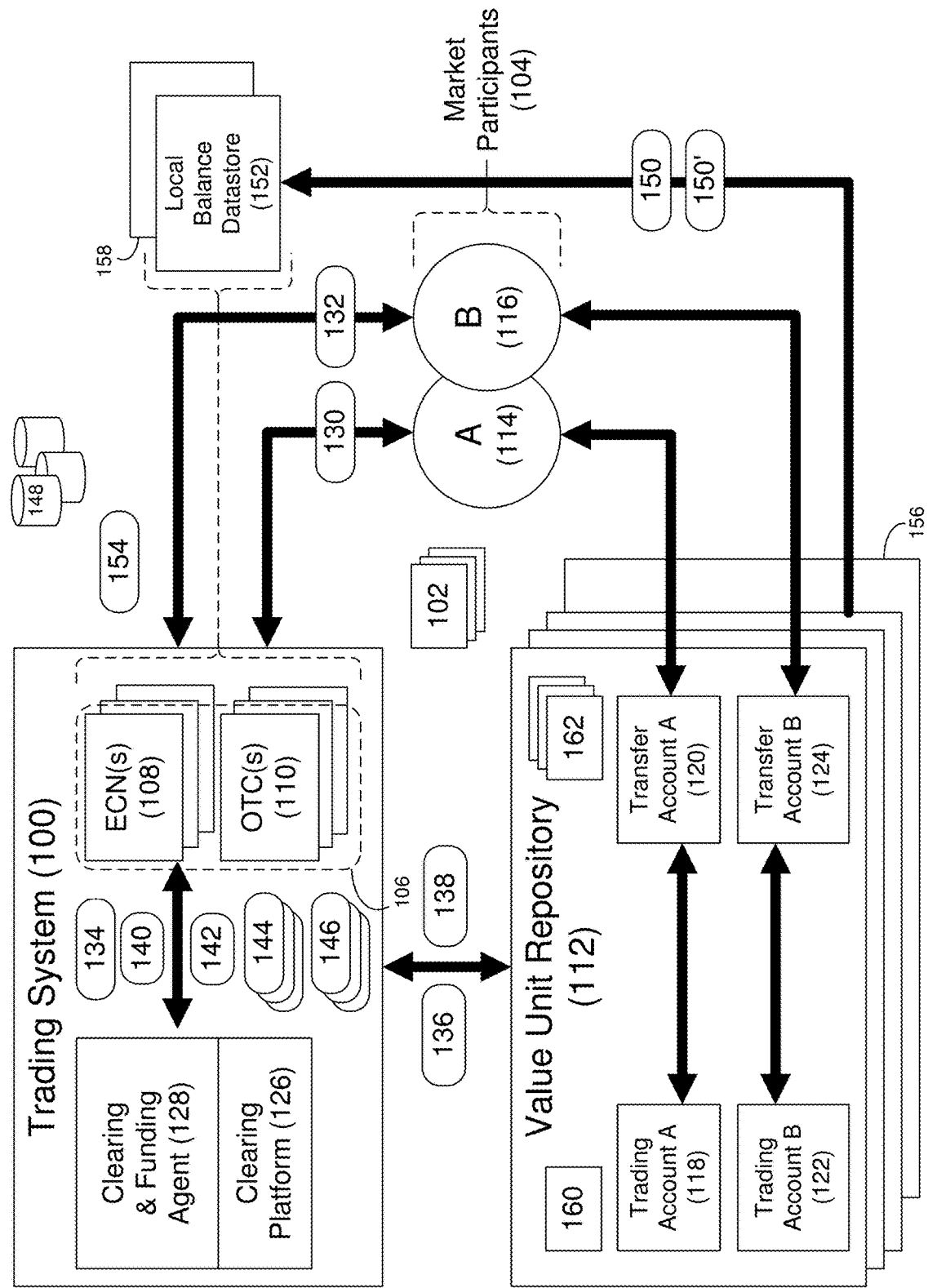
FIG. 2 is a diagrammatic view of a trading system configured to execute the trading platform process of FIG. 1 according to an embodiment of the present disclosure.

Referring to FIG. 2, there is shown one implementation of trading system 100, which may be configured to execute trading platform process 10 and, therefore, may include (or be coupled to) computing device 12. As will be discussed below in greater detail, trading system 100 may be configured to effectuate trades of assets (e.g. assets 102) between various market participants (e.g. market participants 104). Examples of assets 102 may include but are not limited to bearer financial assets (e.g. a quantity of a cyptocurrency, a quantity of a fiat currency, and or a quantity of a physical asset).

As used in this disclosure, "fiat currency" is intended to mean any and all representations/embodiments/instantiations of a fiat currency. For example and as used in this disclosure, "fiat currency" may be a physical representation of a fiat currency (e.g., a physical quantity of US dollars). Additionally/alternatively and as used in this disclosure, "fiat currency" may be a digital/electronic representation of a fiat currency (e.g., a digital representation of a quantity of US dollars). Accordingly and as used in this document, "fiat currency" is intended to include any and all representations/embodiments/instantiations of a fiat currency.

Trading system 100 may be configured to include and/or interface with one or more trading platforms (e.g. trading platforms 106), examples of which may include but are not limited to one or more Electronic Communications (or Crossing) Networks (e.g., ECNs 108) and/or one or more Over-the-Counter Platforms (e.g., OTCs 110).

As is known in the art, an Electronic Communications (or Crossing) Network (e.g., ECN 108) is a digital trading system that matches buyers and sellers looking to make trades in the financial markets. An Electronic Communications (or Crossing) Network (e.g., ECN 108) may allow brokerages and investors in different geographic areas to trade without a third party involved, offering privacy for investors. Additionally, an Electronic Communications (or Crossing) Network (e.g., ECN 108) may enable trading to happen outside of traditional trading hours, therefore enabling investors to react to or anticipate after-hours news.

As is known in the art, an Over-the-Counter Platform (e.g., OTC 110) is a system that enables trades for companies that are not listed on a formal exchange such as the New York Stock Exchange (NYSE). Trades made over-the-counter may occur via a broker-dealer network (as opposed to on a centralized exchange). The assets being traded may not meet the requirements to have a listing on a standard market exchange. Transactions may take place through the Over-the-Counter Bulletin Board (OTCBB) or the Pink Sheets listing services. The OTCBB is an electronic quotation and trading service that may facilitate higher liquidity and better information sharing. Pink Sheets is a service that works with broker-dealers to bring small company shares to market. OTC securities may trade by broker-dealers who negotiate directly with one another over computer networks and by phone using the OTCBB. The dealers may act as market makers using the Pink Sheets and the OTCBB, which is provided by the National Association of Securities Dealers (NASD).

Trading system 100 may be configured to interface with one or more value unit repositories (e.g., value unit repository 112), examples of which may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography and is configured to store assets 102); a dealer (e.g. a traditional securities dealer configured to store assets 102); and a broker/dealer (e.g. a traditional broker/dealer configured to store assets 102).

As will be discussed below in greater detail, value unit repository 112 may include a plurality of defined accounts of varying types. As discussed above, trading system 100 may be configured to effectuate trades of assets (e.g. assets 102) between various market participants (e.g. market participants 104). Assume for this example that market participants 104 includes a first market participant (e.g. first party 114) and a second market participant (e.g. second party 116).

Accordingly and in order to enable the trading of assets (e.g. assets 102) between the various market participants (e.g. first party 114 and second party 116); first party 114 may have one or more accounts (e.g. trading account 118 and/or transfer account 120) defined within value unit repository 112, while second party 116 may have one or more accounts (e.g. trading account 122 and/or transfer account 124 (defined within value unit repository 112.

As we discussed below in greater detail, transfer accounts (e.g. transfer account 120 and/or transfer account 124) may be configured so that they are client accessible, wherein the owner of such an account (e.g. first party 114 and second party 116 respectively) may be allowed to freely move assets into and/or out of such transfer accounts (with some restrictions).

Further and as will be discussed below in greater detail, trading accounts (e.g. trading account 118 and/or trading account 122) may be configured so that they are client inaccessible, wherein the owner of such an account (e.g., first party 114 and second party 116 respectively) may not be allowed to freely move assets into and/or out of such trading accounts (with some restrictions).

Trading system 100 may be configured to include and/or interface with a clearing platform (e.g. clearing platform 126). As is known in the art, a clearing platform (e.g. clearing platform 126) may act as an intermediary between a buyer and seller and may seek to ensure that the process from trade inception to settlement is smooth. The main role of a clearing platform (e.g. clearing platform 126) may be to ensure that the buyer and seller honor their contractual obligations, wherein such responsibilities may include settling trading accounts, clearing trades, collecting and maintaining margin monies, regulating delivery of the bought/sold instrument, and reporting trading data. Clearing platforms (e.g. clearing platform 126) may act as third parties to all futures and options contracts, as buyers to every clearing member seller, and as sellers to every clearing member buyer.

Trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124).

Figure 3:
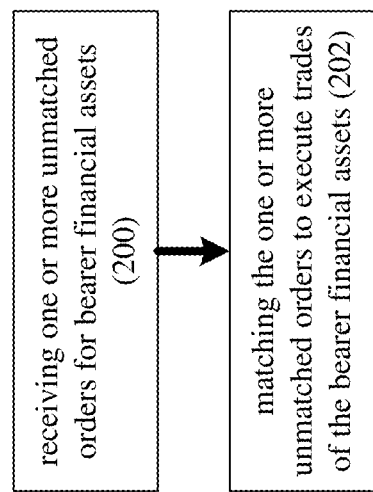
FIG. 3 is a flowchart of an implementation of the trading platform process of FIG. 1 according to an embodiment of the present disclosure.

Referring to FIG. 3, trading platform process 10 may be configured to effectuate a trading platform (e.g., one or more of trading platforms 106).

Trading platform process 10 may further be configured to receive 200 one or more unmatched orders (e.g., order 130 from first party 114 and/or order 132 from second party 116) for bearer financial assets. As discussed above, examples of such bearer financial assets may include but are not limited to one or more of: a cryptocurrency; a fiat currency; and a physical asset.

Trading platform process 10 may further be configured to match 202 the one or more unmatched orders (e.g., order 130 from first party 114 and/or order 132 from second party 116) to execute trades of these bearer financial assets. For example, assume that first party 114 is interested in buying Bitcoin tokens at $4,000 each, as represented by unmatched order 130. Further, assume that second party 116 is interested in selling Bitcoin tokens at $4,000 each, as represented by unmatched order 132. Naturally, the quantity of Bitcoin tokens sought for purchase by first party 114 or offered for sale by second party 116 is incidental for this example, as that will only determine whether or not these unmatched orders are wholly or partially filled. For this example, assume that first party 114 is interested in buying 100 Bitcoin tokens at $4,000 each and second party 116 is interested in selling 100 Bitcoin tokens at $4,000 each. Accordingly and in such an example, trade platform process 10 may match 202 the one or more unmatched orders (e.g., order 130 from first party 114 and/or order 132 from second party 116) to execute trades of these bearer financial assets (e.g. 100 Bitcoin tokens at $4,000 each).

While the above example concerns bearer-for-currency unmatched orders, it is understood that this is for illustrative purposes only and is not intended to be a limitation of this disclosure, as other configurations are possible and are considered to be within the scope of this disclosure. For example, the above-described unmatched orders may include one or more of a bearer-for-bearer unmatched orders. Accordingly, first party 114 may be interested in trading Bitcoin tokens for Ethereum tokens, while second party 116 may be interested in trading Ethereum tokens for Bitcoin tokens.

Figure 4:
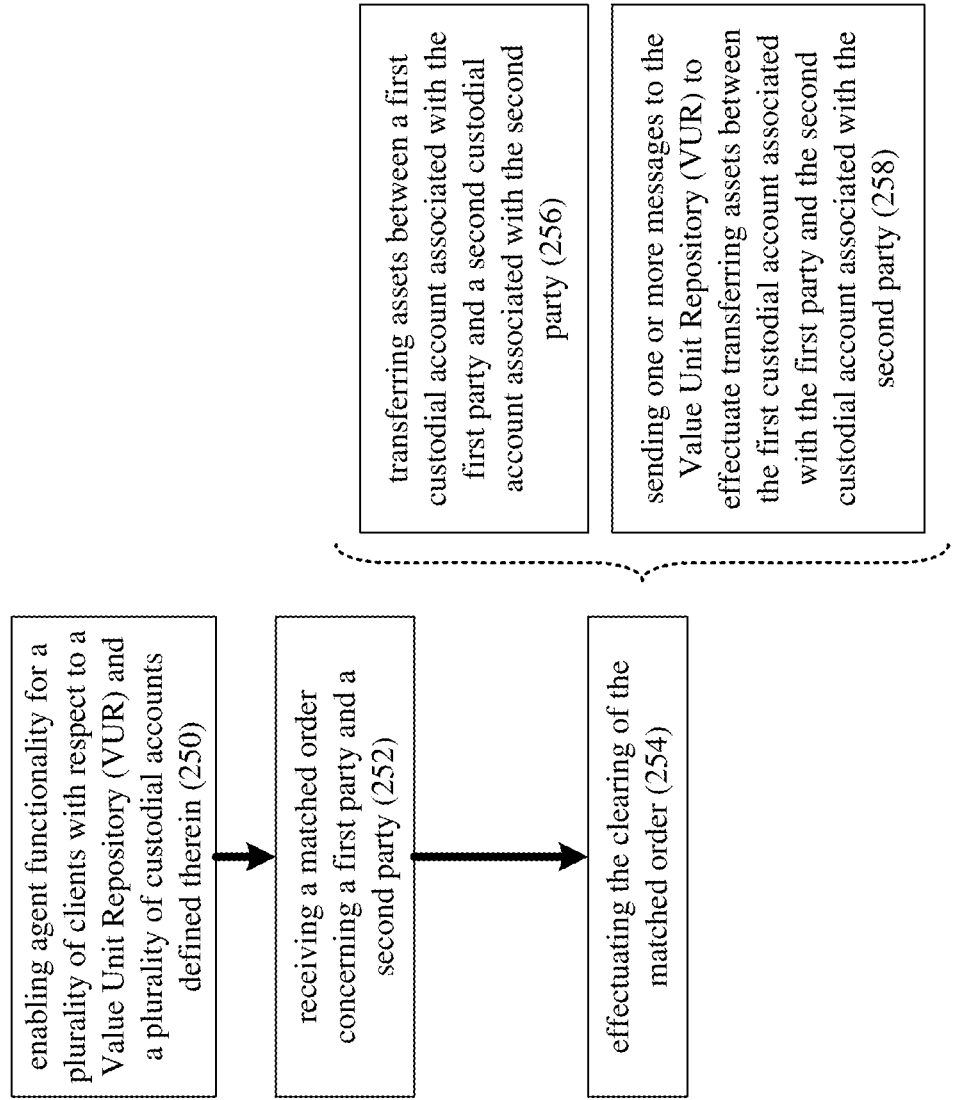
FIG. 4 is a flowchart of another implementation of the trading platform process of FIG. 1 according to an embodiment of the present disclosure.

Referring to FIG. 4, trading platform process 10 may be configured to effectuate a clearing platform (e.g., clearing platform 126).

Trading platform process 10 may further be configured to enable 250 agent functionality for a plurality of clients (e.g., first party 114 and second party 116) with respect to a Value Unit Repository (e.g., value unit repository 112) and a plurality of custodial accounts defined therein (e.g. trading account 118, transfer account 120, trading account 122, and transfer account 124).

Continuing with the above-stated example in which trading platform process 10 matched 202 order 130 from first party 114 and order 132 from second party 116 for a quantity of bearer financial assets (e.g. 100 Bitcoin tokens at $4,000 each), trading platform process 10 may receive 252 a matched order concerning a first party and a second party (e.g., matched order 134, which is the combination of order 130 from first party 114 and order 132 from second party 116).

Matched order 134 may concern a bearer financial asset, such as a cryptocurrency; a fiat currency; and a physical asset. For example, matched order 134 may concern: a quantity of a cryptocurrency owned by first party 114 and a quantity of a fiat currency owned by second party 116; a quantity of a cryptocurrency owned by first party 114 and a quantity of a precious metal owned by second party 116, and/or a quantity of a first cryptocurrency owned by first party 114 and a quantity of a second cryptocurrency owned by second party 116.

Trading platform process 10 may then effectuate 254 the clearing of matched order 132, which may include transferring 256 assets between a first custodial account associated with first party 114 and a second custodial account associated with second party 116. Specifically and upon receiving 252 matched order 134, trading platform process 10:

may transfer 256 $400,000 (i.e., $4,000×100) from the trading account (e.g., trading account 118) of first party 114 to the trading account (e.g., trading account 122) of second party 116; and may transfer 256 100 Bitcoin tokens from the trading account (e.g., trading account 122) of second party 116 to the trading account (e.g., trading account 118) of first party 114.

When effectuating 254 the clearing of matched order 132, trading platform process 10 may send 258 one or more messages to the Value Unit Repository (e.g., value unit repository 112) to effectuate transferring 256 assets between the first custodial account associated with first party 114 and the second custodial account associated with second party 116. Accordingly, trading platform process 10:

may send 258 message 136 to value unit repository 112 requesting the transfer of $400,000 (i.e., $4,000×100) from the trading account (e.g., trading account 118) of first party 114 to the trading account (e.g., trading account 122) of second party 116; and may send 258 message 138 to value unit repository 112 requesting the transfer of 100 Bitcoin tokens from the trading account (e.g., trading account 122) of second party 116 to the trading account (e.g., trading account 118) of first party 114.

As discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly and when effectuating 254 the clearing of matched order 132, trading platform process 10:

- may send message 140 to clearing & funding agent 128 so that clearing & funding agent 128 may send 258 message 136 to value unit repository 112 requesting the transfer of $400,000 (i.e., $4,000×100) from the trading account (e.g., trading account 118) of first party 114 to the trading account (e.g., trading account 122) of second party 116; and
- may send message 142 to clearing & funding agent 128 so that clearing & funding agent 128 may send 258 message 138 to value unit repository 112 requesting the transfer of 100 Bitcoin tokens from the trading account (e.g., trading account 122) of second party 116 to the trading account (e.g., trading account 118) of first party 114.

Figure 5:
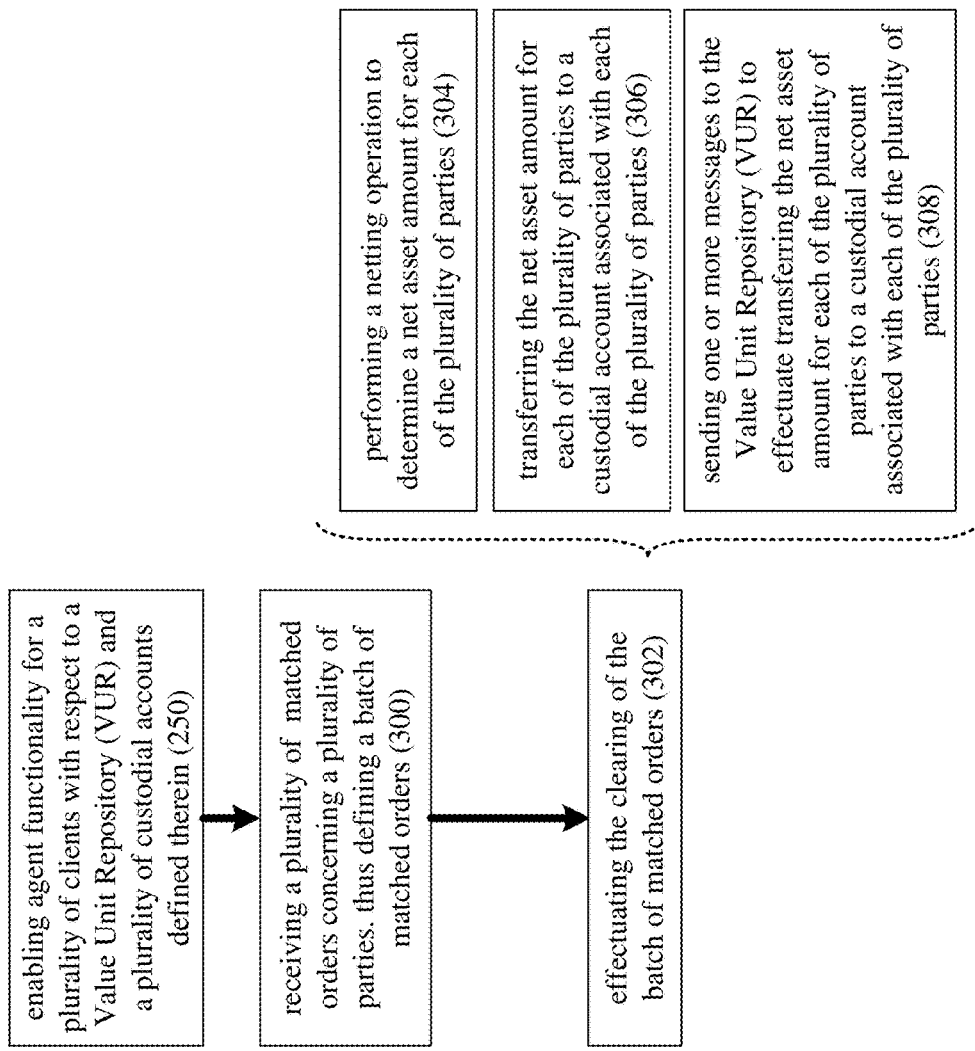
FIG. 5 is a flowchart of another implementation of the trading platform process of FIG. 1 according to an embodiment of the present disclosure.

Referring to FIG. 5, trading platform process 10 may be configured to effectuate a clearing platform (e.g., clearing platform 126).

As discussed above, trading platform process 10 may further be configured to enable 250 agent functionality for a plurality of clients (e.g., first party 114 and second party 116) with respect to a Value Unit Repository (e.g., value unit repository 112) and a plurality of custodial accounts defined therein (e.g. trading account 118, transfer account 120, trading account 122, and transfer account 124).

Trading platform process 10 may further be configured to receive 300 a plurality of matched orders concerning a plurality of parties (e.g. market participants 104), thus defining a batch of matched orders (e.g., batch of matched orders 144). Batch of matched orders 144 may be a group of orders that were matched amongst a plurality of parties (e.g. market participants 104).

Trading platform process 10 may further be configured to effectuate 302 the clearing of the batch of matched orders (e.g., batch of matched orders 144), which may include performing 304 a netting operation to determine a net asset amount for each of the plurality of parties (e.g. market participants 104). When effectuating 302 the clearing of the batch of matched orders (e.g., batch of matched orders 144), trading platform process 10 may transfer 306 the net asset amount for each of the plurality of parties (e.g. market participants 104) to a custodial account associated with each of the plurality of parties (e.g. market participants 104).

For example, assume that the following unmatched orders were received 200 by trading platform process 10:

| Order # | Party | Order Type | Asset | Quantity | Amount |
| --- | --- | --- | --- | --- | --- |
| 1 | Party 1 | Sell | Bitcoin | 100 | $4,000 per |
| 2 | Party 2 | Buy | Bitcoin | 100 | $4,000 per |
| 3 | Party 3 | Sell | Bitcoin | 50 | $3,900 per |
| 4 | Party 1 | Buy | Bitcoin | 50 | $3,900 per |
| 5 | Party 4 | Sell | Bitcoin | 200 | $3,850 per |
| 6 | Party 1 | Buy | Bitcoin | 200 | $3,850 per |

As discussed above, effectuating 302 the clearing of the batch of matched orders (e.g., batch of matched orders 144) may include performing 304 a netting operation to determine a net asset amount for each of the plurality of parties (in this example, Parties 1-4).

As shown in the table above, the activity of Parties 1-4 is as follows:

For PARTY 1:
  i. Bitcoin Activity: (sold 100)+(bought 50)+(bought 200) . . . for a net result of +150 Bitcoin.
  ii. USD Activity: (earned $400,000)+(spent $195,000)+(spent $770,000) . . . for a net result of −$565,000.

For PARTY 2:
  i. Bitcoin Activity: (bought 100) . . . for a net result of +100 Bitcoin.
  ii. USD Activity: (spent $400,000) . . . for a net result of −$400,000.

For PARTY 3:
  i. Bitcoin Activity: (sold 50) . . . for a net result of −50 Bitcoin.
  ii. USD Activity: (earned $195,000) . . . for a net result of +$195,000.

For PARTY 4:
  i. Bitcoin Activity: (sold 200) . . . for a net result of −200 Bitcoin.
  ii. USD Activity: (earned $770,000) . . . for a net result of +$770,000.

While in the above example, the system is described as performing 304 a netting operation on a comparatively limited number of parties (i.e., Parties 1-4), this is for illustrative purposes only and is not intended to be a limitation of this disclosure, as other configurations are possible and are considered to be within the scope of this disclosure. Specifically and when performing 304 the netting operation, the netting of each participant may be computed against ALL of the other participants with whom the participant trades, examples of which may include but are not limited to: the situation in which each participant of an ECN (e.g., ECN 108) trades with every other participant; and the situation in which every participant (except the dealer) of an OTC (e.g., OTC 110) trades with only one participant (i.e., the dealer) while the dealer trades with every participant.

Continuing with the above-stated example and when performing 304 the netting operation to determine a net asset amount for each of the plurality of parties (in this example, Parties 1-4), the following amounts will be determined:

For PARTY 1:
  i. Bitcoin Net Asset Amount: +150 Bitcoin.
  ii. USD Net Asset Amount: −$565,000.

For PARTY 2:
  i. Bitcoin Net Asset Amount: +100 Bitcoin.
  ii. USD Net Asset Amount: −$400,000.

For PARTY 3:
  i. Bitcoin Net Asset Amount: −50 Bitcoin.
  ii. USD Net Asset Amount: +$195,000.

For PARTY 4:
  i. Bitcoin Net Asset Amount: −200 Bitcoin.
  ii. USD Net Asset Amount: +$770,000.

Once the above-described net asset amounts are determined, trading platform process 10 may transfer 306 the net asset amount for each of the plurality of parties (in this example, Parties 1-4) to a custodial account associated with each of the plurality of parties (e.g. market participants 104).

For PARTY 1: 150 Bitcoin will be transferred 306 into their trading account while $565,000 will be transferred 306 out of their trading account.

For PARTY 2: 100 Bitcoin will be transferred 306 into their trading account while $400,000 will be transferred 306 out of their trading account.

For PARTY 3: 50 Bitcoin will be transferred 306 out of their trading account while $195,000 will be transferred 306 into their trading account.

For PARTY 4: 200 Bitcoin will be transferred 306 out of their trading account while $770,000 will be transferred 306 into their trading account.

In the manner described above, when effectuating 302 the clearing of the batch of matched orders (e.g., batch of matched orders 144), trading platform process 10 may send 308 one or more messages (such as message 136 and/or message 138) to the Value Unit Repository (e.g., value unit repository 112) to effectuate transferring the above-described net asset amount for each of the plurality of parties (in this example, Parties 1-4) to a custodial account associated with each of the plurality of parties (in this example, Parties 1-4).

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly and when effectuating 302 the clearing of the batch of matched orders (e.g., batch of matched orders 144), trading platform process 10 may send one or more messages to clearing & funding agent 128 so that clearing & funding agent 128 may send 308 one or more messages to value unit repository 112 requesting transfer of the above-described net asset amounts.

Figure 6:
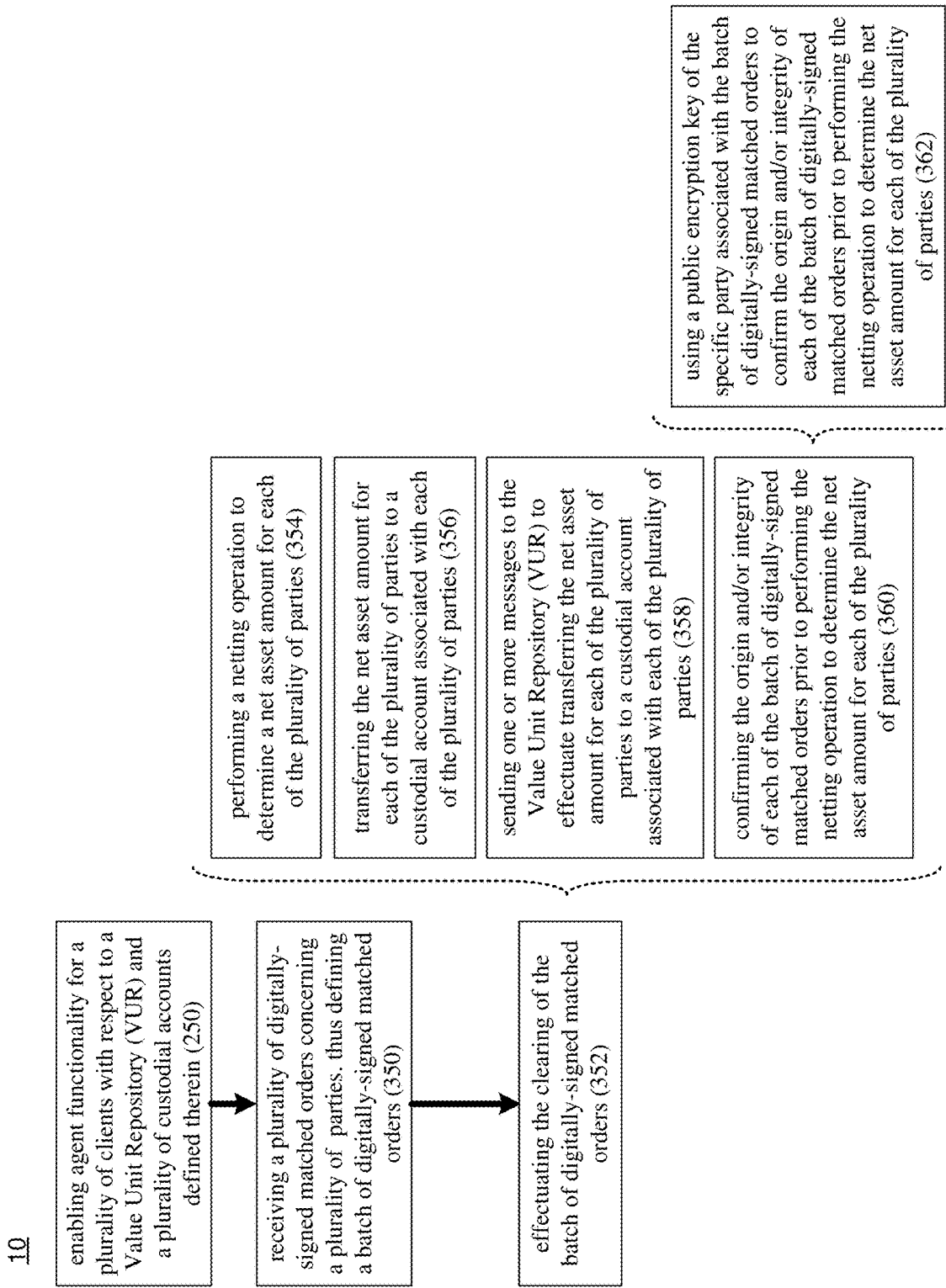
FIG. 6 is a flowchart of another implementation of the trading platform process of FIG. 1 according to an embodiment of the present disclosure.

Referring to FIG. 6, trading platform process 10 may be configured to effectuate a clearing platform (e.g., clearing platform 126).

As discussed above, trading platform process 10 may further be configured to enable 250 agent functionality for a plurality of clients (e.g., first party 114 and second party 116) with respect to a Value Unit Repository (e.g., value unit repository 112) and a plurality of custodial accounts defined therein (e.g. trading account 118, transfer account 120, trading account 122, and transfer account 124).

In order to provide a more secure trading environment, trading platform process 10 may be configured to process encrypted information. In single key encryption systems, the same encryption key is used to encrypt & decrypt information. Unfortunately, if the content being encrypted is being provided to and decrypted by a third party, that third party would need to have access to the encryption key (thus compromising the future usefulness of the same). However and as is known in the art, private-key/public-key encryption systems address the shortcomings of such single key systems. Specifically, private-key/public-key encryption systems utilize two keys: a private key that is maintained in confidence by the owner and a public key that is freely available for use by anyone.

Further, data that is encrypted by either key is only decryptable by the other key. So if a piece of data is encrypted using a private key, that encrypted data may only be decrypted using the associated public key. Conversely, if a piece of data is encrypted using a public key, that encrypted data may only be decrypted using the associated private key.

So if Party A wanted to send data to Party B in a way so that the data is only readable by Party B, Party A may encrypt the data using the public key of Party B and then send the encrypted data to Party B, wherein Party B may then decrypt this encrypted data using the private key of Party B.

Further, if Party A wanted to send data to Party B in a way so that the origin and/or integrity of the data is confirmable by Party B, Party A may encrypt the data using the private key of Party A and then send this "digitally-signed" data to Party B, wherein Party B may then prove the origin and/or integrity of this "digitally-signed" data by decrypting it using the public key of Party A.

Assume for this example that trading platform process 10 may be configured to receive 350 a plurality of digitally-signed matched orders concerning a plurality of parties (e.g. market participants 104), thus defining a batch of digitally-signed matched orders (e.g., batch of digitally-signed matched orders 146). Batch of digitally-signed matched orders 146 may be a group of orders that were matched amongst a plurality of parties (e.g. market participants 104).

Trading platform process 10 may further be configured to effectuate 352 the clearing of the batch of digitally-signed matched orders (e.g., batch of digitally-signed matched orders 146), which may include performing 354 a netting operation to determine a net asset amount for each of the plurality of parties (e.g. market participants 104). When effectuating 352 the clearing of the batch of digitally-signed matched orders (e.g., batch of digitally-signed matched orders 146), trading platform process 10 may transfer 356 the net asset amount for each of the plurality of parties (e.g. market participants 104) to a custodial account associated with each of the plurality of parties (e.g. market participants 104).

For ease of illustration, assume that the same unmatched orders were received 200 by trading platform process 10:

| Order # | Party | Order Type | Asset | Quantity | Amount |
| --- | --- | --- | --- | --- | --- |
| 1 | Party 1 | Sell | Bitcoin | 100 | $4,000 per |
| 2 | Party 2 | Buy | Bitcoin | 100 | $4,000 per |
| 3 | Party 3 | Sell | Bitcoin | 50 | $3,900 per |
| 4 | Party 1 | Buy | Bitcoin | 50 | $3,900 per |
| 5 | Party 4 | Sell | Bitcoin | 200 | $3,850 per |
| 6 | Party 1 | Buy | Bitcoin | 200 | $3,850 per |

As discussed above, effectuating 352 the clearing of the batch of digitally-signed matched orders (e.g., batch of digitally-signed matched orders 146) may include performing 354 a netting operation to determine a net asset amount for each of the plurality of parties (in this example, Parties 1-4).

As discussed above and when performing 354 the netting operation to determine a net asset amount for each of the plurality of parties (in this example, Parties 1-4), the following amounts will be determined:

For PARTY 1:
  i. Bitcoin Net Asset Amount: +150 Bitcoin.
  ii. USD Net Asset Amount: −$565,000.
For PARTY 2:
  i. Bitcoin Net Asset Amount: +100 Bitcoin.
  ii. USD Net Asset Amount: −$400,000.
For PARTY 3:
  i. Bitcoin Net Asset Amount: −50 Bitcoin.
  ii. USD Net Asset Amount: +$195,000.
For PARTY 4:
  i. Bitcoin Net Asset Amount: −200 Bitcoin.
  ii. USD Net Asset Amount: +$770,000.

Once the above-described net asset amounts are determined, trading platform process 10 may transfer 356 the net asset amount for each of the plurality of parties (in this example, Parties 1-4) to a custodial account associated with each of the plurality of parties (e.g. market participants 104).

For PARTY 1: 150 Bitcoin will be transferred 356 into their trading account while $565,000 will be transferred 356 out of their trading account.

For PARTY 2: 100 Bitcoin will be transferred 356 into their trading account while $400,000 will be transferred 356 out of their trading account.

For PARTY 3: 50 Bitcoin will be transferred 356 out of their trading account while $195,000 will be transferred 356 into their trading account.

For PARTY 4: 200 Bitcoin will be transferred 356 out of their trading account while $770,000 will be transferred 356 into their trading account.

In the manner described above, when effectuating 352 the clearing of the batch of digitally-signed matched orders (e.g., batch of digitally-signed matched orders 146), trading platform process 10 may send 358 one or more messages (such as message 136 and/or message 138) to the Value Unit Repository (e.g., value unit repository 112) to effectuate transferring the above-described net asset amount for each of the plurality of parties (in this example, Parties 1-4) to a custodial account associated with each of the plurality of parties (in this example, Parties 1-4).

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly and when effectuating 352 the clearing of the batch of digitally-signed matched orders (e.g., batch of digitally-signed matched orders 146), trading platform process 10 may send one or more messages to clearing & funding agent 128 so that clearing & funding agent 128 may send 358 one or more messages to value unit repository 112 requesting transfer of the above-described net asset amounts.

Further and when effectuating 352 the clearing of the batch of digitally-signed matched orders (e.g., batch of digitally-signed matched orders 146), trading platform process 10 may confirm 360 the origin and/or integrity of each of the batch of digitally-signed matched orders (e.g., batch of digitally-signed matched orders 146) prior to performing 354 the above-described netting operation to determine the net asset amount for each of the plurality of parties (in this example, Parties 1-4).

As discussed above, each of the batch of digitally-signed matched orders (e.g., batch of digitally-signed matched orders 146) may have been encrypted using a private encryption key of a specific party associated with the batch of digitally-signed matched orders (e.g., batch of digitally-signed matched orders 146). For example, each of the parties associated with an unmatched order may have digitally-signed the unmatched order at the time it was generated. Additionally/alternatively, once a pair of unmatched orders are matched, the entity matching the orders may digitally sign each of the matched orders at the time it was generated. Additionally/alternatively, the batch of digitally-signed matched orders (e.g., batch of digitally-signed matched orders 146) may be digitally signed at the time the batch was generated.

Accordingly, confirming 360 the origin and/or integrity of each of the batch of digitally-signed matched orders (e.g., batch of digitally-signed matched orders 146) prior to performing 354 the above-described netting operation to determine a net asset amount for each of the plurality of parties (in this example, Parties 1-4) may include using 362 a public encryption key of the specific party associated with the batch of digitally-signed matched orders (e.g., batch of digitally-signed matched orders 146) to confirm the origin and/or integrity of each of the batch of digitally-signed matched orders (e.g., batch of digitally-signed matched orders 146) prior to performing 354 the above-described netting operation to determine the net asset amount for each of the plurality of parties (in this example, Parties 1-4).

Figure 7:
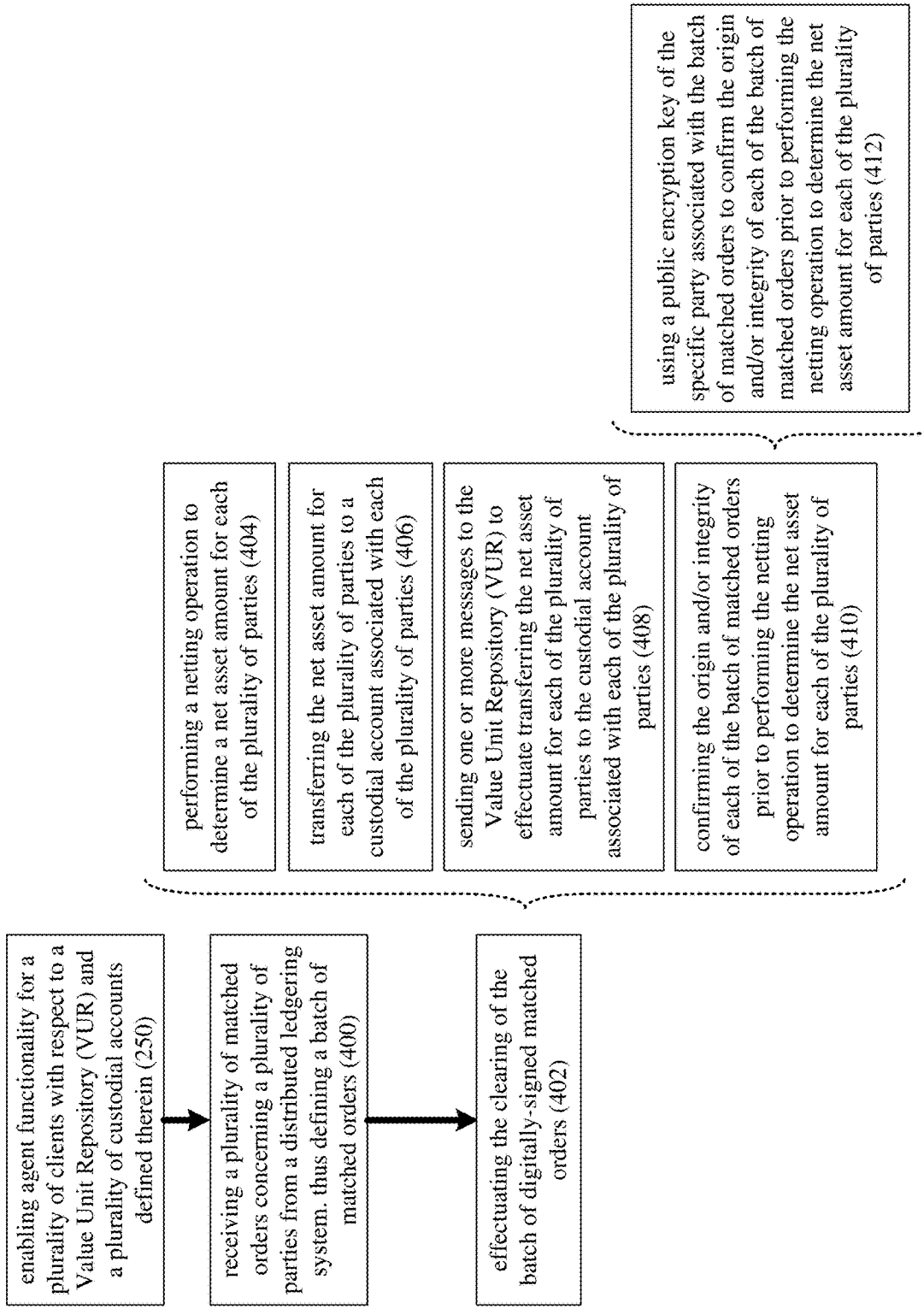
FIG. 7 is a flowchart of another implementation of the trading platform process of FIG. 1 according to an embodiment of the present disclosure.

Referring to FIG. 7, trading platform process 10 may be configured to effectuate a clearing platform (e.g., clearing platform 126).

As discussed above, trading platform process 10 may further be configured to enable 250 agent functionality for a plurality of clients (e.g., first party 114 and second party 116) with respect to a Value Unit Repository (e.g., value unit repository 112) and a plurality of custodial accounts defined therein (e.g. trading account 118, transfer account 120, trading account 122, and transfer account 124).

Assume for this example that trading platform process 10 may be configured to receive 400 a plurality of matched orders concerning a plurality of parties (e.g. market participants 104) from a distributed ledgering system (e.g., distributed ledgering system 148), thus defining a batch of matched orders (e.g., batch of matched orders 144). Batch of matched orders 144 may be a group of orders that were matched amongst a plurality of parties (e.g. market participants 104). An example of distributed ledgering system 148 may include but is not limited to a blockchain distributed ledgering system. Accordingly, the batch of matched orders (e.g., batch of matched orders 144) may have been previously memorialized upon distributed ledgering system 148.

Trading platform process 10 may further be configured to effectuate 402 the clearing of the batch of matched orders (e.g., batch of matched orders 144), which may include performing 404 a netting operation to determine a net asset amount for each of the plurality of parties (e.g. market participants 104). When effectuating 402 the clearing of the batch of matched orders (e.g., batch of matched orders 144), trading platform process 10 may transfer 406 the net asset amount for each of the plurality of parties (e.g. market participants 104) to a custodial account associated with each of the plurality of parties (e.g. market participants 104).

For ease of illustration, assume that the same unmatched orders were received 200 by trading platform process 10:

| Order # | Party | Order Type | Asset | Quantity | Amount |
| --- | --- | --- | --- | --- | --- |
| 1 | Party 1 | Sell | Bitcoin | 100 | $4,000 per |
| 2 | Party 2 | Buy | Bitcoin | 100 | $4,000 per |
| 3 | Party 3 | Sell | Bitcoin | 50 | $3,900 per |
| 4 | Party 1 | Buy | Bitcoin | 50 | $3,900 per |
| 5 | Party 4 | Sell | Bitcoin | 200 | $3,850 per |
| 6 | Party 1 | Buy | Bitcoin | 200 | $3,850 per |

As discussed above, effectuating 402 the clearing of the batch of matched orders (e.g., batch of matched orders 144) may include performing 404 a netting operation to determine a net asset amount for each of the plurality of parties (in this example, Parties 1-4).

As discussed above and when performing 404 the netting operation to determine a net asset amount for each of the plurality of parties (in this example, Parties 1-4), the following amounts will be determined:

For PARTY 1:
i. Bitcoin Net Asset Amount: +150 Bitcoin.
ii. USD Net Asset Amount: −$565,000.
For PARTY 2:
i. Bitcoin Net Asset Amount: +100 Bitcoin.
ii. USD Net Asset Amount: −$400,000.
For PARTY 3:
i. Bitcoin Net Asset Amount: −50 Bitcoin.
ii. USD Net Asset Amount: +$195,000.
For PARTY 4:
i. Bitcoin Net Asset Amount: −200 Bitcoin.
ii. USD Net Asset Amount: +$770,000.

Once the above-described net asset amounts are determined, trading platform process 10 may transfer 406 the net asset amount for each of the plurality of parties (in this example, Parties 1-4) to a custodial account associated with each of the plurality of parties (e.g. market participants 104).

For PARTY 1: 150 Bitcoin will be transferred 406 into their trading account while $565,000 will be transferred 406 out of their trading account.
For PARTY 2: 100 Bitcoin will be transferred 406 into their trading account while $400,000 will be transferred 406 out of their trading account.
For PARTY 3: 50 Bitcoin will be transferred 406 out of their trading account while $195,000 will be transferred 406 into their trading account.
For PARTY 4: 200 Bitcoin will be transferred 406 out of their trading account while $770,000 will be transferred 406 into their trading account.

In the manner described above, when effectuating 402 the clearing of the batch of matched orders (e.g., batch of matched orders 144), trading platform process 10 may send 408 one or more messages (such as message 136 and/or message 138) to the Value Unit Repository (e.g., value unit repository 112) to effectuate transferring the above-described net asset amount for each of the plurality of parties (in this example, Parties 1-4) to a custodial account associated with each of the plurality of parties (in this example, Parties 1-4).

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly and when effectuating 402 the clearing of the batch of matched orders (e.g., batch of matched orders 144), trading platform process 10 may send one or more messages to clearing & funding agent 128 so that clearing & funding agent 128 may send 408 one or more messages to value unit repository 112 requesting transfer of the above-described net asset amounts.

If the batch of matched orders (e.g., batch of matched orders 144) are digitally-signed, when effectuating 402 the clearing of the batch of matched orders (e.g., batch of matched orders 144), trading platform process 10 may confirm 410 the origin and/or integrity of each of the batch of matched orders (e.g., batch of matched orders 144) prior to performing 404 the above-described netting operation to determine the net asset amount for each of the plurality of parties (in this example, Parties 1-4).

If digitally-signed, each of the batch of matched orders (e.g., batch of matched orders 144) may have been encrypted using a private encryption key of a specific party associated with the batch of matched orders (e.g., batch of matched orders 144). Accordingly, confirming 410 the origin and/or integrity of each of the batch of matched orders (e.g., batch of matched orders 144) prior to performing 404 the above-described netting operation to determine a net asset amount for each of the plurality of parties (in this example, Parties 1-4) may include using 412 a public encryption key of the specific party associated with the batch of matched orders (e.g., batch of matched orders 144) to confirm the origin and/or integrity of each of the batch of matched orders (e.g., batch of matched orders 144) prior to performing 404 the above-described netting operation to determine the net asset amount for each of the plurality of parties (in this example, Parties 1-4).

Figure 8:
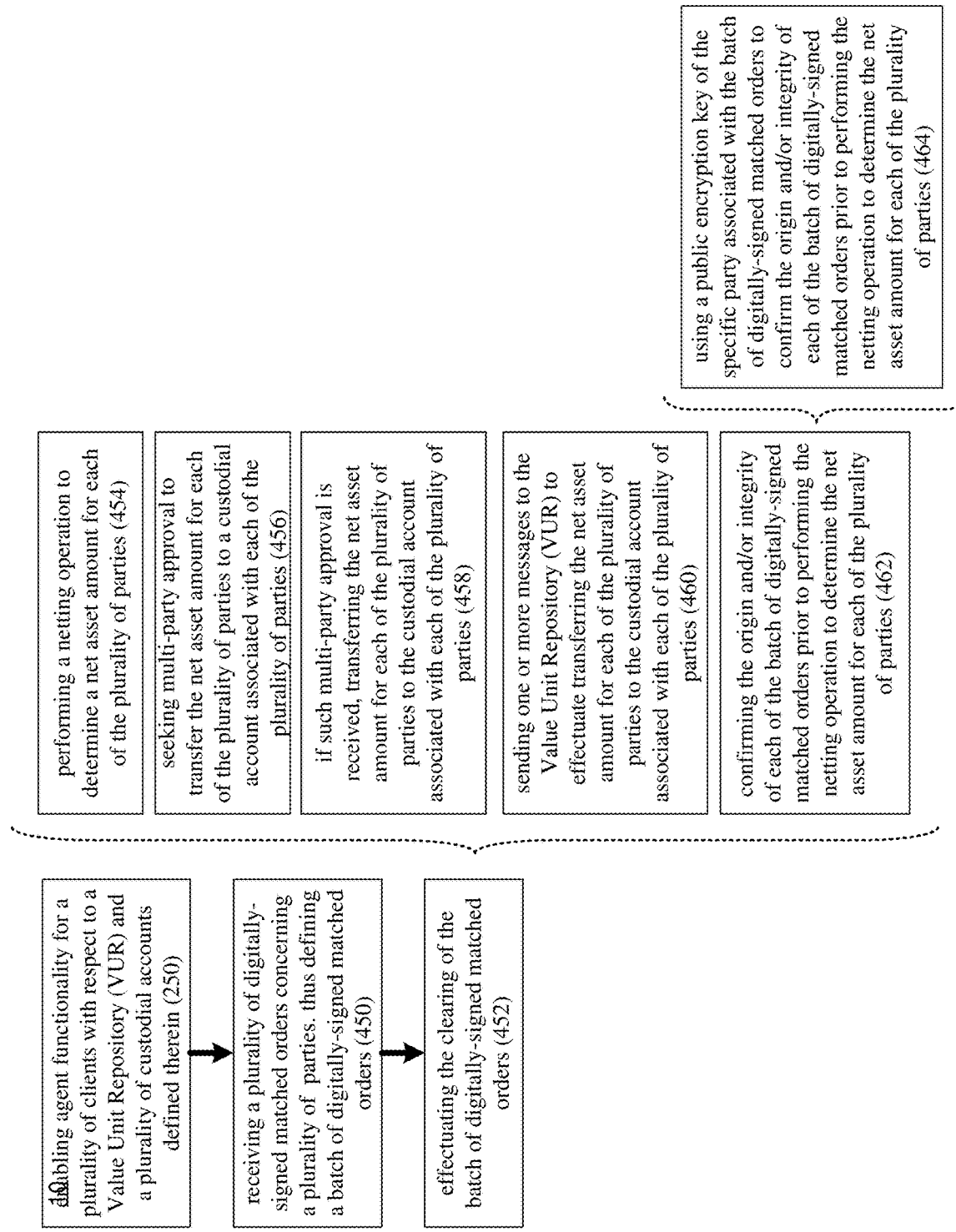
FIG. 8 is a flowchart of another implementation of the trading platform process of FIG. 1 according to an embodiment of the present disclosure.

Referring to FIG. 8, trading platform process 10 may be configured to effectuate a clearing platform (e.g., clearing platform 126).

As discussed above, trading platform process 10 may further be configured to enable 250 agent functionality for a plurality of clients (e.g., first party 114 and second party 116) with respect to a Value Unit Repository (e.g., value unit repository 112) and a plurality of custodial accounts defined therein (e.g. trading account 118, transfer account 120, trading account 122, and transfer account 124).

Assume for this example that trading platform process 10 may be configured to receive 450 a plurality of digitally-signed matched orders concerning a plurality of parties (e.g. market participants 104), thus defining a batch of digitally-signed matched orders (e.g., batch of digitally-signed matched orders 146). Batch of digitally-signed matched orders 146 may be a group of orders that were matched amongst a plurality of parties (e.g. market participants 104).

Trading platform process 10 may further be configured to effectuate 452 the clearing of the batch of digitally-signed matched orders (e.g., batch of digitally-signed matched orders 146), which may include performing 454 a netting operation to determine a net asset amount for each of the plurality of parties (e.g. market participants 104). When effectuating 452 the clearing of the batch of digitally-signed matched orders (e.g., batch of digitally-signed matched orders 146), trading platform process 10 may seek 456 multi-party approval to transferring the net asset amount for each of the plurality of parties (e.g. market participants 104) to a custodial account associated with each of the plurality of parties (e.g. market participants 104).

If such multi-party approval is received, trading platform process 10 may transfer 458 the net asset amount for each of the plurality of parties (e.g. market participants 104) to a custodial account associated with each of the plurality of parties (e.g. market participants 104).

For ease of illustration, assume that the same unmatched orders were received 200 by trading platform process 10:

| Order # | Party   | Order Type | Asset   | Quantity | Amount      |
|---------|---------|------------|---------|----------|-------------|
| 1       | Party 1 | Sell       | Bitcoin | 100      | $4,000 per  |
| 2       | Party 2 | Buy        | Bitcoin | 100      | $4,000 per  |
| 3       | Party 3 | Sell       | Bitcoin | 50       | $3,900 per  |
| 4       | Party 1 | Buy        | Bitcoin | 50       | $3,900 per  |
| 5       | Party 4 | Sell       | Bitcoin | 200      | $3,850 per  |
| 6       | Party 1 | Buy        | Bitcoin | 200      | $3,850 per  |

As discussed above, effectuating 452 the clearing of the batch of digitally-signed matched orders (e.g., batch of digitally-signed matched orders 146) may include performing 454 a netting operation to determine a net asset amount for each of the plurality of parties (in this example, Parties 1-4).

As discussed above and when performing 454 the netting operation to determine a net asset amount for each of the plurality of parties (in this example, Parties 1-4), the following amounts will be determined:

For PARTY 1:
i. Bitcoin Net Asset Amount: +150 Bitcoin.
ii. USD Net Asset Amount: −$565,000.
For PARTY 2:
i. Bitcoin Net Asset Amount: +100 Bitcoin.
ii. USD Net Asset Amount: −$400,000.
For PARTY 3:
i. Bitcoin Net Asset Amount: −50 Bitcoin.
ii. USD Net Asset Amount: +$195,000.
For PARTY 4:
i. Bitcoin Net Asset Amount: −200 Bitcoin.
ii. USD Net Asset Amount: +$770,000.

Once the above-described net asset amounts are determined, trading platform process 10 may seek 456 multi-party approval to transfer the net asset amount for each of the plurality of parties (e.g. market participants 104) to a custodial account associated with each of the plurality of parties (e.g. market participants 104).

For example and in order to provide a higher level of security, trading platform process 10 may seek 456 approval from a plurality of parties. As discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly, trading platform process 10 may seek 456 approval from such a clearing & funding agent (e.g., clearing & funding agent 128). Additionally/alternatively, trading platform process 10 may seek 456 approval from the appropriate trading platform (e.g. one or more of trading platforms 106). Further still, trading platform process 10 may seek 456 approval from one or more of the plurality of parties (e.g. market participants 104). For example, the owner of a custodial account defined within value unit repository 112 may be required to provide authorization prior to assets being transferred into (and/or transferred out of) the subject custodial account.

Assuming such multi-party approval is received, trading platform process 10 may transfer 458 the net asset amount for each of the plurality of parties (in this example, Parties 1-4) to a custodial account associated with each of the plurality of parties (e.g. market participants 104).

For PARTY 1: 150 Bitcoin will be transferred 458 into their trading account while $565,000 will be transferred 458 out of their trading account.
For PARTY 2: 100 Bitcoin will be transferred 458 into their trading account while $400,000 will be transferred 458 out of their trading account.
For PARTY 3: 50 Bitcoin will be transferred 458 out of their trading account while $195,000 will be transferred 458 into their trading account.
For PARTY 4: 200 Bitcoin will be transferred 458 out of their trading account while $770,000 will be transferred 458 into their trading account.

In the manner described above, when effectuating 452 the clearing of the batch of digitally-signed matched orders (e.g., batch of digitally-signed matched orders 146), trading platform process 10 may send 460 one or more messages (such as message 136 and/or message 138) to the Value Unit Repository (e.g., value unit repository 112) to effectuate transferring the above-described net asset amount for each of the plurality of parties (in this example, Parties 1-4) to a custodial account associated with each of the plurality of parties (in this example, Parties 1-4).

Further and when effectuating 452 the clearing of the batch of digitally-signed matched orders (e.g., batch of digitally-signed matched orders 146), trading platform process 10 may send one or more messages to clearing & funding agent 128 so that clearing & funding agent 128 may send 460 one or more messages to value unit repository 112 requesting transfer of the above-described net asset amounts.

Further and when effectuating 452 the clearing of the batch of digitally-signed matched orders (e.g., batch of digitally-signed matched orders 146), trading platform process 10 may confirm 462 the origin and/or integrity of each of the batch of digitally-signed matched orders (e.g., batch of digitally-signed matched orders 146) prior to performing 454 the above-described netting operation to determine the net asset amount for each of the plurality of parties (in this example, Parties 1-4).

Continuing with the above-stated example, confirming 462 the origin and/or integrity of each of the batch of digitally-signed matched orders (e.g., batch of digitally-signed matched orders 146) prior to performing 454 the above-described netting operation to determine a net asset amount for each of the plurality of parties (in this example, Parties 1-4) may include using 464 a public encryption key of the specific party associated with the batch of digitally-signed matched orders (e.g., batch of digitally-signed matched orders 146) to confirm the origin and/or integrity of each of the batch of digitally-signed matched orders (e.g., batch of digitally-signed matched orders 146) prior to performing 454 the above-described netting operation to determine the net asset amount for each of the plurality of parties (in this example, Parties 1-4).

Figure 9:
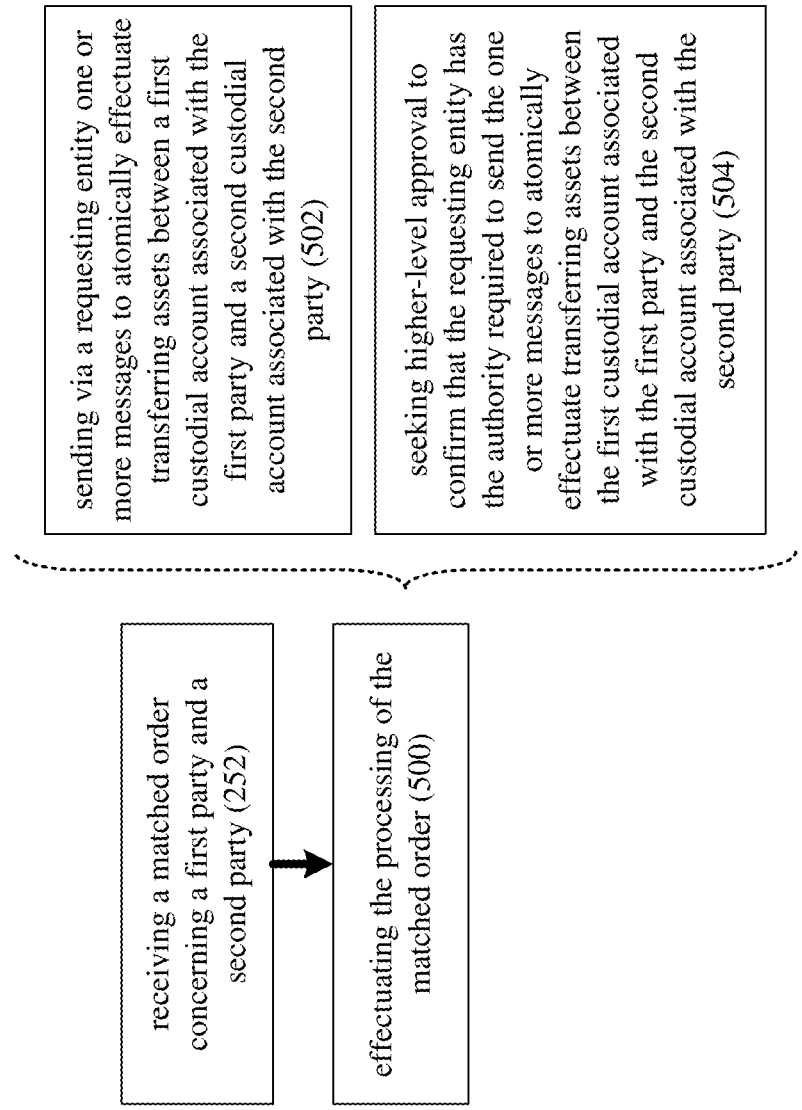
FIG. 9 is a flowchart of another implementation of the trading platform process of FIG. 1 according to an embodiment of the present disclosure.

Referring to FIG. 9, trading platform process 10 may be configured to effectuate a trading platform (e.g., one or more of trading platforms 106).

Continuing with the above-stated example in which trading platform process 10 matched order 130 from first party 114 and order 132 from second party 116 for a quantity of bearer financial assets (e.g. 100 Bitcoin tokens at $4,000 each), trading platform process 10 may receive 252 a matched order concerning a first party and a second party (e.g., matched order 134, which is the combination of order 130 from first party 114 and order 132 from second party 116).

As discussed above, matched order 134 may concern a bearer financial asset, such as a cryptocurrency; a fiat currency; and a physical asset. For example, matched order 134 may concern: a quantity of a cryptocurrency owned by first party 114 and a quantity of a fiat currency owned by second party 116; a quantity of a cryptocurrency owned by first party 114 and a quantity of a precious metal owned by second party 116, and/or a quantity of a first cryptocurrency owned by first party 114 and a quantity of a second cryptocurrency owned by second party 116.

Trading platform process 10 may then effectuate 500 the processing of the matched order (e.g., matched order 134) including: sending 502 via a requesting entity one or more messages (such as message 136 and/or message 138) to atomically effectuate transferring assets between a first custodial account (e.g., trading account 118) associated with first party 114 and a second custodial account (e.g., trading account 122) associated with second party 116.

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly, one example of the above-described requesting entity (for sending message 136 and/or message 138) may include but is not limited to the clearing & funding agent (e.g., clearing & funding agent 128).

Specifically and with respect to message 136 and/or message 138 sent 502 by the requesting entity (e.g., clearing & funding agent 128), such messages may request the atomic transferring of assets as follows:
- that $400,000 (i.e., $4,000×100) be transferred from the trading account (e.g., trading account 118) of first party 114 to the trading account (e.g., trading account 122) of second party 116; and
- that 100 Bitcoin tokens be transferred from the trading account (e.g., trading account 122) of second party 116 to the trading account (e.g., trading account 118) of first party 114.

When effectuating 500 the processing of the matched order (e.g., matched order 134), trading platform process 10 may seek 504 higher-level approval to confirm that the requesting entity (e.g., clearing & funding agent 128) has the authority required to send 502 the one or more messages (e.g., message 136 and/or message 138) to atomically effectuate transferring assets between the first custodial account (e.g., trading account 118) associated with first party 114 and the second custodial account (e.g., trading account 122) associated with second party 116.

For example, if the requesting entity was not clearing & funding agent 128 but was ECN 108, trading platform process 10 may seek 504 higher-level approval from e.g., clearing & funding agent 128 to confirm that the requesting entity (e.g., ECN 108) has the authority required to send 502 the one or more messages (e.g., message 136 and/or message 138) to atomically effectuate transferring assets between the first custodial account (e.g., trading account 118) associated with first party 114 and the second custodial account (e.g., trading account 122) associated with second party 116.

In the event that the requesting entity has the authority required to send 502 e.g., message 136 and/or message 138, trading platform process 10 may atomically transfer:
- $400,000 (i.e., $4,000×100) from the trading account (e.g., trading account 118) of first party 114 to the trading account (e.g., trading account 122) of second party 116; and
- 100 Bitcoin tokens from the trading account (e.g., trading account 122) of second party 116 to the trading account (e.g., trading account 118) of first party 114.

Figure 10:
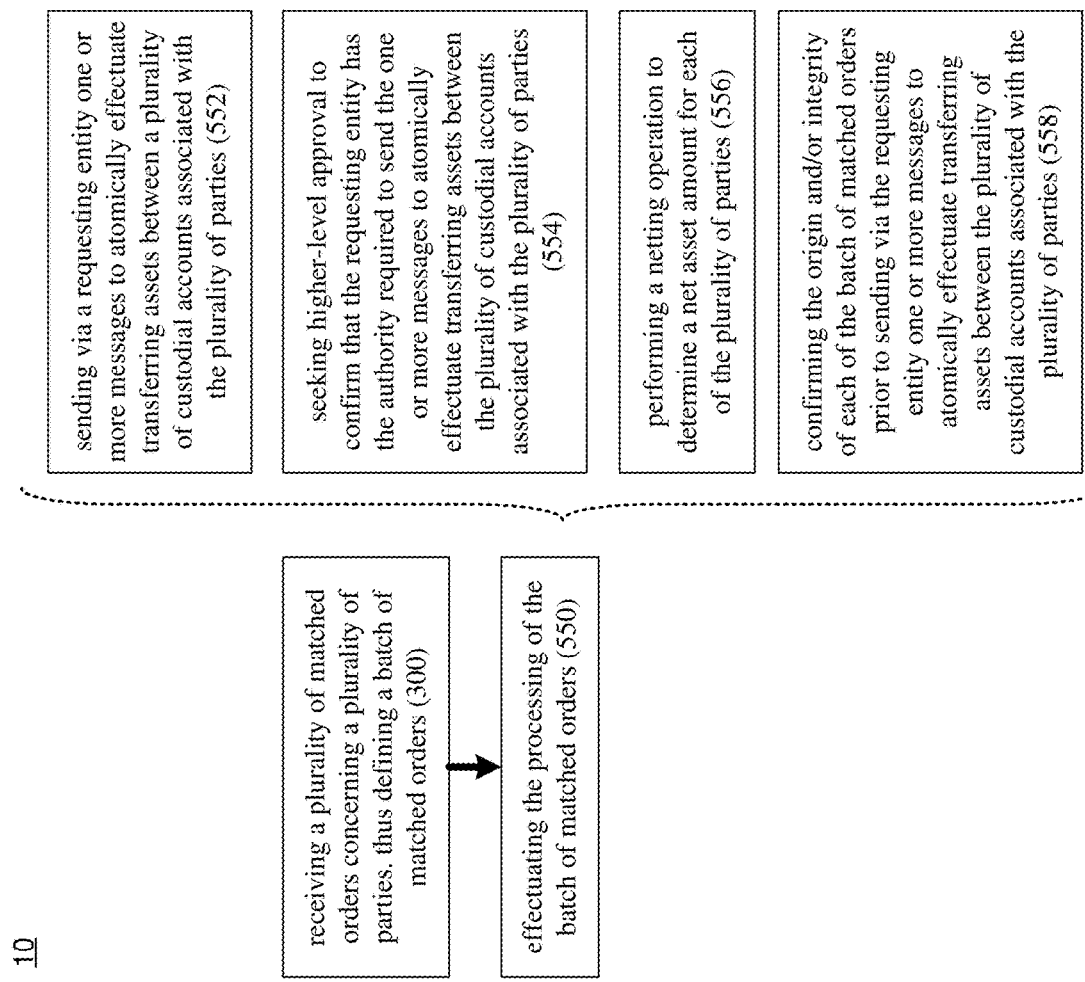
FIG. 10 is a flowchart of another implementation of the trading platform process of FIG. 1 according to an embodiment of the present disclosure.

Referring to FIG. 10, trading platform process 10 may be configured to effectuate a trading platform (e.g., one or more of trading platforms 106).

Continuing with the above-stated example, trading platform process 10 may receive 300 a plurality of matched orders concerning a plurality of parties (e.g. market participants 104), thus defining a batch of matched orders (e.g., batch of matched orders 144).

As discussed above, batch of matched orders 144 may concern a bearer financial asset, such as a cryptocurrency; a fiat currency; and a physical asset. For example, batch of matched orders 144 may concern: a quantity of a cryptocurrency owned by first party 114 and a quantity of a fiat currency owned by second party 116; a quantity of a cryptocurrency owned by first party 114 and a quantity of a precious metal owned by second party 116, and/or a quantity of a first cryptocurrency owned by first party 114 and a quantity of a second cryptocurrency owned by second party 116.

Trading platform process 10 may then effectuate 550 the processing of the batch of matched orders (e.g., batch of matched orders 144) including sending 552 via a requesting entity one or more messages (such as message 136 and/or message 138) to atomically effectuate transferring assets between a plurality of custodial accounts associated with the plurality of parties (in this example, Parties 1-4).

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly, one example of the above-described requesting entity (for sending message 136 and/or message 138) may include but is not limited to the clearing & funding agent (e.g., clearing & funding agent 128).

Continuing with the above-stated example and with respect to message 136 and/or message 138 sent 552 by the requesting entity (e.g., clearing & funding agent 128), such messages may request the atomic transferring of assets as follows:
- For PARTY 1: that 150 Bitcoin be transferred into their trading account while $565,000 be transferred out of their trading account.
- For PARTY 2: that 100 Bitcoin be transferred into their trading account while $400,000 be transferred out of their trading account.
- For PARTY 3: that 50 Bitcoin be transferred out of their trading account while $195,000 be transferred into their trading account.
- For PARTY 4: that 200 Bitcoin be transferred out of their trading account while $770,000 be transferred into their trading account.

When effectuating 550 the processing of the batch of matched orders (e.g., batch of matched orders 144), trading platform process 10 may seek 554 higher-level approval to confirm that the requesting entity (e.g., clearing & funding agent 128) has the authority required to send 552 the one or more messages (e.g., message 136 and/or message 138) to atomically effectuate transferring assets between a plurality of custodial accounts associated with the plurality of parties (in this example, Parties 1-4).

For example, if the requesting entity was not clearing & funding agent 128 but was ECN 108, trading platform process 10 may seek 554 higher-level approval from e.g., clearing & funding agent 128 to confirm that the requesting entity (e.g., ECN 108) has the authority required to send 552 the one or more messages (e.g., message 136 and/or message 138) to atomically effectuate transferring assets between a plurality of custodial accounts associated with the plurality of parties (in this example, Parties 1-4).

In the event that the requesting entity has the authority required to send 552 e.g., message 136 and/or message 138, trading platform process 10 may perform 556 a netting operation (as discussed above) to determine a net asset amount for each of the plurality of parties (in this example, Parties 1-4) and trading platform process 10 may atomically transfer:

For PARTY 1: 150 Bitcoin into their trading account and $565,000 out of their trading account.

For PARTY 2: 100 Bitcoin into their trading account and $400,000 out of their trading account.

For PARTY 3: 50 Bitcoin out of their trading account and $195,000 into their trading account.

For PARTY 4: 200 Bitcoin out of their trading account and $770,000 into their trading account.

Further and when effectuating 550 the processing of the batch of matched orders (e.g., batch of matched orders 144), trading platform process 10 may confirm 558 the origin and/or integrity of each of the batch of matched orders (e.g., batch of matched orders 144) prior to sending 552 via the requesting entity one or more messages (e.g., message 136 and/or message 138) to atomically effectuate transferring assets between the plurality of custodial accounts associated with the plurality of parties (in this example, Parties 1-4).

Figure 11:
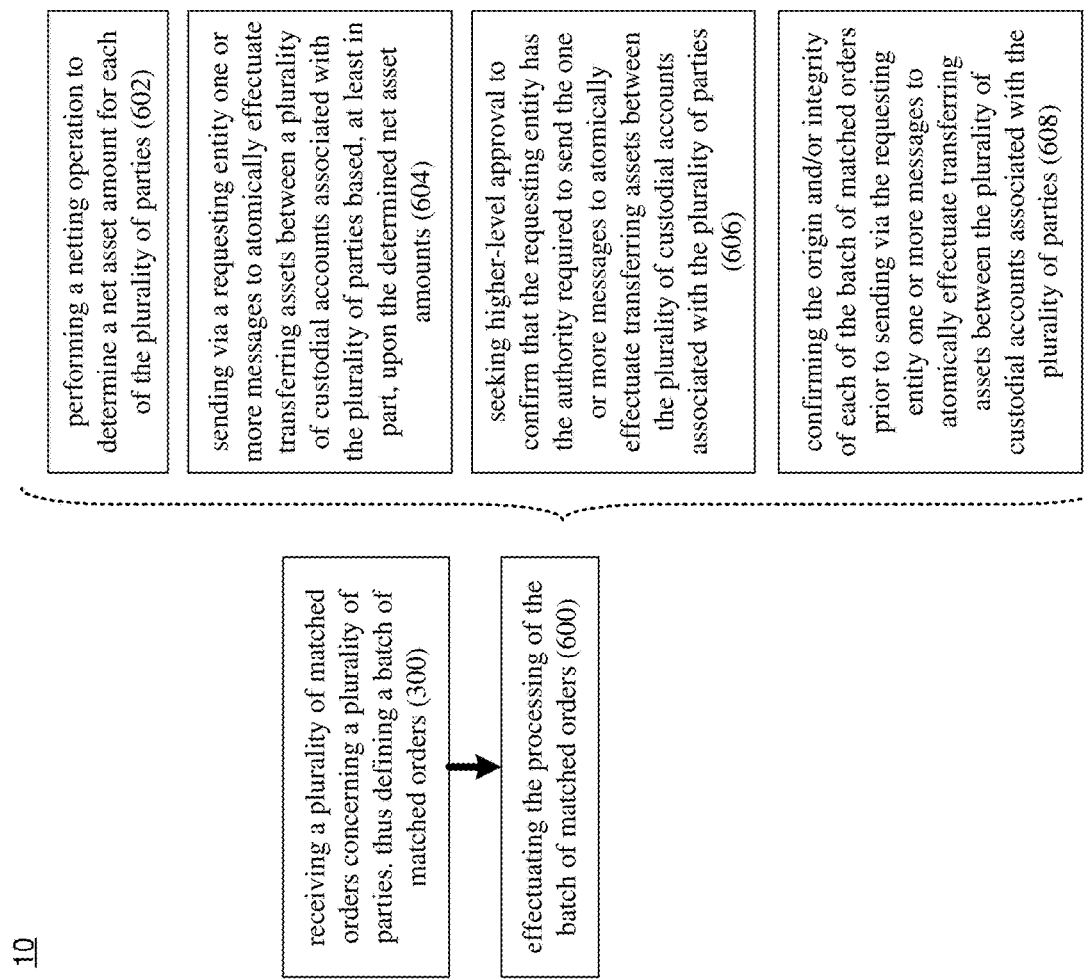
FIG. 11 is a flowchart of another implementation of the trading platform process of FIG. 1 according to an embodiment of the present disclosure.

As discussed above, each of the batch of matched orders (e.g., batch of matched orders 144) may have been encrypted using a private encryption key of a specific party associated with the batch of matched orders (e.g., batch of matched orders 144). In such a situation, a public encryption key of the specific party associated with the batch of matched orders (e.g., batch of matched orders 144) may be used to confirm the origin and/or integrity of each of the batch of matched orders (e.g., batch of matched orders 144) prior to sending 552 via the requesting entity one or more messages (e.g., message 136 and/or message 138) to atomically effectuate transferring assets between the plurality of custodial accounts associated with the plurality of parties (in this example, Parties 1-4), Referring to FIG. 11, trading platform process 10 may be configured to effectuate a trading platform (e.g., one or more of trading platforms 106).

Continuing with the above-stated example, trading platform process 10 may receive 300 a plurality of matched orders concerning a plurality of parties (e.g. market participants 104), thus defining a batch of matched orders (e.g., batch of matched orders 144).

As discussed above, batch of matched orders 144 may concern a bearer financial asset, such as a cryptocurrency; a fiat currency; and a physical asset. For example, batch of matched orders 144 may concern: a quantity of a cryptocurrency owned by first party 114 and a quantity of a fiat currency owned by second party 116; a quantity of a cryptocurrency owned by first party 114 and a quantity of a precious metal owned by second party 116, and/or a quantity of a first cryptocurrency owned by first party 114 and a quantity of a second cryptocurrency owned by second party 116.

Trading platform process 10 may then effectuate 600 the processing of the batch of matched orders (e.g., batch of matched orders 144) including performing 602 a netting operation (as discussed above) to determine a net asset amount for each of the plurality of parties (in this example, Parties 1-4).

When effectuating 600 the processing of the batch of matched orders (e.g., batch of matched orders 144), trading platform process 10 may send 604 via a requesting entity one or more messages (such as message 136 and/or message 138) to atomically effectuate transferring assets between a plurality of custodial accounts associated with the plurality of parties (in this example, Parties 1-4).

Again and as discussed above, trading system 100 may be configured to include and/or interface with a clearing & funding agent (e.g., clearing & funding agent 128) to enable trading system 100 and/or one or more of trading platforms 106 to act as an agent for clearing platform 126 and/or the various accounts defined within value unit repository 112 (e.g. trading account 118, transfer account 120, trading account 122, and transfer account 124). Accordingly, one example of the above-described requesting entity (for sending message 136 and/or message 138) may include but is not limited to the clearing & funding agent (e.g., clearing & funding agent 128).

Continuing with the above-stated example and with respect to message 136 and/or message 138 sent 604 by the requesting entity (e.g., clearing & funding agent 128), such messages may request the atomic transferring of assets as follows:

For PARTY 1: that 150 Bitcoin be transferred into their trading account while $565,000 be transferred out of their trading account.

For PARTY 2: that 100 Bitcoin be transferred into their trading account while $400,000 be transferred out of their trading account.

For PARTY 3: that 50 Bitcoin be transferred out of their trading account while $195,000 be transferred into their trading account.

For PARTY 4: that 200 Bitcoin be transferred out of their trading account while $770,000 be transferred into their trading account.

When effectuating 600 the processing of the batch of matched orders (e.g., batch of matched orders 144), trading platform process 10 may seek 606 higher-level approval to confirm that the requesting entity (e.g., clearing & funding agent 128) has the authority required to send 604 the one or more messages (e.g., message 136 and/or message 138) to atomically effectuate transferring assets between a plurality of custodial accounts associated with the plurality of parties (in this example, Parties 1-4).

For example, if the requesting entity was not clearing & funding agent 128 but was ECN 108, trading platform process 10 may seek 606 higher-level approval from e.g., clearing & funding agent 128 to confirm that the requesting entity (e.g., ECN 108) has the authority required to send 604 the one or more messages (e.g., message 136 and/or message 138) to atomically effectuate transferring assets between a plurality of custodial accounts associated with the plurality of parties (in this example, Parties 1-4).

In the event that the requesting entity has the authority required to send 604 e.g., message 136 and/or message 138, trading platform process 10 may atomically transfer:

For PARTY 1: 150 Bitcoin into their trading account and $565,000 out of their trading account.

For PARTY 2: 100 Bitcoin into their trading account and $400,000 out of their trading account.

For PARTY 3: 50 Bitcoin out of their trading account and $195,000 into their trading account.

For PARTY 4: 200 Bitcoin out of their trading account and $770,000 into their trading account.

Further and when effectuating 600 the processing of the batch of matched orders (e.g., batch of matched orders 144), trading platform process 10 may confirm 608 the origin and/or integrity of each of the batch of matched orders (e.g., batch of matched orders 144) prior to sending 604 via the requesting entity one or more messages (e.g., message 136 and/or message 138) to atomically effectuate transferring assets between the plurality of custodial accounts associated with the plurality of parties (in this example, Parties 1-4).

As discussed above, each of the batch of matched orders (e.g., batch of matched orders 144) may have been encrypted using a private encryption key of a specific party associated with the batch of matched orders (e.g., batch of matched orders 144). In such a situation, a public encryption key of the specific party associated with the batch of matched orders (e.g., batch of matched orders 144) may be used to confirm 608 the origin and/or integrity of each of the batch of matched orders (e.g., batch of matched orders 144) prior to sending 604 via the requesting entity one or more messages (e.g., message 136 and/or message 138) to atomically effectuate transferring assets between the plurality of custodial accounts associated with the plurality of parties (in this example, Parties 1-4).

Figure 12:
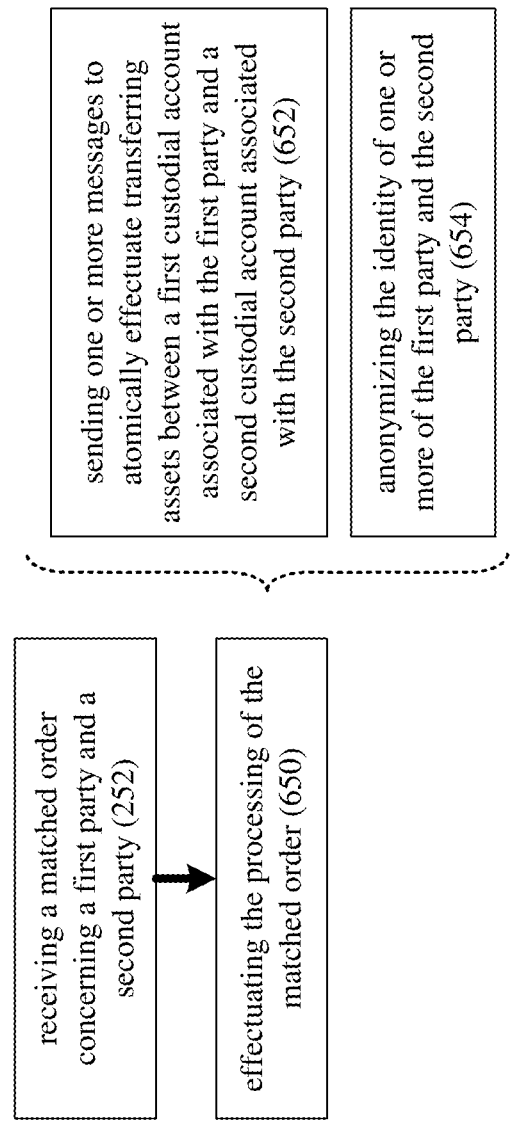
FIG. 12 is a flowchart of another implementation of the trading platform process of FIG. 1 according to an embodiment of the present disclosure.

Referring to FIG. 12, trading platform process 10 may be configured to effectuate a trading platform (e.g., one or more of trading platforms 106).

Continuing with the above-stated example in which trading platform process 10 matched order 130 from first party 114 and order 132 from second party 116 for a quantity of bearer financial assets (e.g. 100 Bitcoin tokens at $4,000 each), trading platform process 10 may receive 252 a matched order concerning a first party and a second party (e.g., matched order 134, which is the combination of order 130 from first party 114 and order 132 from second party 116).

As discussed above, matched order 134 may concern a bearer financial asset, such as a cryptocurrency; a fiat currency; and a physical asset. For example, matched order 134 may concern: a quantity of a cryptocurrency owned by first party 114 and a quantity of a fiat currency owned by second party 116; a quantity of a cryptocurrency owned by first party 114 and a quantity of a precious metal owned by second party 116, and/or a quantity of a first cryptocurrency owned by first party 114 and a quantity of a second cryptocurrency owned by second party 116.

Trading platform process 10 may then effectuate 650 the processing of the matched order (e.g., matched order 134) including sending 652 one or more messages (such as message 136 and/or message 138) to atomically effectuate transferring assets between a first custodial account (e.g., trading account 118) associated with first party 114 and a second custodial account (e.g., trading account 122) associated with second party 116.

As discussed above, the first custodial account (e.g., trading account 118) and the second custodial account (e.g., trading account 122) may be defined within a Value Unit Repository (e.g., value unit repository 112), wherein examples of value unit repository 112 may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102). As discussed above, Value Unit Repository (e.g., value unit repository 112) may be configured to enable the transfer of assets between a first custodial account (e.g., trading account 118) associated with first party 114 and a second custodial account (e.g., trading account 122) associated with second party 116.

When effectuating 650 the processing of the matched order (e.g., matched order 134), trading platform process 10 may anonymize 654 the identity of one or more of first party 114 and second party 116. For example, anonymizing 654 the identity of one or more of first party 114 and second party 116 may result in one or more of: first party 114 not knowing the identity of second party 116; second party 116 not knowing the identity of first party 114; and the general public not knowing the identity of first party 114 or second party 116.

In prior art/traditional systems, a prime broker (e.g., a clearing entity) may have provided anonymity for the parties to a transaction by listing themselves as the acting parties. So if a first client had an account through Citibank and a second client had an account through Barclays, the trade may be listed as having occurred between Barclays and Citibank (thus providing anonymity for the actual owners of the assets). However and in this embodiment, trading platform process 10 may anonymize 654 the identity of the parties of a trade by executing the trade without reporting the names of the parties to the trade. While the identities of the parties of the trade are known to value unit repository 112 (as required by law), this information is not provided to the general public.

Figure 13:
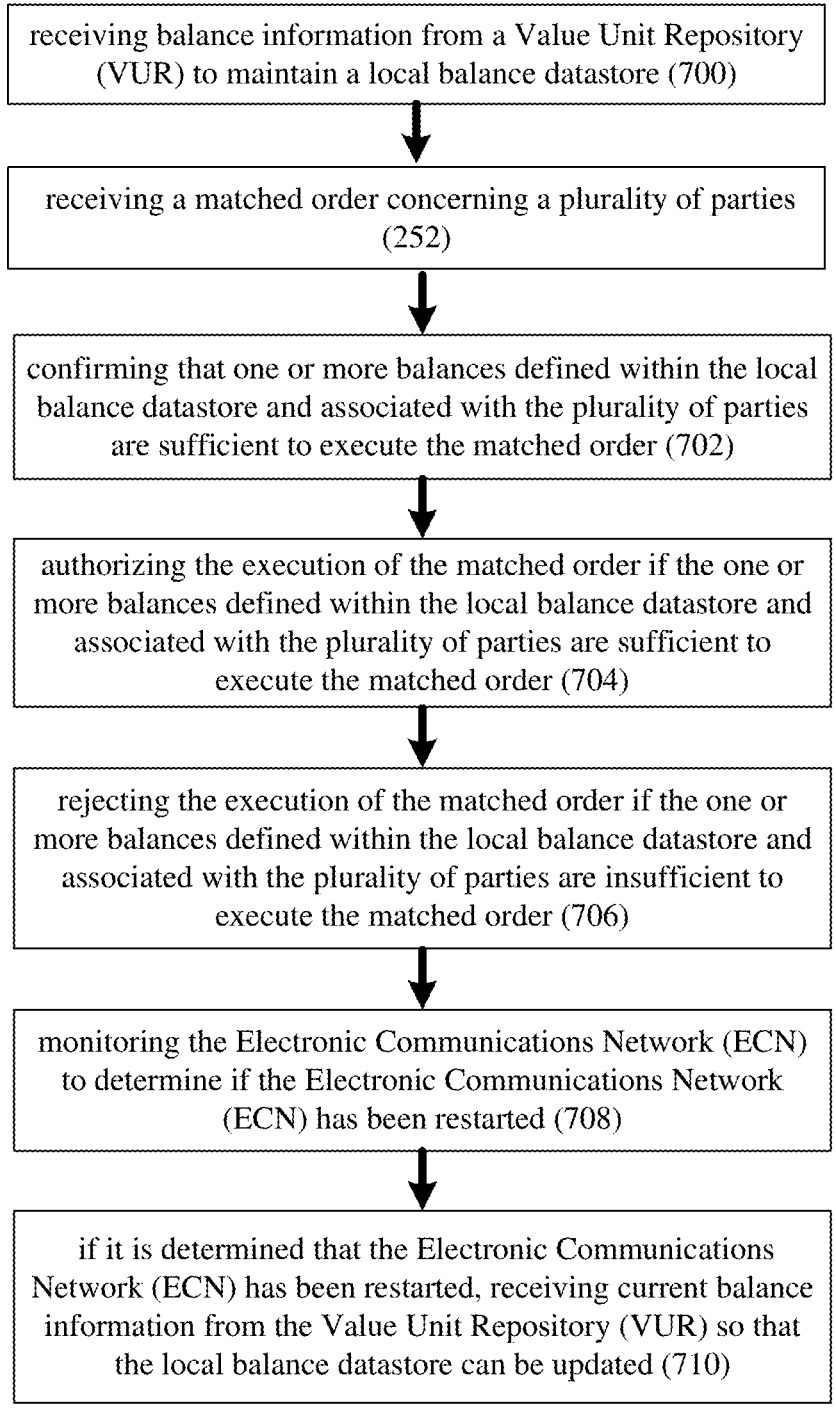
FIG. 13 is a flowchart of another implementation of the trading platform process of FIG. 1 according to an embodiment of the present disclosure.

Referring to FIG. 13, trading platform process 10 may be configured to effectuate a trading platform (e.g., one or more of trading platforms 106).

As discussed above, trading system 100 may be configured to interface with one or more value unit repositories (e.g., value unit repository 112), examples of which may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102). As also discussed above, value unit repository 112 may include transfer accounts (e.g. transfer account 120 and/or transfer account 124) and trading accounts (e.g. trading account 118 and/or trading account 122).

Trading platform process 10 may be configured to receive 700 balance information (e.g., balance information 150) from a Value Unit Repository (e.g., value unit repository 112) to maintain local balance datastore 152. For example, balance information 150 may define the balances associated within each of the transfer accounts (e.g. transfer account 120 and/or transfer account 124) and each of the trading accounts (e.g. trading account 118 and/or trading account 122).

As discussed above, matched orders may concern a bearer financial asset, such as a cryptocurrency (e.g., Bitcoin tokens); a fiat currency (e.g., US Dollars); and a physical asset (e.g., ounces of gold). Accordingly, the balance information (e.g., balance information 150) and the local balance datastore (e.g., local balance datastore 152) concerning the trading accounts (e.g. trading account 118 and/or trading account 122) and the transfer accounts (e.g. transfer account 120 and/or transfer account 124) may define a plurality of quantities, such as a quantity of cryptocurrency (e.g., the number of Bitcoin tokens included within an account); a quantity of fiat currency (e.g., the number of US Dollars included within an account); a quantity of precious metals (e.g., the number of ounces of gold included within an account); and a quantity of another unit of value.

Continuing with the above-stated example in which trading platform process 10 matched order 130 from first party 114 and order 132 from second party 116 for a quantity of bearer financial assets (e.g. 100 Bitcoin tokens at $4,000 each), trading platform process 10 may receive 252 a matched order concerning a plurality of parties (e.g., matched order 134, which is the combination of order 130 from first party 114 and order 132 from second party 116).

Further, trading platform process 10 may confirm 702 that one or more balances defined within local balance datastore 152 and associated with the plurality of parties (e.g., first party 114 and second party 116) are sufficient to execute the matched order (e.g., matched order 134).

Specifically and in order for matched order 134 to be successfully processed/executed by trading platform process 10: a) $400,000 (i.e., $4,000×100) needs to be in trading account 118 (of first party 114) so that it may be transferred to trading account 122 (of second party 116); and 100 Bitcoin tokens need to be in trading account 122 (of second party 116) so that they may be transferred to trading account 118 (of first party 114).

Accordingly and when confirming 702 that one or more balances defined within local balance datastore 152 and associated with the plurality of parties (e.g., first party 114 and second party 116) are sufficient to execute the matched order (e.g., matched order 134), trading platform process 10 may confirm 702 that trading account 118 has a balance of $400,000 and that trading account 122 has a balance of 100 Bitcoin tokens.

Trading platform process 10 may authorize 704 the execution of matched order 134 if the one or more balances defined within local balance datastore 152 and associated with the plurality of parties (e.g., first party 114 and second party 116) are sufficient to execute matched order 134. Specifically, trading platform process 10 may authorize 704 the execution of matched order 134 if trading account 118 has a balance of at least $400,000 and trading account 122 has a balance of at least 100 Bitcoin tokens.

Conversely, trading platform process 10 may reject 706 the execution of matched order 134 if the one or more balances defined within local balance datastore 152 and associated with the plurality of parties (e.g., first party 114 and second party 116) are insufficient to execute matched order 134. Specifically, trading platform process 10 may reject 706 the execution of matched order 134 if trading account 118 has a balance of less than $400,000 and/or trading account 122 has a balance of less than 100 Bitcoin tokens.

As discussed above, trading system 100 may be configured to include and/or interface with one or more trading platforms (e.g. trading platforms 106), examples of which may include but are not limited to one or more Electronic Communications (or Crossing) Networks (e.g., ECNs 108) and/or one or more Over-the-Counter Platforms (e.g., OTCs 110). Typically, trading platforms 106 (e.g., ECNs 108 and/or OTCs 110) shut down at (or sometime after) the close of the trading day and restart at (or sometime prior to) the open of the next trading day. Accordingly, trading platform process 10 may monitor 708 the Electronic Communications Network (e.g., ECNs 108) to determine if the Electronic Communications Network (e.g., ECNs 108) has been restarted. If it is determined that the Electronic Communications Network (e.g., ECNs 108) has been restarted, trading platform process 10 may receive 710 current balance information (e.g., balance information 150') from the Value Unit Repository (e.g., value unit repository 112) so that local balance datastore 152 may be updated.

Figure 14:
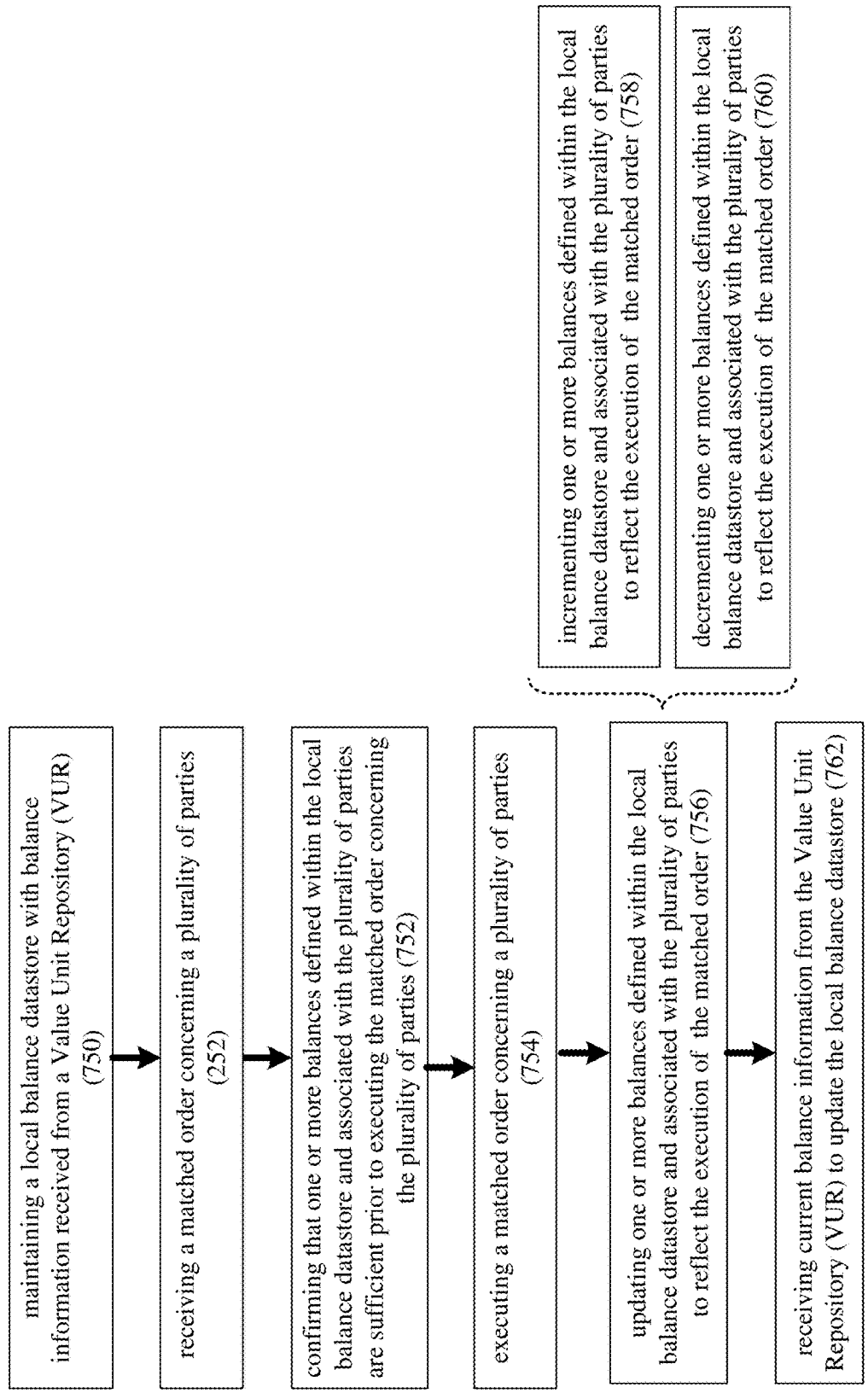
FIG. 14 is a flowchart of another implementation of the trading platform process of FIG. 1 according to an embodiment of the present disclosure.

Referring to FIG. 14, trading platform process 10 may be configured to effectuate a trading platform (e.g., one or more of trading platforms 106).

As discussed above, trading system 100 may be configured to interface with one or more value unit repositories (e.g., value unit repository 112), examples of which may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102). As also discussed above, value unit repository 112 may include transfer accounts (e.g. transfer account 120 and/or transfer account 124) and trading accounts (e.g. trading account 118 and/or trading account 122).

Trading platform process 10 may be configured to maintain 750 local balance datastore 152 with balance information (e.g., balance information 150) received from a Value Unit Repository (e.g., value unit repository 112). For example, balance information 150 may define the balances associated with each of the transfer accounts (e.g. transfer account 120 and/or transfer account 124) and each of the trading accounts (e.g. trading account 118 and/or trading account 122).

As discussed above, matched orders may concern a bearer financial asset, such as a cryptocurrency (e.g., Bitcoin tokens); a fiat currency (e.g., US Dollars); and a physical asset (e.g., ounces of gold). Accordingly, the balance information (e.g., balance information 150) and the local balance datastore (e.g., local balance datastore 152) concerning the trading accounts (e.g. trading account 118 and/or trading account 122) and the transfer accounts (e.g. transfer account 120 and/or transfer account 124) may define a plurality of quantities, such as a quantity of cryptocurrency (e.g., the number of Bitcoin tokens included within an account); a quantity of fiat currency (e.g., the number of US Dollars included within an account); a quantity of precious metals (e.g., the number of ounces of gold included within an account); and a quantity of another unit of value.

Continuing with the above-stated example in which trading platform process 10 matched order 130 from first party 114 and order 132 from second party 116 for a quantity of bearer financial assets (e.g. 100 Bitcoin tokens at $4,000 each), trading platform process 10 may receive 252 a matched order concerning a plurality of parties (e.g., matched order 134, which is the combination of order 130 from first party 114 and order 132 from second party 116).

Further, trading platform process 10 may confirm 752 that one or more balances defined within local balance datastore 152 and associated with the plurality of parties (e.g., first party 114 and second party 116) are sufficient to execute the matched order (e.g., matched order 134).

Specifically and in order for matched order 134 to be successfully processed/executed by trading platform process 10: a) $400,000 (i.e., $4,000×100) needs to be in trading account 118 (of first party 114) so that it may be transferred to trading account 122 (of second party 116); and 100 Bitcoin tokens need to be in trading account 122 (of second party 116) so that they may be transferred to trading account 118 (of first party 114).

Accordingly and when confirming 752 that one or more balances defined within local balance datastore 152 and associated with the plurality of parties (e.g., first party 114 and second party 116) are sufficient to execute the matched order (e.g., matched order 134), trading platform process 10 may confirm 752 that trading account 118 has a balance of at least $400,000 and that trading account 122 has a balance of at least 100 Bitcoin tokens.

If confirmed 752, trading platform process 10 may execute 754 matched order 134 concerning the plurality of parties (e.g., first party 114 and second party 116) and may update 756 one or more balances defined within local balance datastore 152 and associated with the plurality of parties (e.g., first party 114 and second party 116) to reflect the execution 754 of matched order 134.

For example, assume that trading platform process 10 confirms 752 that trading account 118 has a balance of $500,000 and zero Bitcoin tokens and that trading account 122 has a balance of 200 Bitcoin tokens and zero US Dollars. Accordingly, trading platform process 10 may execute 754 matched order 134 concerning the plurality of parties (e.g., first party 114 and second party 116) and may update 756 the one or more balances defined within local balance datastore 152 and associated with the plurality of parties (e.g., first party 114 and second party 116) to reflect the execution 754 of matched order 134 as follows: trading account 118 will have a new balance of $100,000 and 100 Bitcoin tokens and trading account 122 will have a new balance of 100 Bitcoin tokens and $400.000.

When updating 756 one or more balances defined within local balance datastore 152 and associated with the plurality of parties (e.g., first party 114 and second party 116) to reflect the execution of matched order 134, trading platform process 10 may increment 758 and/or may decrement 760 one or more balances defined within local balance datastore 152 and associated with the plurality of parties (e.g., first party 114 and second party 116) to reflect the execution of the matched order.

For example and continuing with the above-stated example in which trading platform process 10 confirms 752 that trading account 118 has a balance of $500,000 and zero Bitcoin tokens and that trading account 122 has a balance of 200 Bitcoin tokens and zero US Dollars, trading platform process 10 may:

decrement 760 trading account 118 by $400,000;
increment 758 trading account 118 by 100 Bitcoin tokens;
decrement 760 trading account 122 by 100 Bitcoin tokens; and
increment 758 trading account 122 by $400,000.

Since (as discussed above), trading platforms 106 (e.g., ECNs 108 and/or OTCs 110) may shut down at (or sometime after) the close of the trading day and restart at (or sometime prior to) the open of the next trading day, trading platform process 10 may receive 762 current balance information (e.g., balance information 150') from the Value Unit Repository (e.g., value unit repository 112) so that local balance datastore 152 may be updated.

Figure 15:
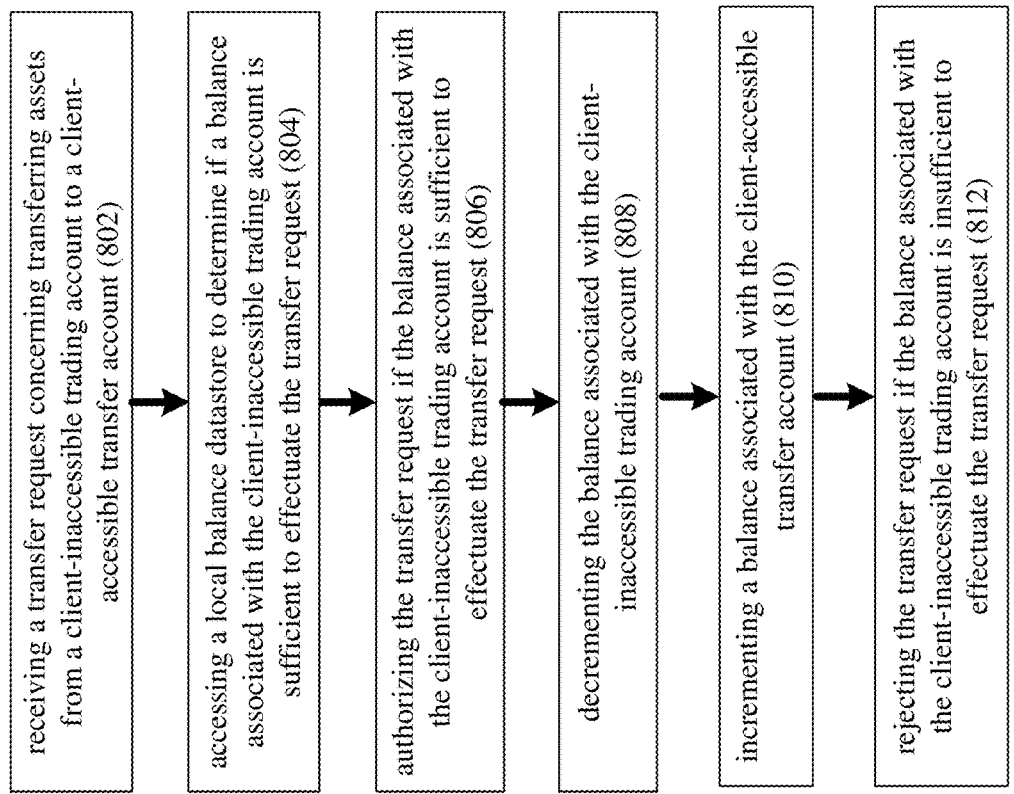
FIG. 15 is a flowchart of another implementation of the trading platform process of FIG. 1 according to an embodiment of the present disclosure.

Referring to FIG. 15, trading platform process 10 may be configured to effectuate a trading platform (e.g., one or more of trading platforms 106).

As discussed above, trading system 100 may be configured to interface with one or more value unit repositories (e.g., value unit repository 112), examples of which may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102). As also discussed above, value unit repository 112 may include transfer accounts (e.g. transfer account 120 and/or transfer account 124) and trading accounts (e.g. trading account 118 and/or trading account 122).

As discussed above, trading system 100 may be configured to maintain local balance datastore 152 with balance information (e.g., balance information 150) received from a Value Unit Repository (e.g., value unit repository 112). For example, balance information 150 may define the balances associated with each of the transfer accounts (e.g. transfer account 120 and/or transfer account 124) and each of the trading accounts (e.g. trading account 118 and/or trading account 122).

As discussed above, matched orders may concern a bearer financial asset, such as a cryptocurrency (e.g., Bitcoin tokens); a fiat currency (e.g., US Dollars); and a physical asset (e.g., ounces of gold). Accordingly, the balance information (e.g., balance information 150) and the local balance datastore (e.g., local balance datastore 152) concerning the trading accounts (e.g. trading account 118 and/or trading account 122) and the transfer accounts (e.g. transfer account 120 and/or transfer account 124) may define a plurality of quantities, such as a quantity of cryptocurrency (e.g., the number of Bitcoin tokens included within an account); a quantity of fiat currency (e.g., the number of US Dollars included within an account); a quantity of precious metals (e.g., the number of ounces of gold included within an account); and a quantity of another unit of value.

As discussed above, transfer accounts (e.g. transfer account 120 and/or transfer account 124) may be configured so that they are client accessible, wherein the owner of such account (e.g. first party 114 and second party 116 respectively) may be allowed to freely move assets into and/or out of such transfer accounts (with some restrictions); while trading accounts (e.g. trading account 118 and/or trading account 122) may be configured so that they are client inaccessible, wherein the owner of such account (e.g., first party 114 and second party 116 respectively) may not be allowed to freely move assets into and/or out of such trading accounts (with some restrictions). During normal use of such accounts, it may be desirable to transfer assets between such accounts.

Trading platform process 10 may be configured to receive 802 a transfer request (e.g., transfer request 154) concerning transferring assets from a client-inaccessible trading account (e.g. trading account 118 or trading account 122) to a client-accessible transfer account (e.g. transfer account 120 or transfer account 124). Upon receiving 802 such a transfer request (e.g., transfer request 154), trading platform process 10 may access 804 local balance datastore 152 to determine if a balance associated with the client-inaccessible trading account (e.g. trading account 118 or trading account 122) is sufficient to effectuate the transfer request (e.g., transfer request 154).

Assume for this example that transfer request 154 received 802 concerns transferring assets (e.g., $100,000) from a client-inaccessible trading account (e.g. trading account 118) to a client-accessible transfer account (e.g. transfer account 120). Accordingly, trading platform process 10 may access 804 local balance datastore 152 to determine if a balance associated with trading account 118 is sufficient to effectuate the transfer request (e.g., transfer request 154).

Trading platform process 10 may authorize 806 the transfer request (e.g., transfer request 154) if the balance associated with the client-inaccessible trading account (e.g. trading account 118) is sufficient to effectuate the transfer request (e.g., transfer request 154). Accordingly and for this example, if the balance associated with the client-inaccessible trading account (e.g. trading account 118) is at least $100,000, trading platform process 10 may authorize 806 the transfer request (e.g., transfer request 154).

If authorized 806, trading platform process 10 may decrement 808 the balance associated with the client-inaccessible trading account (e.g. trading account 118) and/or increment 810 a balance associated with the client-accessible transfer account (e.g. transfer account 120). Accordingly and continuing with the above-stated example, trading platform process 10 may decrement 808 the balance associated with the client-inaccessible trading account (e.g. trading account 118) by $100,000 and increment 810 a balance associated with the client-accessible transfer account (e.g. transfer account 120) by $100,000.

Trading platform process 10 may reject 812 the transfer request (e.g., transfer request 154) if the balance associated with the client-inaccessible trading account (e.g. trading account 118) is insufficient to effectuate the transfer request (e.g., transfer request 154). Accordingly and for this example, if the balance associated with the client-inaccessible trading account (e.g. trading account 118) is less than $100,000, trading platform process 10 may reject 812 the transfer request (e.g., transfer request 154).

Figure 16:
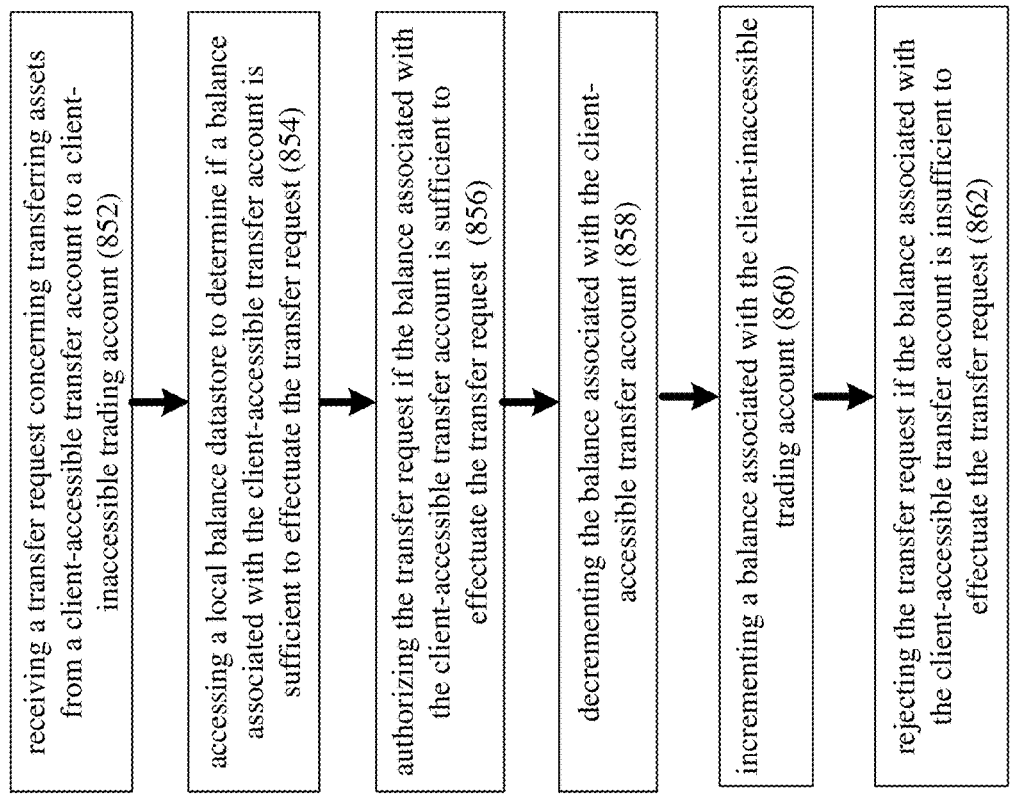
FIG. 16 is a flowchart of another implementation of the trading platform process of FIG. 1 according to an embodiment of the present disclosure.

Referring to FIG. 16, trading platform process 10 may be configured to effectuate a trading platform (e.g., one or more of trading platforms 106).

As discussed above, trading system 100 may be configured to interface with one or more value unit repositories (e.g., value unit repository 112), examples of which may include but are not limited to a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102). As also discussed above, value unit repository 112 may include transfer accounts (e.g. transfer account 120 and/or transfer account 124) and trading accounts (e.g. trading account 118 and/or trading account 122).

As discussed above, trading platform process 10 may be configured to maintain local balance datastore 152 with balance information (e.g., balance information 150) received from a Value Unit Repository (e.g., value unit repository 112). For example, balance information 150 may define the balances associated with each of the transfer accounts (e.g. transfer account 120 and/or transfer account 124) and each of the trading accounts (e.g. trading account 118 and/or trading account 122).

As discussed above, matched orders may concern a bearer financial asset, such as a cryptocurrency (e.g., Bitcoin tokens); a fiat currency (e.g., US Dollars); and a physical asset (e.g., ounces of gold). Accordingly, the balance information (e.g., balance information 150) and the local balance datastore (e.g., local balance datastore 152) concerning the trading accounts (e.g. trading account 118 and/or trading account 122) and the transfer accounts (e.g. transfer account 120 and/or transfer account 124) may define a plurality of quantities, such as a quantity of cryptocurrency (e.g., the number of Bitcoin tokens included within an account); a quantity of fiat currency (e.g., the number of US Dollars included within an account); a quantity of precious metals (e.g., the number of ounces of gold included within an account); and a quantity of another unit of value.

As discussed above, transfer accounts (e.g. transfer account 120 and/or transfer account 124) may be configured so that they are client accessible, wherein the owner of such account (e.g. first party 114 and second party 116 respectively) may be allowed to freely move assets into and/or out of such transfer accounts (with some restrictions); while trading accounts (e.g. trading account 118 and/or trading account 122) may be configured so that they are client inaccessible, wherein the owner of such account (e.g., first party 114 and second party 116 respectively) may not be allowed to freely move assets into and/or out of such trading accounts (with some restrictions). During normal use of such accounts, it may be desirable to transfer assets between such accounts.

Trading platform process 10 may be configured to receive 852 a transfer request (e.g., transfer request 154) concerning transferring assets from a client-accessible transfer account (e.g. transfer account 120 or transfer account 124) to a client-inaccessible trading account (e.g. trading account 118 or trading account 122). Upon receiving 852 such a transfer request (e.g., transfer request 154), trading platform process 10 may access 854 local balance datastore 152 to determine if a balance associated with the client-accessible transfer account (e.g. transfer account 120 or transfer account 124) is sufficient to effectuate the transfer request (e.g., transfer request 154).

Assume for this example that transfer request 154 received 852 concerns transferring assets (e.g., $100,000) from a client-accessible transfer account (e.g. transfer account 120) to a client-inaccessible trading account (e.g. trading account 118). Accordingly, trading platform process 10 may access 854 local balance datastore 152 to determine if a balance associated with transfer account 120 is sufficient to effectuate the transfer request (e.g., transfer request 154).

Trading platform process 10 may authorize 856 the transfer request (e.g., transfer request 154) if the balance associated with the client-accessible transfer account (e.g. transfer account 120) is sufficient to effectuate the transfer request (e.g., transfer request 154). Accordingly and for this example, if the balance associated with the client-accessible transfer account (e.g. transfer account 120) is at least $100,000, trading platform process 10 may authorize 856 the transfer request (e.g., transfer request 154).

If authorized 856, trading platform process 10 may decrement 858 the balance associated with the client-accessible transfer account (e.g. transfer account 120) and/or increment 860 the balance associated with the client-inaccessible trading account (e.g. trading account 118). Accordingly and continuing with the above-stated example, trading platform process 10 may decrement 858 the balance associated with the client-accessible transfer account (e.g. transfer account 120) by $100,000 and increment 860 a balance associated with the client-inaccessible trading account (e.g. trading account 118) by $100,000.

Trading platform process 10 may reject 862 the transfer request (e.g., transfer request 154) if the balance associated with the client-accessible transfer account (e.g. transfer account 120) is insufficient to effectuate the transfer request (e.g., transfer request 154). Accordingly and for this example, if the balance associated with the client-accessible transfer account (e.g. transfer account 120) is less than $100,000, trading platform process 10 may reject 862 the transfer request (e.g., transfer request 154).

Figure 17:
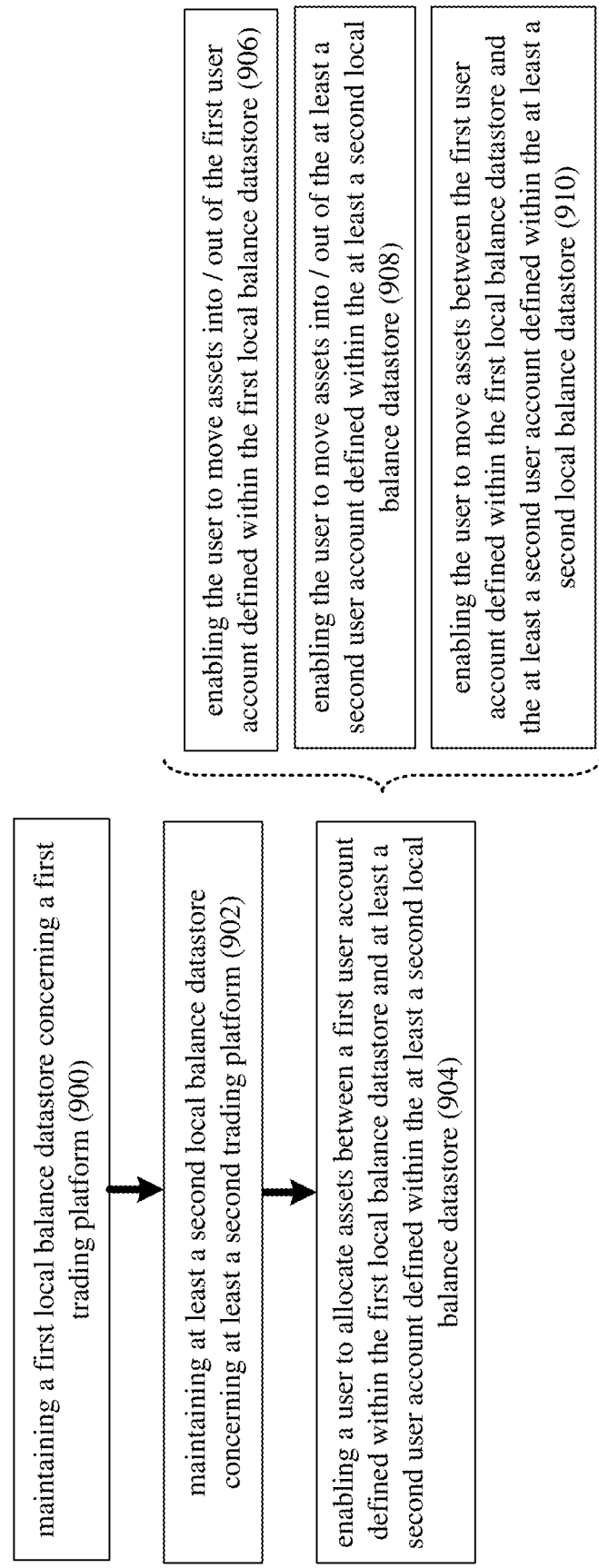
FIG. 17 is a flowchart of another implementation of the trading platform process of FIG. 1 according to an embodiment of the present disclosure.

Referring to FIG. 17, trading platform process 10 may be configured to effectuate a trading platform (e.g., one or more of trading platforms 106).

As discussed above, trading system 100 may be configured to include and/or interface with one or more trading platforms (e.g. trading platforms 106), examples of which may include but are not limited to one or more Electronic Communications (or Crossing) Networks (e.g., ECNs 108) and/or one or more Over-the-Counter Platforms (e.g., OTCs 110).

In the event that trading system 100 includes multiple trading platforms (e.g. ECN 108 and OTC 110), trading system 100 may be configured to interface with a separate value unit repository for each trading platform. For example, value unit repository 112 may be configured to interface with ECN 108 and define trading accounts and/or transfer accounts for use with ECN 108 so that trades may be effectuated on ECN 108. Further, value unit repository 156 may be configured to interface with OTC 110 and define trading accounts and/or transfer accounts for use with OTC 110 so that trades may be effectuated on OTC 110.

As discussed above, examples of the one or more value unit repositories (e.g., value unit repository 112, 156) may include but are not limited to: a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102).

Trading platform process 10 may be configured to maintain 900 a first local balance datastore (e.g., local balance datastore 152) concerning a first trading platform (e.g., ECN 108). The first local balance datastore (e.g., local balance datastore 152) may be maintained 900 with balance information received from value unit repository 112.

Trading platform process 10 may be configured to maintain 902 at least a second local balance datastore (e.g., local balance datastore 158) concerning at least a second trading platform (e.g., OTC 110). The at least a second local balance datastore (e.g., local balance datastore 158) may be maintained 902 with balance information received from value unit repository 156.

Trading platform process 10 may enable 904 a user (e.g., one or more of users 36, 38, 40, 42) to allocate assets between a first user account defined within the first local balance datastore (e.g., local balance datastore 152) and at least a second user account defined within the at least a second local balance datastore (e.g., local balance datastore 158).

When enabling 904 a user (e.g., one or more of users 36, 38, 40, 42) to allocate assets between a first user account defined within the first local balance datastore (e.g., local balance datastore 152) and at least a second user account defined within the at least a second local balance datastore (e.g., local balance datastore 158), trading platform process 10 may be configured perform one or more of the following operations:

enabling 906 the user (e.g., one or more of users 36, 38, 40, 42) to move assets into/out of a first user account defined within the first local balance datastore (e.g., local balance datastore 152). For example, trading platform process 10 may be configured to enable 906 user 36 to move $1,000,000 into/out of a first user account defined within the first local balance datastore (e.g., local balance datastore 152).

enabling 908 the user (e.g., one or more of users 36, 38, 40, 42) to move assets into/out of the at least a second user account defined within the at least a second local balance datastore (e.g., local balance datastore 158). For example, trading platform process 10 may be configured to enable 908 user 36 to move $1,000,000 into/out of the at least a second user account defined within the at least a second local balance datastore (e.g., local balance datastore 158).

enabling 910 the user (e.g., one or more of users 36, 38, 40, 42) to move assets between the first user account defined within the first local balance datastore (e.g., local balance datastore 152) and the at least a second user account defined within the at least a second local balance datastore (e.g., local balance datastore 158). For example, trading platform process 10 may be configured to enable 910 user 36 to move $1,000,000 from a first user account defined within the first local balance datastore (e.g., local balance datastore 152) to at least a second user account defined within the at least a second local balance datastore (e.g., local balance datastore 158).

Figure 18:
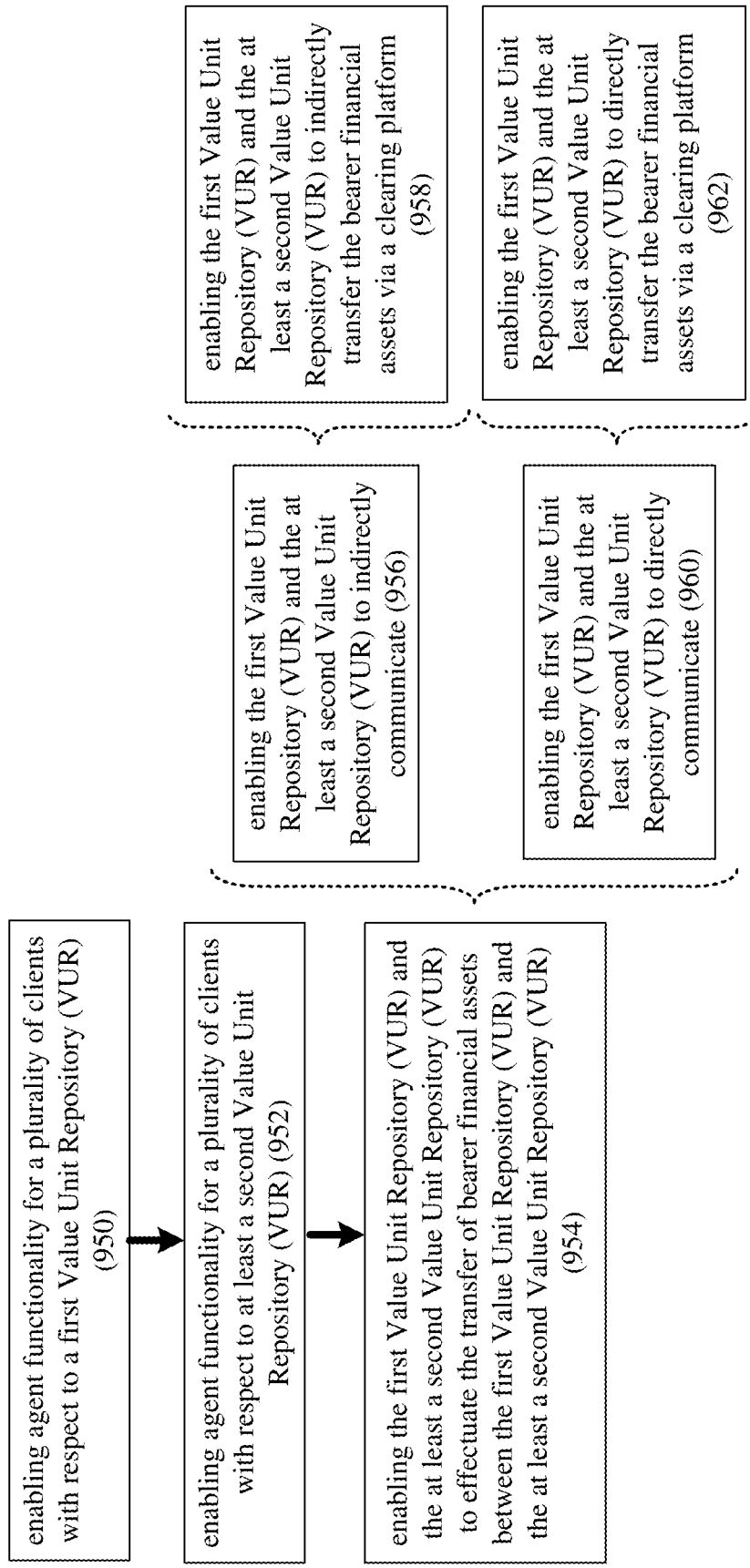
FIG. 18 is a flowchart of another implementation of the trading platform process of FIG. 1 according to an embodiment of the present disclosure.

Referring to FIG. 18, trading platform process 10 may be configured to effectuate a trading platform (e.g., one or more of trading platforms 106).

As discussed above, trading system 100 may be configured to include and/or interface with one or more trading platforms (e.g. trading platforms 106), examples of which may include but are not limited to one or more Electronic Communications (or Crossing) Networks (e.g., ECNs 108) and/or one or more Over-the-Counter Platforms (e.g., OTCs 110).

Further and as discussed above, in the event that trading system 100 includes multiple trading platforms (e.g. ECN 108 and OTC 110), trading system 100 may be configured to interface with a separate value unit repository for each trading platform. For example, value unit repository 112 may be configured to interface with ECN 108 and define trading accounts and/or transfer accounts for use with ECN 108 so that trades may be effectuated on ECN 108. Further, value unit repository 156 may be configured to interface with OTC 110 and define trading accounts and/or transfer accounts for use with OTC 110 so that trades may be effectuated on OTC 110.

As discussed above, examples of the one or more value unit repositories (e.g., value unit repository 112, 156) may include but are not limited to: a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102).

As discussed above, trading system 100 may be configured to include and/or interface with a clearing & funding agent (e.g., clearing & funding agent 128) to enable trading system 100 and/or one or more of trading platforms 106 (e.g. ECN 108 and OTC 110) to act as an agent for clearing platform 126 and/or the various accounts defined within value unit repository 112.

Accordingly, trading platform process 10 may be configured to enable 950 agent functionality for a plurality of clients (e.g., first party 114 and second party 116) with respect to a first Value Unit Repository (e.g., value unit repository 112), thus enabling e.g., ECN 108 to effectuate trades using assets stored in trading accounts defined within value unit repository 112.

Further, trading platform process 10 may be configured to enable 952 agent functionality for a plurality of clients (e.g., first party 114 and second party 116) with respect to at least a second Value Unit Repository (e.g., value unit repository 156), thus enabling e.g., OTC 110 to effectuate trades using assets stored in trading accounts defined within value unit repository 156.

Trading platform process 10 may be configured to enable 954 the first Value Unit Repository (e.g., value unit repository 112) and the at least a second Value Unit Repository (e.g., value unit repository 156) to effectuate the transfer of bearer financial assets (e.g. assets 102) between the first Value Unit Repository (e.g., value unit repository 112) and the at least a second Value Unit Repository (e.g., value unit repository 156). Examples of such bearer financial assets (e.g. assets 102) may include but are not limited to bearer financial assets (e.g. a quantity of a cryptocurrency, a quantity of a fiat currency, and/or a quantity of a physical asset).

When enabling 954 the first Value Unit Repository (e.g., value unit repository 112) and the at least a second Value Unit Repository (e.g., value unit repository 156) to effectuate the transfer of bearer financial assets (e.g. assets 102) between the first Value Unit Repository (e.g., value unit repository 112) and the at least a second Value Unit Repository (e.g., value unit repository 156); trading platform process 10 may enable 956 the first Value Unit Repository (e.g., value unit repository 112) and the at least a second Value Unit Repository (e.g., value unit repository 156) to indirectly communicate.

Enabling 956 the first Value Unit Repository (e.g., value unit repository 112) and the at least a second Value Unit Repository (e.g., value unit repository 156) to indirectly communicate may include enabling 958 the first Value Unit Repository (e.g., value unit repository 112) and the at least a second Value Unit Repository (e.g., value unit repository 156) to indirectly transfer the bearer financial assets (e.g., assets 102) via a clearing platform (e.g., clearing platform 102). For example, bearer financial assets (e.g., assets 102) may be indirectly transferred using trading system 100 as an intermediary.

When enabling 954 the first Value Unit Repository (e.g., value unit repository 112) and the at least a second Value Unit Repository (e.g., value unit repository 156) to effectuate the transfer of bearer financial assets (e.g. assets 102) between the first Value Unit Repository (e.g., value unit repository 112) and the at least a second Value Unit Repository (e.g., value unit repository 156); trading platform process 10 may enable 960 the first Value Unit Repository (e.g., value unit repository 112) and the at least a second Value Unit Repository (e.g., value unit repository 156) to directly communicate.

Enabling 960 the first Value Unit Repository (e.g., value unit repository 112) and the at least a second Value Unit Repository (e.g., value unit repository 156) to directly communicate may include enabling 962 the first Value Unit Repository (e.g., value unit repository 112) and the at least a second Value Unit Repository (e.g., value unit repository 156) to directly transfer the bearer financial assets (e.g., assets 102) via a clearing platform (e.g., clearing platform 102). For example, bearer financial assets (e.g., assets 102) may be directly transferred without using trading system 100 as an intermediary.

Figure 19:
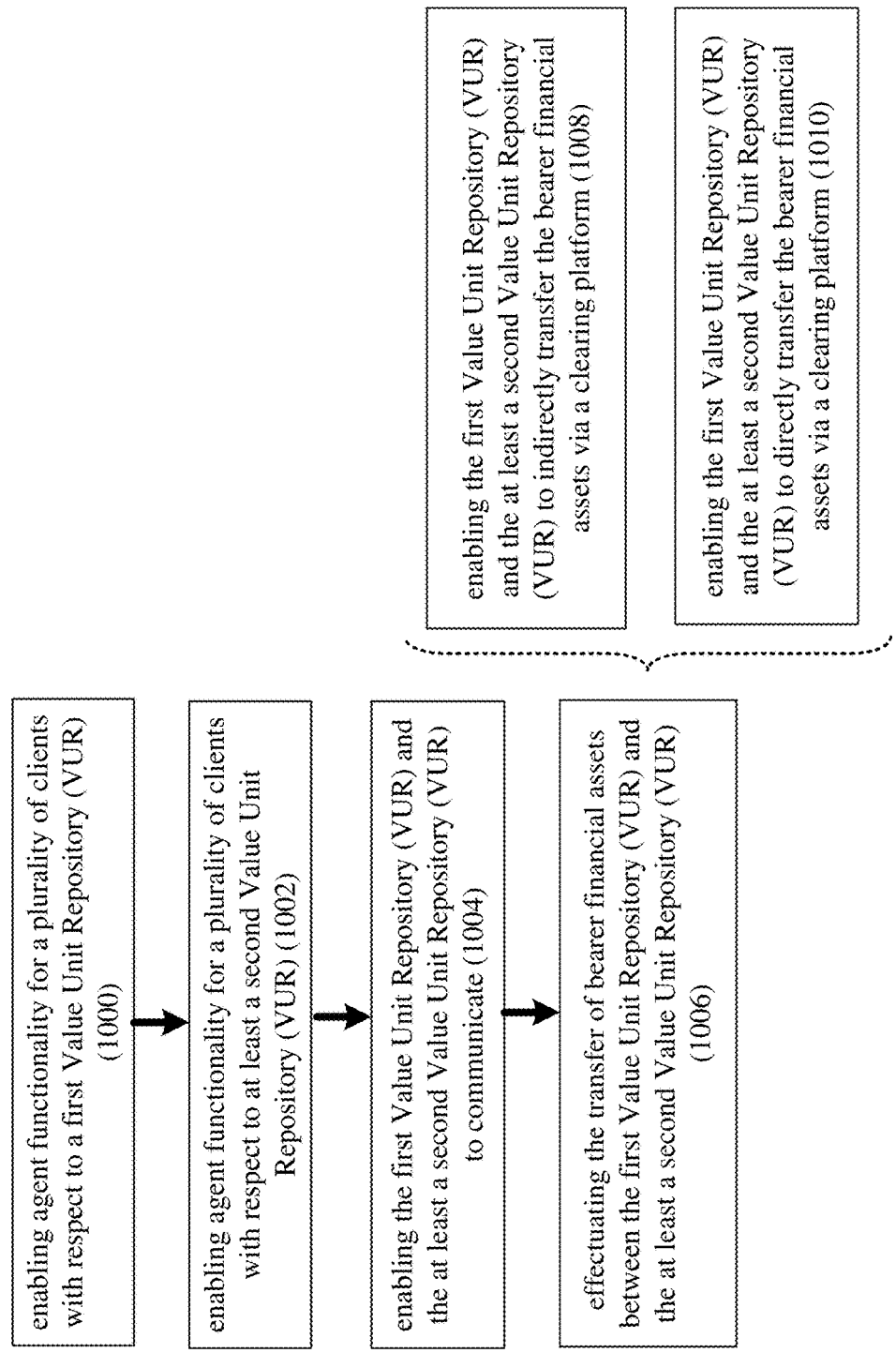
FIG. 19 is a flowchart of another implementation of the trading platform process of FIG. 1 according to an embodiment of the present disclosure.

Referring to FIG. 19, trading platform process 10 may be configured to effectuate a trading platform (e.g., one or more of trading platforms 106).

As discussed above, trading system 100 may be configured to include and/or interface with one or more trading platforms (e.g. trading platforms 106), examples of which may include but are not limited to one or more Electronic Communications (or Crossing) Networks (e.g., ECNs 108) and/or one or more Over-the-Counter Platforms (e.g., OTCs 110).

Further and as discussed above, in the event that trading system 100 includes multiple trading platforms (e.g. ECN 108 and OTC 110), trading system 100 may be configured to interface with a separate value unit repository for each trading platform. For example, value unit repository 112 may be configured to interface with ECN 108 and define trading accounts and/or transfer accounts for use with ECN 108 so that trades may be effectuated on ECN 108. Further, value unit repository 156 may be configured to interface with OTC 110 and define trading accounts and/or transfer accounts for use with OTC 110 so that trades may be effectuated on OTC 110.

As discussed above, examples of the one or more value unit repositories (e.g., value unit repository 112, 156) may include but are not limited to: a qualified custodian (e.g. a third-party configured to store assets 102); a bank (e.g. a traditional commercial bank configured to store assets 102); a trust company (e.g. a traditional trust company configured to store assets 102); a digital asset wallet (e.g. a software service that may use cryptography configured to store assets 102); a dealer (e.g. a traditional securities dealer configured to store assets 106); and a broker/dealer (e.g. a traditional broker/dealer configured to store assets 102).

As discussed above, trading system 100 may be configured to include and/or interface with a clearing & funding agent (e.g., clearing & funding agent 128) to enable trading system 100 and/or one or more of trading platforms 106 (e.g. ECN 108 and OTC 110) to act as an agent for clearing platform 126 and/or the various accounts defined within value unit repository 112.

Accordingly, trading platform process 10 may be configured to enable 1000 agent functionality for a plurality of clients (e.g., first party 114 and second party 116) with respect to a first Value Unit Repository (e.g., value unit repository 112), thus enabling e.g., ECN 108 to effectuate trades using assets stored in trading accounts defined within value unit repository 112.

Further, trading platform process 10 may be configured to enable 1002 agent functionality for a plurality of clients (e.g., first party 114 and second party 116) with respect to at least a second Value Unit Repository (e.g., value unit repository 156), thus enabling e.g., OTC 110 to effectuate trades using assets stored in trading accounts defined within value unit repository 156.

Trading platform process 10 may be configured to enable 1004 the first Value Unit Repository (e.g., value unit repository 112) and the at least a second Value Unit Repository (e.g., value unit repository 156) to communicate (either directly or indirectly).

Trading platform process 10 may further be configured to effectuate 1006 the transfer of bearer financial assets (e.g., assets 102) between the first Value Unit Repository (e.g., value unit repository 112) and the at least a second Value Unit Repository (e.g., value unit repository 156). Examples of such bearer financial assets (e.g. assets 102) may include but are not limited to bearer financial assets (e.g. a quantity of a cryptocurrency, a quantity of a fiat currency, and or a quantity of a physical asset).

When effectuating 1006 the transfer of bearer financial assets (e.g., assets 102) between the first Value Unit Repository (e.g., value unit repository 112) and the at least a second Value Unit Repository (e.g., value unit repository 156), trading platform process 10 may enable 1008 the first Value Unit Repository (e.g., value unit repository 112) and the at least a second Value Unit Repository (e.g., value unit repository 156) to indirectly transfer the bearer financial assets (e.g., assets 102) via a clearing platform (e.g., clearing platform 102). For example, bearer financial assets (e.g., assets 102) may be indirectly transferred using trading system 100 as an intermediary.

When effectuating 1006 the transfer of bearer financial assets (e.g., assets 102) between the first Value Unit Repository (e.g., value unit repository 112) and the at least a second Value Unit Repository (e.g., value unit repository 156), trading platform process 10 may enable 1010 the first Value Unit Repository (e.g., value unit repository 112) and the at least a second Value Unit Repository (e.g., value unit repository 156) to directly transfer the bearer financial assets (e.g., assets 102) via a clearing platform (e.g., clearing platform 102). For example, bearer financial assets (e.g., assets 102) may be directly transferred without using trading system 100 as an intermediary.

Figure 20:
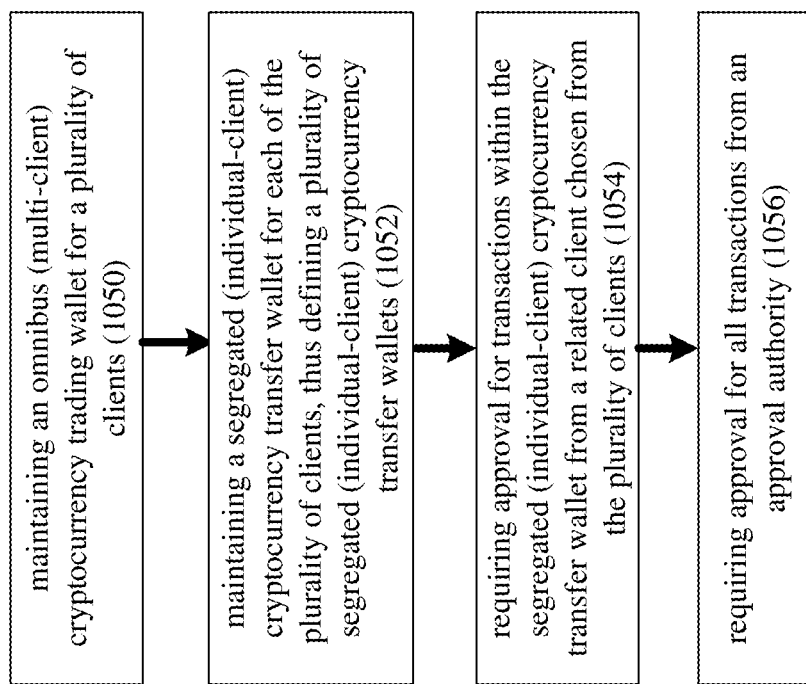
FIG. 20 is a flowchart of another implementation of the trading platform process of FIG. 1 according to an embodiment of the present disclosure.

Referring to FIG. 20, trading platform process 10 may be configured to effectuate a trading platform (e.g., one or more of trading platforms 106).

As discussed above, value unit repository 112 may include transfer accounts (e.g. transfer account 120 and/or transfer account 124) and trading accounts (e.g. trading account 118 and/or trading account 122), wherein these accounts may be used to store various types of assets (e.g., assets 102), examples of which may include but are not limited to a cryptocurrency (e.g., Bitcoin tokens); a fiat currency (e.g., US Dollars); and a physical asset (e.g., ounces of gold).

While the trading accounts (e.g. trading account 118 and/or trading account 122) are described above as being configured for a single client, this is for illustrative purposes only and is not intended to be a limitation of this disclosure, as other configuration are possible and are considered to be within the scope of this disclosure.

For example, trading platform process 10 may be configured to maintain 1050 an omnibus (multi-client) cryptocurrency trading wallet (e.g., multi-client trading wallet 160) for a plurality of clients (e.g., first party 114 and second party 116). This omnibus (multi-client) cryptocurrency trading wallet (e.g., multi-client trading wallet 160) may be a client-inaccessible omnibus (multi-client) cryptocurrency trading wallet.

Additionally, trading platform process 10 may be configured to maintain 1052 a segregated (individual-client) cryptocurrency transfer wallet for each of the plurality of clients (e.g., first party 114 and second party 116), thus defining a plurality of segregated (individual-client) cryptocurrency transfer wallets (e.g., plurality of individual-client transfer wallets 162). This segregated (individual-client) cryptocurrency transfer wallet (e.g., each of the plurality of individual-client transfer wallets 162) may be a client-accessible, segregated (individual-client) cryptocurrency transfer wallet.

Trading platform process 10 may require 1054 approval for all transactions from an approval authority. For example, any and all transactions that occur within the omnibus (multi-client) cryptocurrency trading wallet (e.g., multi-client trading wallet 160) or any of the segregated (individual-client) cryptocurrency transfer wallets (e.g., any of plurality of individual-client transfer wallets 162) may require 1054 approval from an approval authority. Examples of such an approval authority may include but not limited to one or more of: a clearing house; a clearing & funding agent; a value unit repository; and a trusted third party.

Additionally and to provide an enhanced level of security, trading platform process 10 may require 1056 approval for transactions within any of the segregated (individual-client) cryptocurrency transfer wallets (e.g., any of the plurality of individual-client transfer wallets 162) from a related client chosen from the plurality of clients (e.g., first party 114 and second party 116). For example, if a specific segregated (individual-client) cryptocurrency transfer wallet (e.g., included within the plurality of individual-client transfer wallets 162) is owned by first party 114, first party 114 may need to approve all transactions concerning that specific segregated (individual-client) cryptocurrency transfer wallet.

Figure 21:
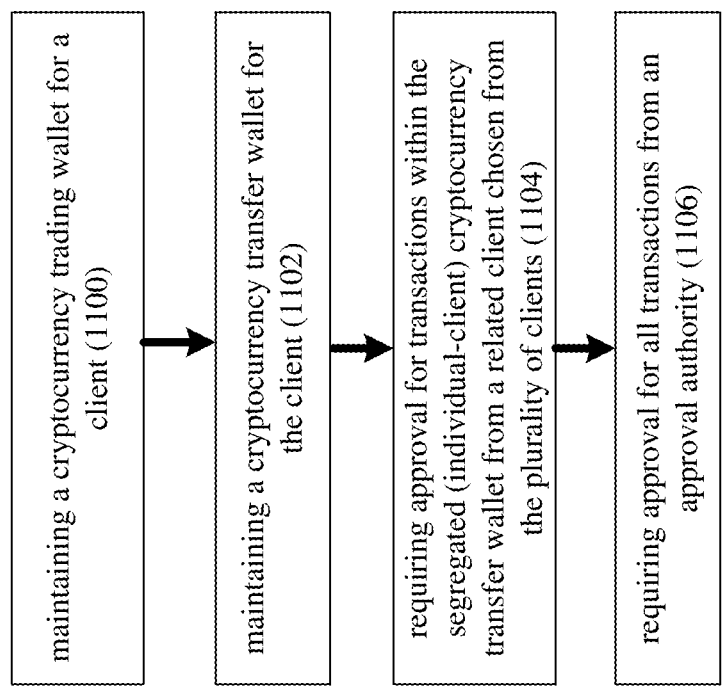
FIG. 21 is a flowchart of another implementation of the trading platform process of FIG. 1 according to an embodiment of the present disclosure.

Referring to FIG. 21, trading platform process 10 may be configured to effectuate a trading platform (e.g., one or more of trading platforms 106).

As discussed above, value unit repository 112 may include transfer accounts (e.g. transfer account 120 and/or transfer account 124) and trading accounts (e.g. trading account 118 and/or trading account 122), wherein these accounts may be used to store various types of assets (e.g., assets 102), examples of which may include but are not limited to a cryptocurrency (e.g., Bitcoin tokens); a fiat currency (e.g., US Dollars); and a physical asset (e.g., ounces of gold).

Trading platform process 10 may be configured to maintain 1100 a cryptocurrency trading wallet (e.g., multi-client trading wallet 160) for a client (e.g., first party 114) and maintain 1102 a cryptocurrency transfer wallet (e.g., any of the plurality of individual-client transfer wallets 162) for the client (e.g., first party 114). The cryptocurrency trading wallet (e.g., multi-client trading wallet 160) may be configured to enable batch write operations to a distributed ledgering system (e.g., distributed ledgering system 148) associated with the cryptocurrency trading wallet (e.g., multi-client trading wallet 160), thus mitigating the expense and/or delay associated with performing a high volume of individual write operations to distributed ledgering system 148. An example of distributed ledgering system 148 may include but is not limited to a blockchain distributed ledgering system.

As discussed above, the cryptocurrency trading wallet (e.g., multi-client trading wallet 160) may be an omnibus (multi-client) cryptocurrency trading wallet for a plurality of clients (e.g., first party 114 and second party 116). This cryptocurrency trading wallet (e.g., multi-client trading wallet 160) may be a client-inaccessible cryptocurrency trading wallet.

Further, the cryptocurrency transfer wallet (e.g., any of the plurality of individual-client transfer wallets 162) may be a segregated (individual-client) cryptocurrency transfer wallet. The cryptocurrency transfer wallet (e.g., any of the plurality of individual-client transfer wallets 162) may be a client-accessible cryptocurrency transfer wallet.

Trading platform process 10 may require 1104 approval for all transactions from an approval authority. For example, any and all transactions that occur within the cryptocurrency trading wallet (e.g., multi-client trading wallet 160) or any of the cryptocurrency transfer wallets (e.g., any of the plurality of individual-client transfer wallets 162) may require 1104 approval from an approval authority. Examples of such an approval authority may include but not limited to one or more of: a clearing house; a clearing & funding agent; a value unit repository; and a trusted third party.

Additionally and to provide an enhanced level of security, trading platform process 10 may require 1106 approval for transactions within any of the cryptocurrency transfer wallets (e.g., any of the plurality of individual-client transfer wallets 162) from a related client chosen from the plurality of clients (e.g., first party 114 and second party 116). For example, if a specific cryptocurrency transfer wallet (e.g., included within the plurality of individual-client transfer wallets 162) is owned by first party 114, first party 114 may need to approve all transactions concerning that specific cryptocurrency transfer wallet.

Figure 22:
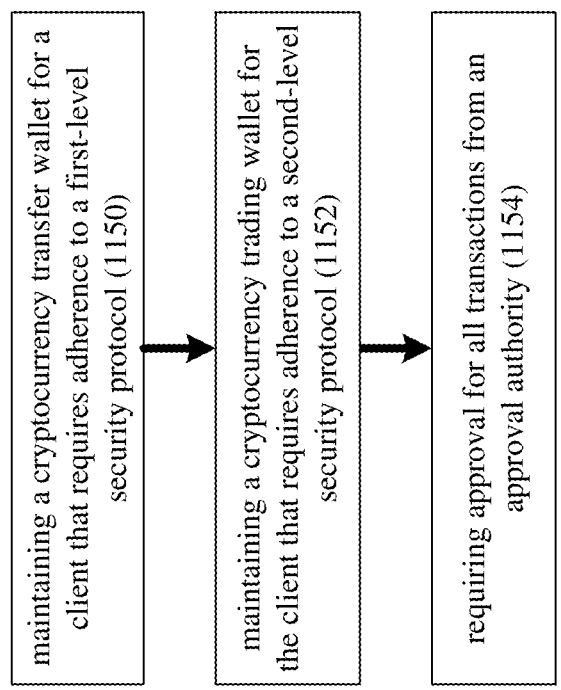
FIG. 22 is a flowchart of another implementation of the trading platform process of FIG. 1 according to an embodiment of the present disclosure.

Referring to FIG. 22, trading platform process 10 may be configured to effectuate a trading platform (e.g., one or more of trading platforms 106).

As discussed above, value unit repository 112 may include transfer accounts (e.g. transfer account 120 and/or transfer account 124) and trading accounts (e.g. trading account 118 and/or trading account 122), wherein these accounts may be used to store various types of assets (e.g., assets 102), examples of which may include but are not limited to a cryptocurrency (e.g., Bitcoin tokens); a fiat currency (e.g., US Dollars); and a physical asset (e.g., ounces of gold).

Trading platform process 10 may be configured to maintain 1150 a cryptocurrency transfer wallet (e.g., any of the plurality of individual-client transfer wallets 162) for a client (e.g., first party 114) that requires adherence to a first-level security protocol; and maintain 1152 a cryptocurrency trading wallet (e.g., multi-client trading wallet 160) for the client (e.g., first party 114) that requires adherence to a second-level security protocol.

As discussed above, the cryptocurrency trading wallet (e.g., multi-client trading wallet 160) may be an omnibus (multi-client) cryptocurrency trading wallet for a plurality of clients (e.g., first party 114 and second party 116). This cryptocurrency trading wallet (e.g., multi-client trading wallet 160) may be a client-inaccessible cryptocurrency trading wallet.

Further, the cryptocurrency transfer wallet (e.g., any of the plurality of individual-client transfer wallets 162) may be a segregated (individual-client) cryptocurrency transfer wallet. The cryptocurrency transfer wallet (e.g., any of the plurality of individual-client transfer wallets 162) may be a client-accessible cryptocurrency transfer wallet.

Trading platform process 10 may require 1154 approval for all transactions from an approval authority. For example, any and all transactions that occur within the cryptocurrency trading wallet (e.g., multi-client trading wallet 160) or any of the cryptocurrency transfer wallets (e.g., any of the plurality of individual-client transfer wallets 162) may require 1154 approval from an approval authority. Examples of such an approval authority may include but not limited to one or more of: a clearing house; a clearing & funding agent; a value unit repository; and a trusted third party.

Additionally and to provide an enhanced level of security, trading platform process 10 may require approval for transactions within any of the cryptocurrency transfer wallets (e.g., any of the plurality of individual-client transfer wallets 162) from a related client chosen from the plurality of clients (e.g., first party 114 and second party 116). For example, if a specific cryptocurrency transfer wallet (e.g., included within the plurality of individual-client transfer wallets 162) is owned by first party 114, first party 114 may need to approve all transactions concerning that specific cryptocurrency transfer wallet. However, trading platform process 10 may not require related client approval for transactions that occur within the cryptocurrency trading wallet (e.g., multi-client trading wallet 160).

Trading platform process 10 may require the cryptocurrency transfer wallet (e.g., any of the plurality of individual-client transfer wallets 162) to adhere to a first-level security protocol and require the cryptocurrency trading wallet (e.g., multi-client trading wallet 160) to adhere to the second-level security protocol. Accordingly, such a first level security protocol may require client approval of transactions within the cryptocurrency transfer wallet (e.g., any of the plurality of individual-client transfer wallets 162), while such a second level security protocol may not require client approval of transactions within the cryptocurrency trading wallet (e.g., multi-client trading wallet 160).

Figure 23:
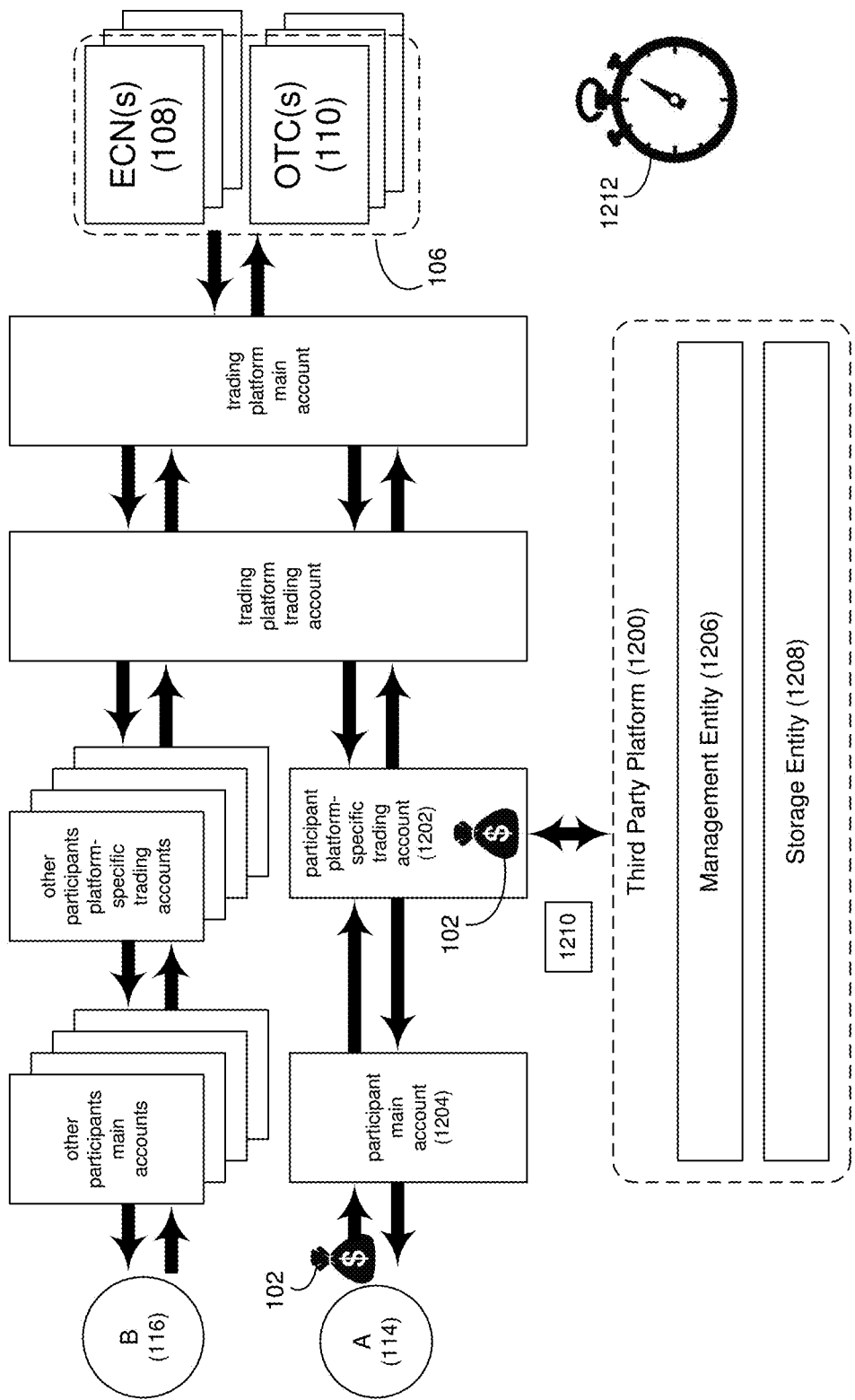
FIG. 23 is diagrammatic view of a trading system configured to execute the trading platform process of FIG. 1 according to an embodiment of the present disclosure.

Referring to FIG. 23, trading platform process 10 may be configured to effectuate a custodial platform (e.g., third party platform 1200) that may be configured to hold assets (e.g., a fiat currency and/or a cryptocurrency) for use as collateral for trades by a market participant (e.g., first party 114) on a trading platform (e.g. trading platform 106).

Through the use of such a custodial platform (e.g., third party platform 1200), the assets of a market participant (e.g., first party 114) may be better protected than in a more traditional system in which such assets are held by the trading platform itself. For example and through such a configuration, the assets of the market participant (e.g., first party 114) may be protected from unethical/illegal behavior (e.g., due to unauthorized use of such assets by the trading platform) and from economic failure (e.g., due to the financial collapse of a trading platform).

Figure 24:
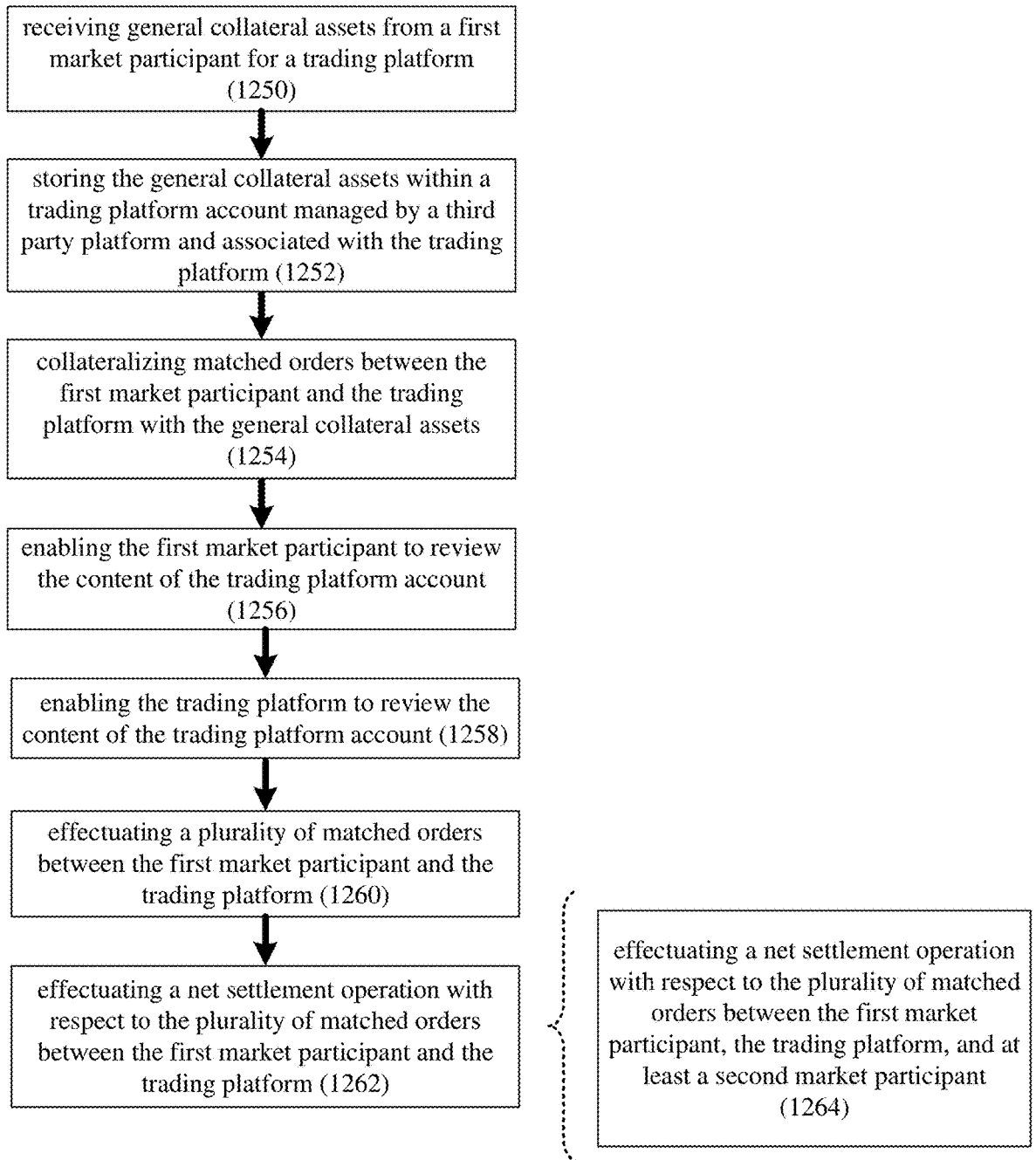
FIG. 24 is a flowchart of another implementation of the trading platform process of FIG. 1 according to an embodiment of the present disclosure.

Referring also to FIG. 24, trading platform process 10 may receive 1250 general collateral assets (e.g. assets 102), examples of which may include but are not limited to a quantity of a cyptocurrency, a quantity of a fiat currency, and/or a quantity of a physical asset. General collateral assets (e.g. assets 102) may be received 1250 from a first market participant (e.g., first party 114) for use within a trading platform (e.g., OTC 110). Specifically, general collateral assets (e.g. assets 102) may function as collateral and may enable the first market participant (e.g., first party 114) to effectuate trades within the trading platform (e.g., OTC 110).

Trading platform process 10 may store 1252 the general collateral assets (e.g. assets 102) within a trading platform account (e.g., participant platform-specific trading account 1202) managed by the third party platform (e.g., third party platform 1200) and associated with the trading platform (e.g., OTC 110). For example, the third party platform (e.g., third party platform 1200) may store 1252 the general collateral assets (e.g. assets 102) within the trading platform account (e.g., participant platform-specific trading account 1202) for use by the first market participant (e.g., first party 114) when making trades within the trading platform (e.g., OTC 110). The general collateral assets (e.g. assets 102) may be received via a main account (e.g., participant main account 1204) controlled by the first market participant (e.g., first party 114).

Trading platform process 10 may collateralize 1254 matched orders between the first market participant (e.g., first party 114) and the trading platform (e.g., OTC 110) with the general collateral assets (e.g. assets 102). Accordingly, the general collateral assets (e.g. assets 102) may be securely stored by trading platform process 10 within the third party platform (e.g., third party platform 1200) for use by the first market participant (e.g., first party 114) as collateral for trades within the trading platform (e.g., OTC 110).

The third party platform (e.g., third party platform 1200) may include management entity 1206 and storage entity 1208. Storage entity 1208 may perform the above-describe storage functionality, while management entity 1206 may manage the storage space, providing functionality such as e.g., enabling access to (and reviewing of) the general collateral assets (e.g. assets 102). Accordingly, trading platform process 10 may enable 1256 the first market participant (e.g., first party 114) to review the content of the trading platform account (e.g., participant platform-specific trading account 1202). Therefore, trading platform process 10 may enable 1256 the first market participant (e.g., first party 114) to determine the value of the general collateral assets (e.g. assets 102) included within the trading platform account (e.g., participant platform-specific trading account 1202).

Further, trading platform process 10 may enable 1258 the trading platform (e.g., OTC 110) to review the content of the trading platform account (e.g., participant platform-specific trading account 1202). Therefore, trading platform process 10 may enable 1258 the trading platform (e.g., OTC 110) to determine the value of the general collateral assets (e.g. assets 102) included within the trading platform account (e.g., participant platform-specific trading account 1202) so that e.g., the trading platform (e.g., OTC 110) may determine the amount of trading credit to extend to the first market participant (e.g., first party 114). For example, if the first market participant (e.g., first party 114) provides $5,000,000 in general collateral assets (e.g. assets 102), the trading platform (e.g., OTC 110) may extend $10,000,000 of trading credit to the first market participant (e.g., first party 114).

Trading platform process 10 may effectuate 1260 a plurality of matched orders (e.g., batch of matched orders 144) between the first market participant (e.g., first party 114) and the trading platform (e.g., OTC 110), wherein this plurality of matched orders (e.g., batch of matched orders 144) may be executed on the trading platform (e.g., OTC 110) in the manner described above.

Continuing with the example in which the first market participant (e.g., first party 114) provides $5,000,000 in general collateral assets (e.g. assets 102) and the trading platform (e.g., OTC 110) extends $10,000,000 of trading credit: the first market participant (e.g., first party 114) may have up to $10,000,000 of their trades matched and executed by the trading platform (e.g., OTC 110) as trading platform process 10 effectuates 1260 these $10,000,000 in trades by storing 1252 the $5,000,000 in general collateral assets (e.g. assets 102) to collateralize 1254 the $10,000,000 in matched orders between the first market participant (e.g., first party 114) and the trading platform (e.g., OTC 110).

Periodically (e.g., hourly, daily, weekly), trading platform process 10 may effectuate 1262 a net settlement operation with respect to the plurality of matched orders (e.g., batch of matched orders 144) between the first market participant (e.g., first party 114) and the trading platform (e.g., OTC 110), wherein this net settlement operation may be effectuated by the third party platform (e.g., third party platform 1200). For example, if this settlement operation is performed weekly and (during that week) the first market participant (e.g., first party 114) purchased 2,000 bitcoin tokens at $4,000 each, the trading platform account (e.g., participant platform-specific trading account 1202) of the first market participant (e.g., first party 114) may include the $5,000,000 in general collateral assets (e.g. assets 102), the 2,000 bitcoin tokens that were purchased, and an outstanding debt of $8,000,000 (which was collateralized 1254 by the $5,000,000 in general collateral assets).

At this point in time, trading platform process 10 may effectuate 1262 the net settlement operation that would require the first market participant (e.g., first party 114) to "settle up" with the trading platform (e.g., OTC 110) by providing the trading platform (e.g., OTC 110) with $8,000,000 in assets. In the event that the first market participant (e.g., first party 114) fails to "settle up" with the trading platform (e.g., OTC 110), the first market participant (e.g., first party 114) may forfeit the $5,000,000 in general collateral assets) to the trading platform (e.g., OTC 110) to partially settle their outstanding debt.

When effectuating 1262 the net settlement operation between the first market participant (e.g., first party 114) and the trading platform (e.g., OTC 110) with respect to the plurality of matched orders (e.g., batch of matched orders 144), trading platform process 10 may effectuate 1264 a net settlement operation with respect to the plurality of matched orders (e.g., batch of matched orders 144) between the first market participant (e.g., first party 114), the trading platform (e.g., OTC 110), and at least a second market participant (e.g., second party 116).

Continuing with the above-stated example in which the first market participant (e.g., first party 114) purchased 2,000 bitcoin tokens at $4,000 each, assume that the first market participant (e.g., first party 114) sold those 2,000 bitcoin tokens to the second market participant (e.g., second party 116) for $3,900 each. In this situation, the trading platform account (e.g., participant platform-specific trading account 1202) of the first market participant (e.g., first party 114) may include the $5,000,000 in general collateral assets (e.g. assets 102), zero bitcoin tokens (as they were transferred to a platform-specific trading account associated with second party 116), an outstanding debt of $8,000,000 (which was collateralized 1254 by the $5,000,000 in general collateral assets), and an outstanding credit of $7,800,000 (for the sale of the bitcoin tokens to second party 116).

At this point in time, trading platform process 10 may effectuate 1264 the net settlement operation that would require the first market participant (e.g., first party 114) to "settle up" with the trading platform (e.g., OTC 110) by providing the trading platform (e.g., OTC 110) with $200,000 in assets. In the event that the first market participant (e.g., first party 114) fails to "settle up" with the trading platform (e.g., OTC 110), the first market participant (e.g., first party 114) may forfeit $200,000 of the $5,000,000 in general collateral assets to the trading platform (e.g., OTC 110) to settle their outstanding debt.

The system described above provides protection for both the market participant (e.g., first party 114) and the trading platform (e.g., OTC 110) by storing 1252 the general collateral assets (e.g. assets 102) within a trading platform account (e.g., participant platform-specific trading account 1202) managed by the third party platform (e.g., third party platform 1200) and associated with the trading platform (e.g., OTC 110), wherein trading platform process 10 may collateralize 1254 matched orders using these general collateral assets (e.g. assets 102).

However, it is foreseeable that the market participant (e.g., first party 114), as some time in the future, may wish to withdraw the general collateral assets (e.g. assets 102) from the trading platform account (e.g., participant platform-specific trading account 1202). But being these general collateral assets (e.g. assets 102) are being used to collateralize 1254 matched orders, trading platform process 10 may be configured to ensure that the market participant (e.g., first party 114) "settles up" with the trading platform (e.g., OTC 110) prior to allowing such a withdrawal of the general collateral assets (e.g. assets 102) to occur.

Figure 25:
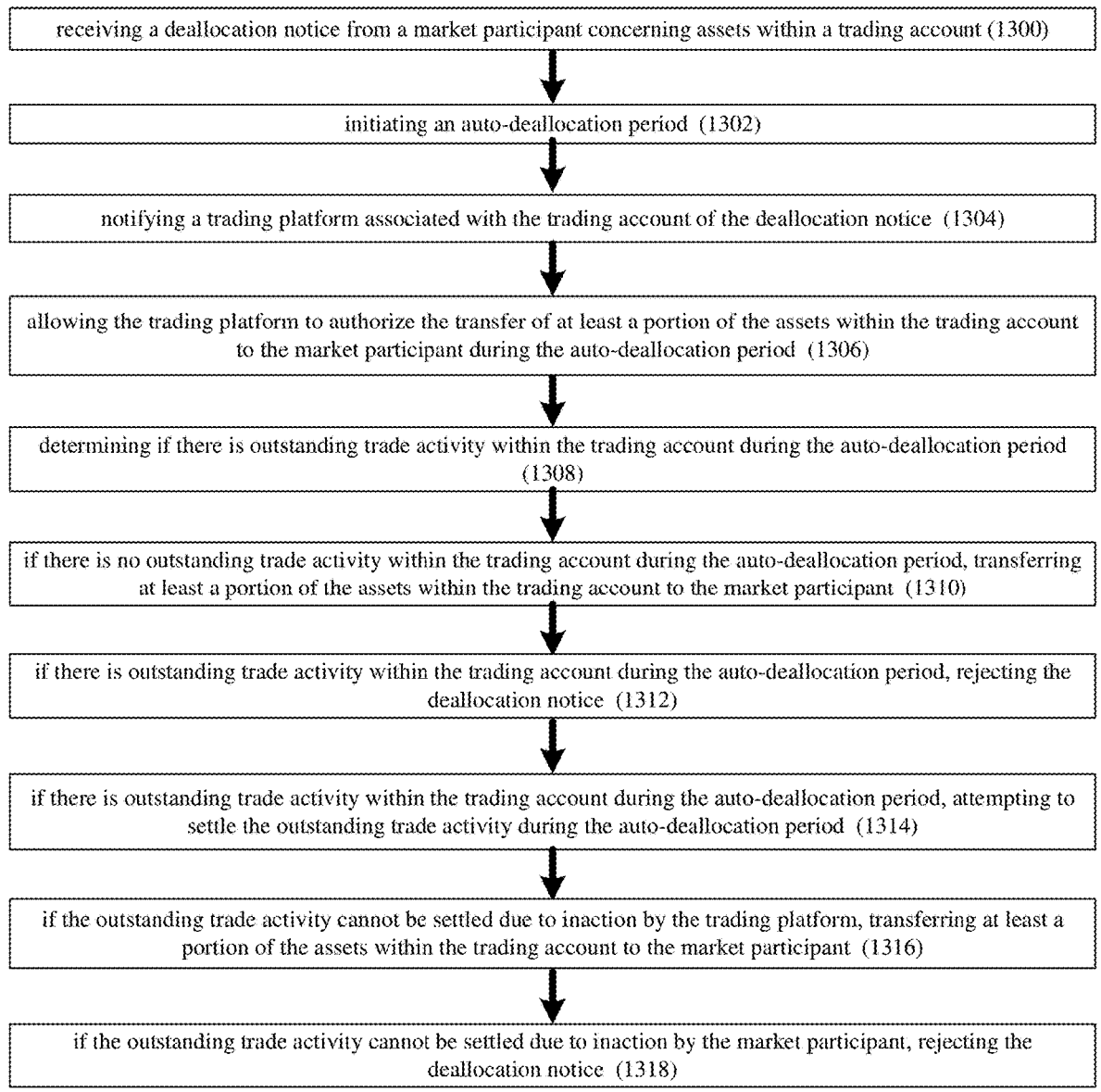
FIG. 25 is a flowchart of another implementation of the trading platform process of FIG. 1 according to an embodiment of the present disclosure.

Referring to FIG. 25, in the event that a market participant (e.g., first party 114) wishes to have their general collateral assets (e.g. assets 102) returned (in whole or in part), the market participant (e.g., first party 114) may provide a deallocation notice (e.g., deallocation notice 1210) to trading platform process 10 concerning assets (e.g. assets 102) within a trading account (e.g., participant platform-specific trading account 1202).

Upon receiving 1300 deallocation notice 1210 from the market participant (e.g., first party 114), trading platform process 10 may initiate 1302 an auto-deallocation period (e.g., auto-deallocation period 1212). The length of this auto-deallocation period (e.g., auto-deallocation period 1212) may vary depending upon the manner in which trading platform process 10 is configured. For example, auto-deallocation period 1212 may be comparatively short (i.e., a portion of the periodicity of the above-described net settlement period). Conversely, auto-deallocation period 1212 may be considerably longer (e.g., as long as if not longer than the periodicity of the above-described net settlement period).

Further and upon receiving 1300 deallocation notice 1210 from the market participant (e.g., first party 114), trading platform process 10 may notify 1304 a trading platform (e.g., OTC 110) associated with the trading account (e.g., participant platform-specific trading account 1202) of deallocation notice 1212.

Trading platform process 10 may allow 1306 the trading platform (e.g., OTC 110) to authorize the transfer of at least a portion of the assets (e.g. assets 102) within the trading account (e.g., participant platform-specific trading account 1202) to the market participant (e.g., first party 114) during auto-deallocation period 1212. For example, depending upon the rules of the trading platform (e.g., OTC 110) and/or the history of the relationship between the market participant (e.g., first party 114) and trading platform (e.g., OTC 110), the trading platform (e.g., OTC 110) may authorize the transfer of some (or all) of assets 102 within participant platform-specific trading account 1202 to first party 114 during auto-deallocation period 1212.

In the event that the trading platform (e.g., OTC 110) does not authorize the transfer of some (or all) of assets 102 to first party 114 during auto-deallocation period 1212 (or if such authorization was never sought by trading platform process 10), trading platform process 10 may determine 1308 if there is outstanding trade activity (e.g., previously-received unsettled trade activity, newly-received unsettled trade activity, etc.) within the trading account (e.g., participant platform-specific trading account 1202) during auto-deallocation period 1212.

If there is no outstanding trade activity (e.g., previously-received unsettled trade activity, newly-received unsettled trade activity, etc.) within the trading account (e.g., participant platform-specific trading account 1202) during auto-deallocation period 1212, trading platform process 10 may transfer 1310 at least a portion of the assets (e.g. assets 102) within the trading account (e.g., participant platform-specific trading account 1202) to the market participant (e.g., first party 114). For example, if there is no outstanding trade activity but there is an outstanding balance owed to the trading platform (e.g., OTC 110) by first party 114, that outstanding balance may be deducted from assets 102 before being transferred 1310 to the market participant (e.g., first party 114).

If there is outstanding trade activity (e.g., previously-received unsettled trade activity, newly-received unsettled trade activity, etc.) within the trading account (e.g., participant platform-specific trading account 1202) during auto-deallocation period 1212, trading platform process 10 may reject 1312 deallocation notice 1212. In such a situation, trading platform process 10 may take no action on deallocation notice 1210.

Alternatively and if there is outstanding trade activity within the trading account during the auto-deallocation period, trading platform process 10 may attempt 1314 to settle the outstanding trade activity during auto-deallocation period 1212. For example, trading platform process 10 may request that the trading platform (e.g., OTC 110) match (or cancel) any unmatched orders, execute any matched orders and/or settle any outstanding trades).

If the outstanding trade activity cannot be settled due to inaction by the trading platform (e.g., OTC 110), trading platform process 10 may transfer 1316 at least a portion of the assets (e.g., assets 102) within the trading account (e.g., participant platform-specific trading account 1202) to the market participant (e.g., first party 114). For example, if the trading platform (e.g., OTC 110) had previously matched a trade but OTC 110 has failed to (or refuses to) settle the trade, trading platform process 10 may transfer 1316 some or all of assets 102 within the trading account (e.g., participant platform-specific trading account 1202) to first party 114 (as first party 114 should not be penalized due to inaction by OTC 110).

Conversely, if the outstanding trade activity cannot be settled due to inaction by the market participant (e.g., first party 114), trading platform process 10 may reject 1318 deallocation notice 1210. For example, if the trading platform (e.g., OTC 110) had previously matched a trade but first party 114 has failed to (or refuses to) fund the trade, trading platform process 10 may reject 1318 deallocation notice 1210 (as OTC 110 should not be penalized due to inaction by first party 114).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device, the computer-implemented method comprising:
maintaining, on a computing device, an omnibus (multi-client) cryptocurrency trading wallet for a plurality of clients;
maintaining a segregated (individual-client) cryptocurrency transfer wallet for each of the plurality of clients, thus defining a plurality of segregated (individual-client) cryptocurrency transfer wallets;
receiving a plurality of matched orders concerning at least a first market participant, a second market participant, and a third market participant, wherein at least the first market participant is involved in multiple matched orders;

effectuating, on a trading platform via the computing device, a clearing of the plurality of matched orders, wherein effectuating the clearing of the plurality of matched orders comprises performing a netting operation to determine a net asset amount for at least the first market participant, the second market participant, and the third market participant, wherein effectuating the clearing of the plurality of matched orders further comprises sending one or more messages to a value unit repository to effectuate transferring one or more assets at least between a first custodial account associated with the first market participant and a second custodial account associated with the second market participant; and anonymizing an identity of at least the first market participant and the second market participant by executing the transferring of the one or more assets without reporting the identity of at least the first market participant and the second market participant, such that the identity of one or more of the first market participant and the second market participant is known only to the value unit repository and is not public knowledge.

2. The computer-implemented method of claim 1 further comprising:
requiring approval for transactions within the segregated (individual-client) cryptocurrency transfer wallet from a related client chosen from the plurality of clients.

3. The computer-implemented method of claim 1 further comprising:
requiring approval for all transactions from an approval authority.

4. The computer-implemented method of claim 1 wherein the approval authority includes one or more of:
a clearing house;
a clearing & funding agent;
the value unit repository; and
a trusted third party.

5. The computer-implemented method of claim 1 wherein the segregated (individual-client) cryptocurrency transfer wallet is a client-accessible, segregated (individual-client) cryptocurrency transfer wallet.

6. The computer-implemented method of claim 1 wherein the omnibus (multi-client) cryptocurrency trading wallet is a client-inaccessible omnibus (multi-client) cryptocurrency trading wallet.

7. A computer program product residing on a non-transitory computer readable medium having a plurality of instructions stored thereon which, when executed by a processor, cause the processor to perform operations comprising:
maintaining, on a computing device, an omnibus (multi-client) cryptocurrency trading wallet for a plurality of clients;
maintaining a segregated (individual-client) cryptocurrency transfer wallet for each of the plurality of clients, thus defining a plurality of segregated (individual-client) cryptocurrency transfer wallets;
receiving a plurality of matched orders concerning at least a first market participant, a second market participant and a third market participant, wherein at least the first market participant is involved in multiple matched orders;
effectuating, on a trading platform via the computing device, a clearing of the plurality of matched orders, wherein effectuating the clearing of the plurality of matched orders comprises performing a netting operation to determine a net asset amount for at least the first market participant, the second market participant, and the third market participant, wherein effectuating the clearing of the plurality of matched orders further comprises sending one or more messages to a value unit repository to effectuate transferring one or more assets at least between a first custodial account associated with the first market participant and a second custodial account associated with the second market participant; and anonymizing an identity of at least the first market participant and the second market participant by executing the transferring of the one or more assets without reporting the identity of at least the first market participant and the second market participant, such that the identity of one or more of the first market participant and the second market participant is known only to the value unit repository and is not public knowledge.

8. The computer program product of claim 7 further comprising:
requiring approval for transactions within the segregated (individual-client) cryptocurrency transfer wallet from a related client chosen from the plurality of clients.

9. The computer program product of claim 7 further comprising:
requiring approval for all transactions from an approval authority.

10. The computer program product of claim 7 wherein the approval authority includes one or more of:
a clearing house;
a clearing & funding agent;
the value unit repository; and
a trusted third party.

11. The computer program product of claim 7 wherein the segregated (individual-client) cryptocurrency transfer wallet is a client-accessible, segregated (individual-client) cryptocurrency transfer wallet.

12. The computer program product of claim 7 wherein the omnibus (multi-client) cryptocurrency trading wallet is a client-inaccessible omnibus (multi-client) cryptocurrency trading wallet.

13. A computing system including:
a memory; and
a processor configured to perform operations comprising:
maintaining, on a computing device, an omnibus (multi-client) cryptocurrency trading wallet for a plurality of clients;
maintaining a segregated (individual-client) cryptocurrency transfer wallet for each of the plurality of clients, thus defining a plurality of segregated (individual-client) cryptocurrency transfer wallets;
receiving a plurality of matched orders concerning at least a first market participant, a second market participant, and a third market participant, wherein at least the first market participant is involved in multiple matched orders;
effectuating, on a trading platform via the computing device, a clearing of the plurality of matched orders, wherein effectuating the clearing of the plurality of matched orders comprises performing a netting operation to determine a net asset amount for at least the first market participant, the second market participant, and the third market participant, wherein effectuating the clearing of the plurality of matched orders further comprises sending one or more messages to a value unit repository to effectuate transferring one or more assets at least between a first custodial account associated with the first market participant and a second custodial account associated with the second market participant; and anonymizing an identity of at least the first market participant and the second market participant by executing the transferring of the one or more assets without reporting the identity of at least the first market participant and the second market participant, such that the identity of one or more of the first market participant and the second market participant is known only to the value unit repository and is not public knowledge.

14. The computing system of claim 13 further comprising: requiring approval for transactions within the segregated (individual-client) cryptocurrency transfer wallet from a related client chosen from the plurality of clients.

15. The computing system of claim 13 further comprising: requiring approval for all transactions from an approval authority.

16. The computing system of claim 13 wherein the approval authority includes one or more of:
    a clearing house;
    a clearing & funding agent;
    the value unit repository; and
    a trusted third party.

17. The computing system of claim 13 wherein the segregated (individual-client) cryptocurrency transfer wallet is a client-accessible, segregated (individual-client) cryptocurrency transfer wallet.

18. The computing system of claim 13 wherein the omnibus (multi-client) cryptocurrency trading wallet is a client-inaccessible omnibus (multi-client) cryptocurrency trading wallet.

* * * * *

UNITED STATES PATENT AND TRADEMARK OFFICE
CERTIFICATE OF CORRECTION

PATENT NO. : 11,397,986 B2
APPLICATION NO. : 16/588765
DATED : July 26, 2022
INVENTOR(S) : Charles R. Walden et al.

It is certified that error appears in the above-identified patent and that said Letters Patent is hereby corrected as shown below:

On the Title Page

Item (73) should be corrected to read as follows:
Strike Protocols, Inc., New York, NY (US)

Signed and Sealed this
Thirty-first Day of January, 2023

Katherine Kelly Vidal
Director of the United States Patent and Trademark Office